US012777546B2

(12) United States Patent
Medjkouh et al.

(10) Patent No.: US 12,777,546 B2
(45) Date of Patent: Oct. 27, 2026

(54) SYSTEMS, METHODS, AND DEVICES FOR UE-ASSISTED PRIVACY-AWARE DATA-DRIVEN NW CONTROL

(71) Applicant: Apple Inc., Cupertino, CA (US)

(72) Inventors: Said Medjkouh, San Diego, CA (US); Tarik Tabet, Carlsbad, CA (US); Kenza Hamidouche, Cupertino, CA (US); Ayman F Naguib, Cupertino, CA (US); Sreevalsan Vallath, Dublin, CA (US)

(73) Assignee: Apple Inc., Cupertino, CA (US)

( * ) Notice: Subject to any disclaimer, the term of this patent is extended or adjusted under 35 U.S.C. 154(b) by 282 days.

(21) Appl. No.: 18/506,243

(22) Filed: Nov. 10, 2023

(65) Prior Publication Data

US 2024/0188167 A1 Jun. 6, 2024

Related U.S. Application Data

(60) Provisional application No. 63/429,529, filed on Dec. 1, 2022.

(51) Int. Cl.
*H04W 76/20* (2018.01)
*H04W 8/24* (2009.01)

(52) U.S. Cl.
CPC ............. *H04W 76/20* (2018.02); *H04W 8/24* (2013.01)

(58) Field of Classification Search
None
See application file for complete search history.

(56) References Cited

U.S. PATENT DOCUMENTS

| | | | | |
|---|---|---|---|---|
| 11,184,328 | B1 * | 11/2021 | Hyder | H04L 63/0272 |
| 2012/0207069 | A1 * | 8/2012 | Xu | H04W 52/0222 370/311 |
| 2016/0143055 | A1 * | 5/2016 | Nammi | H04B 7/0617 370/329 |
| 2020/0337101 | A1 * | 10/2020 | Brooks | H04W 64/00 |
| 2022/0239395 | A1 * | 7/2022 | Khafizov | H04W 52/283 |
| 2024/0291612 | A1 * | 8/2024 | Wang | H04B 7/0628 |
| 2024/0381337 | A1 * | 11/2024 | Wang | H04W 72/569 |

* cited by examiner

*Primary Examiner* — Lonnie V Sweet
(74) *Attorney, Agent, or Firm* — Eschweiler & Potashnik, LLC; Matthew Glause

(57) ABSTRACT

Solutions for user equipment (UE) assisted privacy-aware data-driven network (NW) control. UEs, base stations, an aggregation and analysis system, and a data-driven NW control unit may coordinate and communicate with one another to enhance the efficiency and effectiveness of a wireless communication network by implementing machine learning tools and exchanging information in a manner that enables the training, development, and use of models. Information of various levels of privacy may be exchanged, protected, anonymized, etc., to enable UE-assisted privacy-aware data-driven NW control while still protecting the privacy of individual users.

20 Claims, 35 Drawing Sheets

500

DATA PRIVACY AND CONNECTIVITY CONTEXT SHARING

DATA PRIVACY SENSITIVITY: HIGHER (LEVEL 1) → LOWER (LEVEL 4)

| PRIVACY LEVEL | DATA TYPE | DESCRIPTION AND EXAMPLES | CONNECTIVITY CONTEXT DATA |
|---|---|---|---|
| LEVEL 1 | INDIVIDUAL USER DATA AND PRIVATE DATA | EXAMPLE: EXACT LOCATION, EXACT APPLICATION USED, EXACT BEHAVIOR (SLEEPING), PERSONAL INFORMATION (AGE, GENDER, ETC.) | TELEMETRY DATA WITHOUT CONFIDENTIAL INFORMATION. FOR EXAMPLE, UE, IN THE PAST WEEK, USED 40% OF PLAYBACK-VIDEO APPS, 20% OF LATENCY-CRITICAL GAMES, 10% VIDEO-CALLS, ETC. INFORMS NW ABOUT CONNECTIVITY TRENDS |
| LEVEL 2 | INDIVIDUAL CONNECTIVITY TELEMETRY DATA | STATISTICS ABOUT NW USAGE PATTERNS OVER DEFINED PERIOD OF TIME | UE SHARE TELEMETRY DATA THAT DOES NOT INCLUDE CONFIDENTIAL INFORMATION ABOUT USER. FOR EXAMPLE, UE, IN THE PAST WEEK, USED 40% OF PLAYBACK VIDEO APPS, 20% OF LATENCY-CRITICAL GAMES, 10% VIDEO-CALLS, ETC. DATA SHARED TO INFORM NW ABOUT CONNECTIVITY TRENDS OF A USER. |
| LEVEL 3 | CATEGORICAL CONTEXTUAL USER DATA | LOCATION: INDOOR/OUTDOOR TRAFFIC CLASS: STREAMING, VOICE CALL, VIDEO CALL CONNECTIVITY CONTEXT: NO DATA, LOW TRAFFIC, HIGH TRAFFIC | DATA SHARED BY UE ABOUT CONNECTIVITY CONTEXTUAL EVENT (SUB-SECONDS) OR FORECAST (SECONDS, MINUTES). INFORMS NW CONNECTIVITY EVENT TO HAPPEN DURING A CERTAIN TIME WINDOW |
| LEVEL 4 | AGGREGATED MULTI-USER DATA (E.G., FEDERATED DATA) | PRIVATE DATA AGGREGATED ACROSS MULTIPLE-UES IN WAY THAT STATISTICAL & ANALYTICAL INFO DO NOT REVEAL INDIVIDUAL PRIVATE INFO | DATA COLLECTED FROM MANY USERS IN AN AREA. DATA SHARED WITH THE NETWORK IN FORM OF ANONYMIZED STATISTICAL QUANTITIES, HISTOGRAMS, EMBEDDINGS. DATA INFORMS NW ABOUT METRICS THAT GUIDE AUTOMATION, EVALUATION, AND RESOURCE PLANNING |

*(DATA CLASSIFICATION MAY BE NEGOTIATED AND/OR AGREED UPON BETWEEN USERS, DEVICE VENDORS, NETWORK VENDORS, AND/OR NETWORK OPERATORS)*

*FIG. 5*

(COORDINATION BETWEEN UE AND BASE STATION)

1800

COORDINATION DATA

| DATA TYPE | VALIDITY TIME RANGE | SOURCE AND DESITNATION | DESCRIPTION |
|---|---|---|---|
| AGGREGATED DATA | DAYS/WEEKS | FROM UE AGGREGATION SYSTEM TO DATA-DRIVEN NETWORK CONTROL UNIT | USER CONNECTIVITY METRICS AND STATISTICAL INFORMATION OVER PREVIOUS TIME WINDOWS |
| AGGREGATED FORECAST | DAYS/WEEKS | FROM UE AGGREGATION SYSTEM TO DATA-DRIVEN NETWORK CONTROL UNIT | UE CONNECTIVITY FORECASTS BASED ON AGGREGATED DATA AT AGGREGATION SYSTEM |
| UE CONNECTIVITY CONTEXT REPORT | MILLISECONDS/ SECONDS | FROM UE TO BASE STATION | UE SHARES CONTEXTUAL INFORMATION OR UPDATE WITH BASE STATION VIA CONNECTIVITY REPORT (OPTIONALLY WITH CONFIG RECOMMENDATION) |
| UE CONNECTIVITY CONTEXT FORECAST REPORT | SECONDS/ MINUTES | FROM UE TO BASE STATION | UE SHARES CONNECTIVITY PREDICTION WITH NETWORK |
| NW CONNECTIVITY CONTEXT REPORT | SECONDS/ MINUTES | FROM BASE STATION TO UE | BASE STATION INFORMS UE OF UPDATE TO NEWTORK CONTEXT |

*FIG. 18*

2200

USER CONTEXT TO CONNECTIVITY CONTEXT

| USER CONTEXT UNDERSTANDING AND PREDICTION | CONNECTIVITY CONTEXT | CONNECTIVITY CONFIG RECOMMENDATION |
|---|---|---|
| USER SLEEPING (LIKELY FOR 20 MINS) | UE DATA TRAFFIC WILL BE LOW FOR 20 MINS | INCREASE UE'S CDRX, REDUCE POWER, ALLOCATE FEWER RESOURCES |
| USER WOKE UP | UE WILL START USING DATA | REDUCE UE'S CDRX AND ADJUST RESOURCES, MOVE UE TO A LESS LOADED CELL |
| UE ENTERING MALL | UE IS GOING FROM OUTDOOR TO INDOOR | DON'T USE FR2 OR HIGHER BANDS |
| UE STARTED DISPLAYING PLAYBACK VIDEO | UE WILL REQUIRE THE CORRESPONDING TRAFFIC FOR THE DURATION OF THE VIDEO | CELL CONFIG THAT TYPICALLY WORKS BEST FOR THE UE |
| UE ABOUT TO STREAM MOVIE | UE WILL REQUIRE HIGH TRAFFIC FOR VOD, RESOURCE NEED ESTIMATE | PREPARE ESTIMATE BY LOAD BALANCING ACCORDINGLY |
| UE GOING TO PLAY REAL-TIME GAME | UE WILL REQUIRE LOW LATENCY TRAFFIC | CONFIG THE RIGHT CELL TO PROVIDE LOW-LATENCY TRAFFIC |

*FIG. 22*

SYSTEMS, METHODS, AND DEVICES FOR UE-ASSISTED PRIVACY-AWARE DATA-DRIVEN NW CONTROL

REFERENCE TO RELATED APPLICATIONS

This Application claims the benefit of U.S. Provisional Application No. 63/429,529, filed on Dec. 1, 2022, the contents of which are hereby incorporated by reference in their entirety

FIELD

This disclosure relates to wireless communication networks and mobile device capabilities.

BACKGROUND

Wireless communication networks and wireless communication services are becoming increasingly dynamic, complex, and ubiquitous. For example, some wireless communication networks may be developed to implement fifth generation (5G) or new radio (NR) technology, sixth generation (6G) technology, and so on. Such technology may include solutions for enabling user equipment (UE) and network devices, such as base stations to communicate with one another using different resources and under different conditions.

BRIEF DESCRIPTION OF THE DRAWINGS

The present disclosure will be readily understood and enabled by the detailed description and accompanying figures of the drawings. Like reference numerals may designate like features and structural elements. Figures and corresponding descriptions are provided as non-limiting examples of aspects, implementations, etc., of the present disclosure, and references to "an" or "one" aspect, implementation, etc., may not necessarily refer to the same aspect, implementation, etc., and may mean at least one, one or more, etc.

FIG. 5 is a diagram of an example of a table associating levels of privacy with different types of data according to one or more implementations described herein.

FIG. 18 is a diagram of an example of a table of coordination data according to one or more implementations described herein.

FIG. 22 is a diagram of an example of a table of user context to connectivity context data according to one or more implementations described herein.

DETAILED DESCRIPTION

Figure 1:
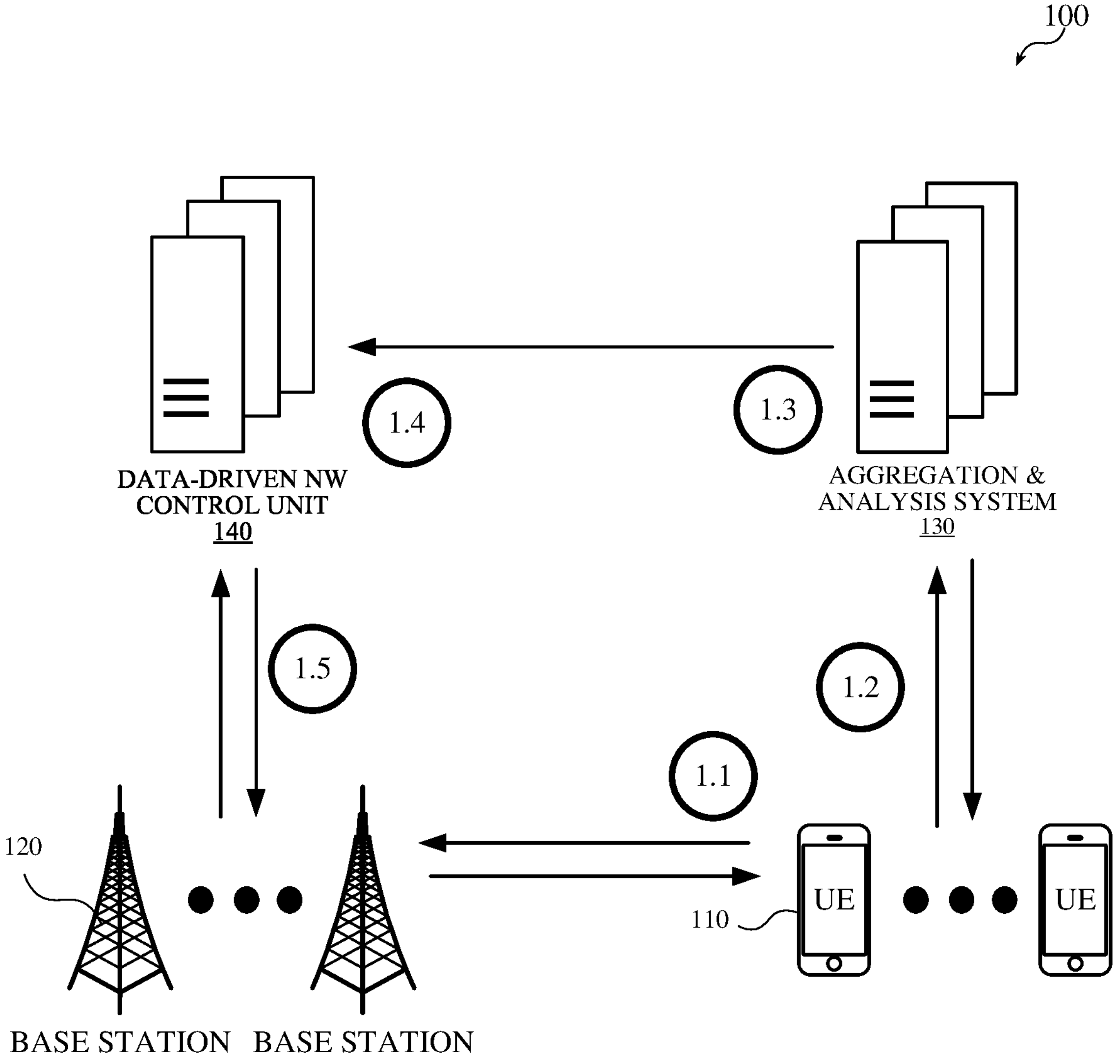
FIG. 1 is a diagram of an example overview of one or more of the techniques described herein.

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Wireless communication networks may include user equipment (UEs) capable of communicating with base stations and/or other network access nodes. The base stations may provide UEs with access to a core network (CN) and additional external networks, such as the Internet. UEs and base stations may implement various techniques and communications standards for enabling UEs and base stations to discover one another, establish and maintain connectivity, and exchange information in an ongoing manner. Objectives of such techniques may include connection reliability, seamless connectivity between devices, multiple points of connection, quality of service and throughput rates, and more.

Networks and UEs may be capable of understanding and predicting user context and behavior, based on user-and-device interactions, device sensors, etc. A UE may use this contextual understanding, in addition to its connectivity history, to predict connectivity changes/needs from the network and recommended network configurations. With the evolution of artificial intelligence (AI) models (also referred to as a predictive model) that have shown an ability to learn from data, networks may benefit from user data to guide its decisions and configuration, and to tailor its resources toward user needs more efficiently.

Based on user contextual prediction, a UE may share with the network information about the connectivity needs or conditions (e.g., high traffic, medium traffic, low traffic), so that network may adapt accordingly (e.g., by reducing interference, adjusting resources, etc.). The network may infer from predicted and real-time contextual data, shared by a UE, to make a particular configuration decisions or take certain configuration actions. The network may learn from aggregated data or federated statistics of many UEs, which may be shared cyclically by an aggregation server.

Data may be shared either as a statistical aggregate from many users, user telemetry statistics, or categorical and/or qualitative (e.g., indoor or outdoor, high or low, voice call, video call or streaming, etc.). Data may either be historical (e.g., prior to a time window), a live prediction (e.g., within sub-seconds), or a forecast (e.g., within minutes). Data may be provided along with a validity time window. Not all data may be shared due to privacy constraints, and therefore levels of privacy and sensitivity have been defined to distinguish privacy information from other type of information and distinguish levels of privacy between types of privacy information.

Data driven approaches may be designed as an attempt to help network vendors use analytics and AI (or machine learning (ML)) techniques to improve radio access network (RAN) features and network operations. RAN features optimizations may be based on key performance indicators (KPIs) that must benefit both network and the UE. The network may take advantage of shared UE information to build better RAN automation models. For example, shared UE data may be used by the network to train and improve a ML model and in turn help the network improve scheduling, resource management, mobility, etc. However, because of the private nature of the shared UE information, the information must be shared in a privacy-preserving manner.

The techniques described herein enable a network to collect and use user data to optimize network performance, improve resource allocations, enhance the user experience, etc., while still respecting and preserving the privacy of the user and UE. These techniques may include UEs applying privacy procedures to share context and connectivity information with the network, and UEs using modeling and machine learning to develop configuration recommendations sent to base stations. The techniques may also include systems that aggregate and analyze UE and connectivity information, and systems that use aggregated data for modeling, training, and configuring base stations.

The techniques described herein address deficiencies of currently available network technology in addition to providing further benefits. For example, the techniques described herein may have wide-spread applicability by being designed to have little or no impact on wireless standards or protocols. The techniques may also provide end-to-end (e.g., UE to network) performance improvement since: 1) base stations may have more input from UEs to guide resource and cellular connectivity management; 2) UE and network conclusions or decisions may be shared with network operators to help optimize connectivity services; and 3) the network may be optimized end-to-end given that information is shared and coordinated between UE and network. One or more of the techniques described herein may also enhance user experience by: 1) the user sharing proactively and continuously information with network to facilitate network service and reliability optimization; and 2) the network sharing context information with the UE to enable better informed decisions resulting in a better and smoother experience to the user.

FIG. 1 is a diagram of an example overview 100 of one or more of the implementations described herein. As shown, example overview may include one or more UEs 110, base station 222, aggregation and analysis system 130 (also referred to as A&A system, UE A&A system, etc.), and data-driven NW control unit 140 (also referred to as NW control unit, NW controller, etc.). These system and devices may share information and operate cooperatively to enhance network accessibility and performance, optimize resource allocations, improve user experience, while still protecting the privacy of individual users.

At 1.1, UE 110 may apply connection context data and user activity data machine learning tools and models to determine whether a current configuration between base station 120 and UE 110 should change or remain the same. When UE 110 determines that things should change, UE 110 may produce a configuration recommendation and sent eh configuration recommendation to base station 120.

At 1.2, UE 110 may provide aggregation and analysis system 130 with one or more types of data to enable aggregation and analysis system 130 to aggregate UE information. In so doing, UE 110 may ensure that information provided to aggregation and analysis system 130 does not include private information, such as information about the user of UE 110 or information that may be used to identify UE 110 or information about UE 110 in particular.

At 1.3, aggregation and analysis system 130 may collect non-private information from multiple UEs 110. Aggregation and analysis system 130 may use the information, in combination with machine learning and modeling tools, to create models of different aspects, conditions, or portions of the network. As aggregation and analysis system 130 continues to receive more information from UEs 110, aggregation and analysis system 130 may use the increased dataset to train and improve predictive models and other machine learning tools. Aggregation and analysis system 130 may also provide models and datasets to other devices, such as UEs 110, base station 120, and data-driven NW control unit 140.

At 1.4, data-driven NW control unit 140 may receive predictive models from aggregation and analysis system 130 and use the predictive models to enhance the operation of the network. For example, at 1.5, when base station 120 receives a configuration recommendation from UE 110, data-driven NW control unit 140 may aid base station 120 in determining whether to implement the recommended configuration. Data-driven NW control unit 140 may do so by receiving the recommended configuration and applying the recommended configuration to a predictive model, or by providing base station 120 with the predictive model so that base station 120 may evaluate the recommended configuration independently. Many additional features, examples, details, and benefits are discussed below with reference to the Figures.

Generally, user context (also referred to herein as user activity data, user context data, UE context data, etc.) may include information describing a state of operation of UE 110, usage, or activity of UE 110, activity or a state of being of a user of UE 110, etc. User context data may be based on device sensors, operations or applications executed by UE 110, user interaction with UE 110, historical user data, and more. Examples of user context may include usage patterns a UE in general, usage patterns of UE resources (e.g., processors, memory, battery, etc.), UE activity in relation to a date, time, geographic location, etc., patterns of UE activity, the use or nonuse of software applications and/or operating system features, etc. When processed and analyzed, use context data may include a schedule of a user, an intent of a user, a prediction of what a user may do next or at a point in time in the future, and more.

UE connectivity context (also referred to herein as UE connectivity context data, connectivity context data, a connectivity context, etc.) may include information relating to UE 110 being connected to a network (e.g., base station 120) and characteristics of the connection. Examples of UE connectivity context data may include a type of connectivity or connection, connectivity usage information, quality of experience (QoE) information, quality of service (QoS) information, intensity of traffic, type, cellular state, and NW context information, and more.

NW context (also referred to herein as NW context data, NW context information, etc.) may include information about a state, status, and/or operating condition of one or more characteristics of a network, a portion of a network (e.g., a cell), or a particular network device (e.g., a base station) or group of network devices. Examples of NW context may include information about the conditions of a cell or base station 120 in terms of resource availability, signaling congestions, cell quality, signal quality, etc.

Figure 2:
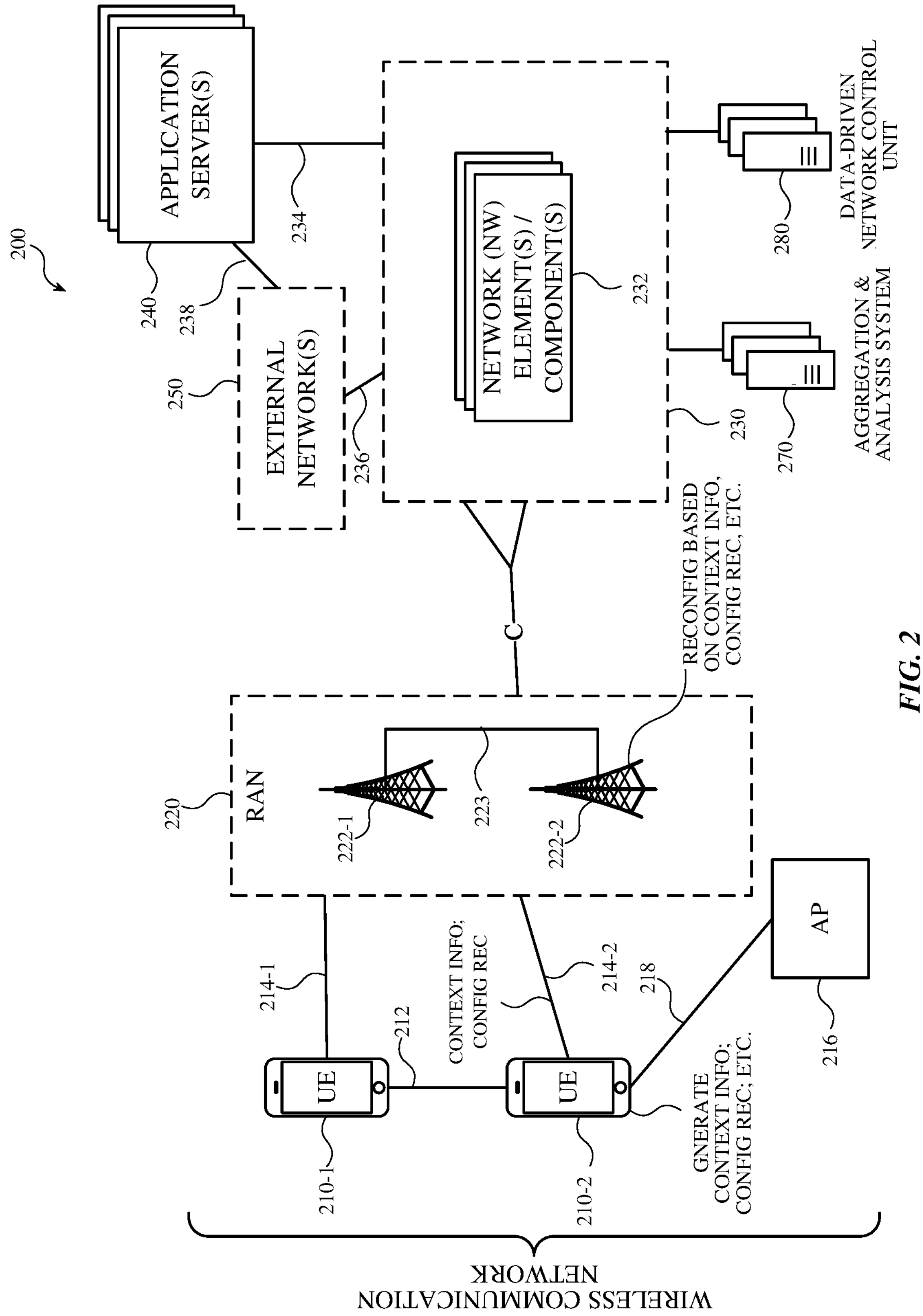
FIG. 2 is a diagram of an example network according to one or more implementations described herein.

FIG. 2 is an example network 200 according to one or more implementations described herein. Example network 200 may include UEs 210-1, 210-2, etc. (referred to collectively as "UEs 210" and individually as "UE 210"), a radio access network (RAN) 220, a core network (CN) 230, application servers 240, and external networks 250.

The systems and devices of example network 200 may operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of example network 200 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 210 may include smartphones (e.g., handheld touchscreen mobile computing devices connectable to one or more wireless communication networks). Additionally, or alternatively, UEs 210 may include other types of mobile or non-mobile computing devices capable of wireless communications, such as personal data assistants (PDAs), pagers, laptop computers, desktop computers, wireless handsets, etc. In some implementations, UEs 210 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 210 may communicate and establish a connection with one or more other UEs 210 via one or more wireless channels 212, each of which may comprise a physical communications interface/layer. The connection may include an M2M connection, MTC connection, D2D connection, SL connection, etc. The connection may involve a PC5 interface. In some implementations, UEs 210 may be configured to discover one another, negotiate wireless resources between one another, and establish connections between one another, without intervention or communications involving RAN node 222 or another type of network node. In some implementations, discovery, authentication, resource negotiation, registration, etc., may involve communications with RAN node 222 or another type of network node.

UEs 210 may use one or more wireless channels 212 to communicate with one another. As described herein, UE 210-1 may communicate with RAN node 222 to request SL resources. RAN node 222 may respond to the request by providing UE 210 with a dynamic grant (DG) or configured grant (CG) regarding SL resources. A DG may involve a grant based on a grant request from UE 210. A CG may involve a resource grant without a grant request and may be based on a type of service being provided (e.g., services that have strict timing or latency requirements). UE 210 may perform a clear channel assessment (CCA) procedure based on the DG or CG, select SL resources based on the CCA procedure and the DG or CG; and communicate with another UE 210 based on the SL resources. The UE 210 may communicate with RAN node 222 using a licensed frequency band and communicate with the other UE 210 using an unlicensed frequency band.

UEs 210 may communicate and establish a connection with (e.g., be communicatively coupled) with RAN 220, which may involve one or more wireless channels 214-1 and 214-2, each of which may comprise a physical communications interface/layer. In some implementations, a UE may be configured with dual connectivity (DC) as a multi-radio access technology (multi-RAT) or multi-radio dual connectivity (MR-DC), where a multiple receive and transmit (Rx/Tx) capable UE may use resources provided by different network nodes (e.g., 222-1 and 222-2) that may be connected via non-ideal backhaul (e.g., where one network node provides NR access and the other network node provides either E-UTRA for LTE or NR access for 5G). In such a scenario, one network node may operate as a master node (MN) and the other as the secondary node (SN). The MN and SN may be connected via a network interface, and at least the MN may be connected to the CN 230. Additionally, at least one of the MN or the SN may be operated with shared spectrum channel access, and functions specified for UE 210 can be used for an integrated access and backhaul mobile termination (IAB-MT). Similar for UE 210, the IAB-MT may access the network using either one network node or using two different nodes with enhanced dual connectivity (EN-DC) architectures, new radio dual connectivity (NR-DC) architectures, or the like. In some implementations, a base station (as described herein) may be an example of network node 222.

As described herein, UE 210 may receive and store one or more configurations, instructions, and/or other information for enabling SL-U communications with quality and priority standards. A PQI may be determined and used to indicate a QoS associated with an SL-U communication (e.g., a channel, data flow, etc.). Similarly, an L1 priority value may be determined and used to indicate a priority of an SL-U transmission, SL-U channel, SL-U data, etc. The PQI and/or L1 priority value may be mapped to a CAPC value, and the PQI, L1 priority, and/or CAPC may indicate SL channel occupancy time (COT) sharing, maximum (MCOT), timing gaps for COT sharing, LBT configuration, traffic and channel priorities, and more.

As shown, UE 210 may also, or alternatively, connect to access point (AP) 216 via connection interface 218, which may include an air interface enabling UE 210 to communicatively couple with AP 216. AP 216 may comprise a wireless local area network (WLAN), WLAN node, WLAN termination point, etc. The connection interface 218 may comprise a local wireless connection, such as a connection consistent with any IEEE 702.11 protocol, and AP 216 may comprise a wireless fidelity router or other AP. While not explicitly depicted in FIG. 2, AP 216 may be connected to another network (e.g., the Internet) without connecting to RAN 220 or CN 230. In some scenarios, UE 210, RAN 220, and AP 216 may be configured to utilize LTE-WLAN aggregation (LWA) techniques or LTE WLAN radio level integration with IPsec tunnel (LWIP) techniques. LWA may involve UE 210 in RRC_CONNECTED being configured by RAN 220 to utilize radio resources of LTE and WLAN. LWIP may involve UE 210 using WLAN radio resources (e.g., connection interface 218) via IPsec protocol tunneling to authenticate and encrypt packets (e.g., Internet Protocol (IP) packets) communicated via connection interface 218. IPsec tunneling may include encapsulating the entirety of original IP packets and adding a new packet header, thereby protecting the original header of the IP packets.

RAN 220 may include one or more RAN nodes 222-1 and 222-2 (referred to collectively as RAN nodes 222, and individually as RAN node 222) that enable channels 214-1 and 214-2 to be established between UEs 210 and RAN 220. RAN nodes 222 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 222 may include a roadside unit (RSU), a transmission reception point (TRxP or TRP), and one or more other types of ground stations (e.g., terrestrial access points). In some scenarios, RAN node 222 may be a dedicated physical device, such as a macrocell base station, and/or a low power (LP) base station for providing femtocells, picocells or the like having smaller coverage areas, smaller user capacity, or higher bandwidth compared to macrocells.

Some or all of RAN nodes 222, or portions thereof, may be implemented as one or more software entities running on server computers as part of a virtual network, which may be referred to as a centralized RAN (CRAN) and/or a virtual baseband unit pool (vBBUP). In these implementations, the CRAN or vBBUP may implement a RAN function split, such as a packet data convergence protocol (PDCP) split wherein radio resource control (RRC) and PDCP layers may be operated by the CRAN/vBBUP and other Layer 2 (L2) protocol entities may be operated by individual RAN nodes 222; a media access control (MAC)/physical (PHY) layer split wherein RRC, PDCP, radio link control (RLC), and MAC layers may be operated by the CRAN/vBBUP and the PHY layer may be operated by individual RAN nodes 222; or a "lower PHY" split wherein RRC, PDCP, RLC, MAC layers and upper portions of the PHY layer may be operated by the CRAN/vBBUP and lower portions of the PHY layer may be operated by individual RAN nodes 222. This virtualized framework may allow freed-up processor cores of RAN nodes 222 to perform or execute other virtualized applications.

In some implementations, an individual RAN node 222 may represent individual gNB-distributed units (DUs) connected to a gNB-control unit (CU) via individual F1 or other interfaces. In such implementations, the gNB-DUs may include one or more remote radio heads or radio frequency (RF) front end modules (RFEMs), and the gNB-CU may be operated by a server (not shown) located in RAN 220 or by a server pool (e.g., a group of servers configured to share resources) in a similar manner as the CRAN/vBBUP. Additionally, or alternatively, one or more of RAN nodes 222 may be next generation eNBs (i.e., gNBs) that may provide evolved universal terrestrial radio access (E-UTRA) user plane and control plane protocol terminations toward UEs 210, and that may be connected to a 5G core network (5GC) 230 via an NG interface.

Any of the RAN nodes 222 may terminate an air interface protocol and may be the first point of contact for UEs 210. In some implementations, any of the RAN nodes 222 may fulfill various logical functions for the RAN 220 including, but not limited to, radio network controller (RNC) functions such as radio bearer management, uplink and downlink dynamic radio resource management and data packet scheduling, and mobility management. UEs 210 may be configured to communicate using orthogonal frequency-division multiplexing (OFDM) communication signals with each other or with any of the RAN nodes 222 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals may comprise a plurality of orthogonal subcarriers.

In some implementations, a downlink resource grid may be used for downlink transmissions from any of the RAN nodes 222 to UEs 210, and uplink transmissions may utilize similar techniques. The grid may be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block may comprise a collection of resource elements (REs); in the frequency domain, this may represent the smallest quantity of resources that currently may be allocated. There are several different physical downlink channels that are conveyed using such resource blocks.

Further, RAN nodes 222 may be configured to wirelessly communicate with UEs 210, and/or one another, over a licensed medium (also referred to as the "licensed spectrum" and/or the "licensed band"), an unlicensed shared medium (also referred to as the "unlicensed spectrum" and/or the "unlicensed band"), or combination thereof. In an example, a licensed spectrum may include channels that operate in the frequency range of approximately 400 MHz to approximately 3.8 GHz, whereas the unlicensed spectrum may include the 5 GHz band. A licensed spectrum may correspond to channels or frequency bands selected, reserved, regulated, etc., for certain types of wireless activity (e.g., wireless telecommunication network activity), whereas an unlicensed spectrum may correspond to one or more frequency bands that are not restricted for certain types of wireless activity. Whether a particular frequency band corresponds to a licensed medium or an unlicensed medium may depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 210 and the RAN nodes 222 may operate using stand-alone unlicensed operation, licensed assisted access (LAA), eLAA, and/or feLAA mechanisms. In these implementations, UEs 210 and the RAN nodes 222 may perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

The LAA mechanisms may be built upon carrier aggregation (CA) technologies of LTE-Advanced systems. In CA, each aggregated carrier is referred to as a component carrier (CC). In some cases, individual CCs may have a different bandwidth than other CCs. In time division duplex (TDD) systems, the number of CCs as well as the bandwidths of each CC may be the same for DL and UL. CA also comprises individual serving cells to provide individual CCs. The coverage of the serving cells may differ, for example, because CCs on different frequency bands will experience different pathloss. A primary service cell or PCell may provide a primary component carrier (PCC) for both UL and DL and may handle RRC and non-access stratum (NAS) related activities. The other serving cells are referred to as SCells, and each SCell may provide an individual secondary component carrier (SCC) for both UL and DL.

The PDSCH may carry user data and higher layer signaling to UEs 210. The physical downlink control channel (PDCCH) may carry information about the transport format and resource allocations related to the PDSCH channel, among other things. The PDCCH may also inform UEs 210 about the transport format, resource allocation, and hybrid automatic repeat request (HARQ) information related to the uplink shared channel. Typically, downlink scheduling (e.g., assigning control and shared channel resource blocks to UE 210-2 within a cell) may be performed at any of the RAN nodes 222 based on channel quality information fed back from any of UEs 210. The downlink resource assignment information may be sent on the PDCCH used for (e.g., assigned to) each of UEs 210.

The PDCCH uses control channel elements (CCEs) to convey the control information, wherein several CCEs (e.g., 6 or the like) may consists of a resource element groups (REGs), where a REG is defined as a physical resource block (PRB) in an OFDM symbol. Before being mapped to resource elements, the PDCCH complex-valued symbols may first be organized into quadruplets, which may then be permuted using a sub-block interleaver for rate matching, for example. Each PDCCH may be transmitted using one or more of these CCEs, where each CCE may correspond to nine sets of four physical resource elements known as REGs. Four quadrature phase shift keying (QPSK) symbols may be mapped to each REG. The PDCCH may be transmitted using one or more CCEs, depending on the size of the DCI and the channel condition. There may be four or more different PDCCH formats defined in LTE with different numbers of CCEs (e.g., aggregation level, L=1, 2, 4, 8, or 26).

Some implementations may use concepts for resource allocation for control channel information that are an extension of the above-described concepts. For example, some implementations may utilize an extended (E)-PDCCH that uses PDSCH resources for control information transmission. The EPDCCH may be transmitted using one or more ECCEs. Similar to the above, each ECCE may correspond to nine sets of four physical resource elements known as EREGs. An ECCE may have other numbers of EREGs in some situations.

The RAN nodes 222 may be configured to communicate with one another via interface 223. In implementations where the system is an LTE system, interface 223 may be an X2 interface. In NR systems, interface 223 may be an Xn interface. The X2 interface may be defined between two or more RAN nodes 222 (e.g., two or more eNBs/gNBs or a combination thereof) that connect to evolved packet core (EPC) or CN 230, or between two eNBs connecting to an EPC. In some implementations, the X2 interface may include an X2 user plane interface (X2-U) and an X2 control plane interface (X2-C). The X2-U may provide flow control mechanisms for user data packets transferred over the X2 interface and may be used to communicate information about the delivery of user data between eNBs or gNBs. For example, the X2-U may provide specific sequence number information for user data transferred from a master eNB (MeNB) to a secondary eNB (SeNB); information about successful in sequence delivery of PDCP packet data units (PDUs) to a UE 210 from an SeNB for user data; information of PDCP PDUs that were not delivered to a UE 210; information about a current minimum desired buffer size at the SeNB for transmitting to the UE user data; and the like. The X2-C may provide intra-LTE access mobility functionality (e.g., including context transfers from source to target eNBs, user plane transport control, etc.), load management functionality, and inter-cell interference coordination functionality.

As shown, RAN 220 may be connected (e.g., communicatively coupled) to CN 230. CN 230 may comprise a plurality of network elements 232, which are configured to offer various data and telecommunications services to customers/subscribers (e.g., users of UEs 210) who are connected to the CN 230 via the RAN 220. In some implementations, CN 230 may include an evolved packet core (EPC), a 5G CN, and/or one or more additional or alternative types of CNs. The components of the CN 230 may be implemented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 230 may be referred to as a network slice, and a logical instantiation of a portion of the CN 230 may be referred to as a network sub-slice. Network Function Virtualization (NFV) architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

As shown, CN 230, application servers 240, and external networks 250 may be connected to one another via interfaces 234, 236, and 238, which may include IP network interfaces. Application servers 240 may include one or more server devices or network elements (e.g., virtual network functions (VNFs) offering applications that use IP bearer resources with CN 230 (e.g., universal mobile telecommunications system packet services (UMTS PS) domain, LTE PS data services, etc.). Application servers 240 may also, or alternatively, be configured to support one or more communication services (e.g., voice over IP (VoIP sessions, push-to-talk (PTT) sessions, group communication sessions, social networking services, etc.) for UEs 210 via the CN 230. Similarly, external networks 250 may include one or more of a variety of networks, including the Internet, thereby providing the mobile communication network and UEs 210 of the network access to a variety of additional services, information, interconnectivity, and other network features.

UEs 210, base stations 222, aggregation and analysis system 270, and data-driven NW control unit 280 may coordinate and cooperate with one another to enhance the efficiency and effectiveness of a wireless communication network by implementing machine learning tools at each device and exchanging information in a manner that enables the training, development, and use of models. Information of various levels of privacy may be exchanged, protected, anonymized, etc., to enable UE-assisted privacy-aware data-driven NW control while still protecting the privacy of individual users.

Aggregation and analysis system 270 may include one or more servers, server devices, or network elements (e.g., VNFs) configured to send, receive, process, and/or store information. Aggregation and analysis system 270 may receive and aggregate information from multiple UEs 210. Aggregation and analysis system 270 may implement one or more types of machine learning, neural networks, and/or artificial intelligence tools, and use aggregated UE data and machine learning tools to create models, train models, update models, and use models to analyze a given data set or scenario relating to a network. Aggregation and analysis system 270 may also distribute models to UEs 210 and/or data-driven NW control unit 280 to facilitate UE-assisted privacy-aware data-driven NW control.

Figure 3:
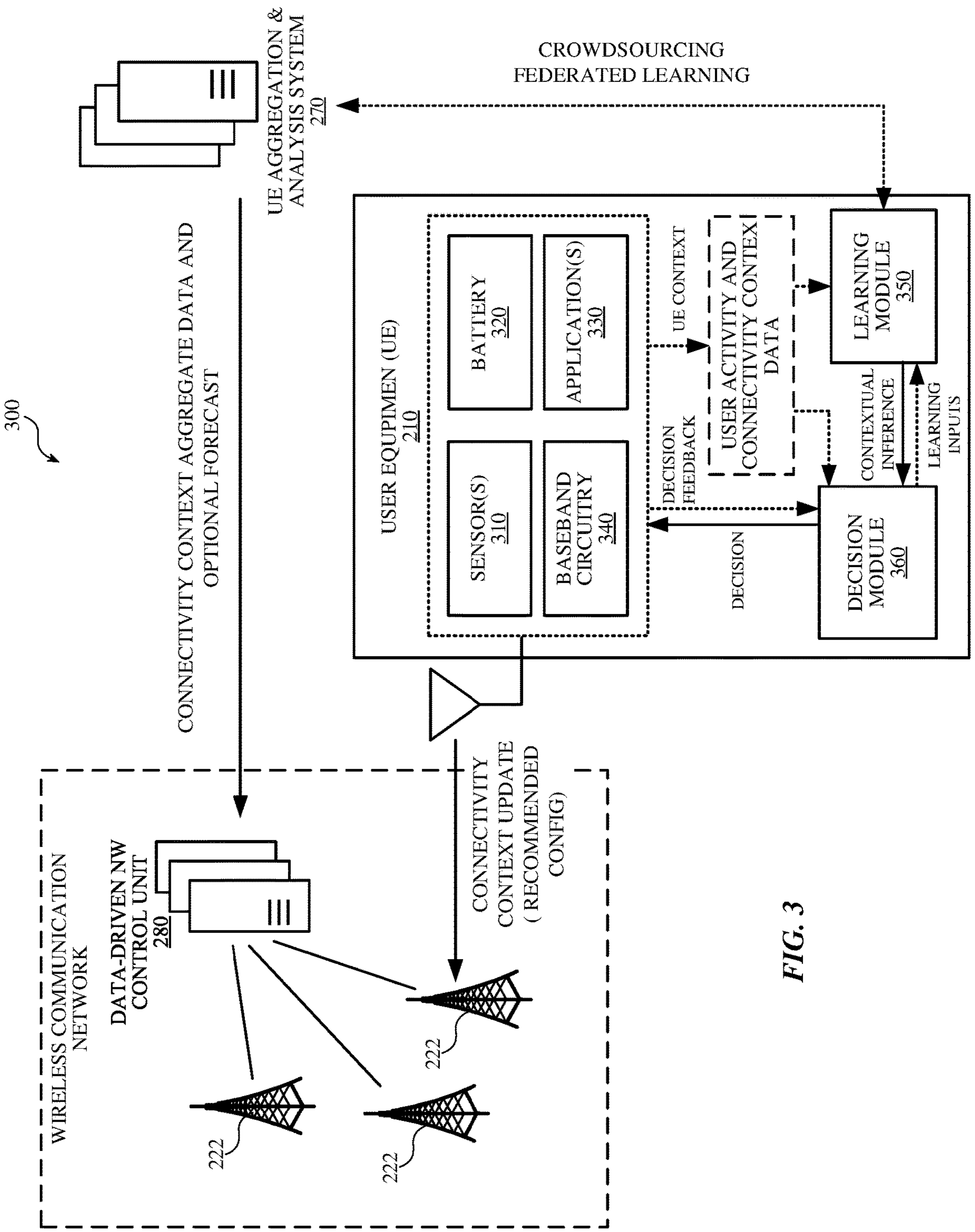
FIG. 3 is a diagram of an example system for user equipment (UE) assisted, privacy-aware, data-driven network (NW) control according to one or more implementations described herein.

Data-driven NW control unit 280 may include one or more servers, server devices, or network elements (e.g., VNFs) configured to send, receive, process, and/or store information. Data-driven NW control unit 280 may be configured to configure and/or control one or more aspects of a network, including base stations 222 and configurations used by base stations 222 and UEs 210 to communicate with one another. Data-driven NW control unit 280 may implement one or more types of machine learning, neural networks, and/or artificial intelligence tools to create, train, update, and use models to enable UE-assisted privacy-aware data-driven NW control. Data-driven NW control unit 280 may send and receive models and data relevant to using models from UEs 210, base stations 222, and/or aggregation and analysis system 270. and FIG. 3 is a diagram of an example 300 of connectivity context sharing according to one or more implementations described herein. As shown, example system 300 includes UE 210, base stations 222, aggregation and analysis system 270, and data-driven NW control unit 280. Aggregation and analysis system 270 is depicted as being outside of a wireless communication network that includes base stations 222 and data-driven NW control unit 280. However, the techniques described herein are not limited to such an arrangement or configuration and indeed include many other types of arrangements, including centralized systems, distributed systems, a single network, multiple networks, and so on.

As shown, UE 210 may include one or more components such as one or more sensors 310, battery 320, applications 330, and baseband circuitry 340, learning module 350, and decision module 360. Sensors 310 may include one or more circuits, devices, or other features capable of capturing a type of sensory information (e.g., light, temperature, acceleration, electrical signaling, power usage, etc.) and converting the information sensory information to digital information usable by a processor and/or other type of component of UE 210. Sensors 310 may also be configured to monitor user activity (e.g., user inputs, usage amounts, application usage, etc.). Battery 320 may include a rechargeable power source that enables the components of UE 210 to operate and the UE 210 to be mobile.

Baseband circuitry 340 may include components, such as a central processing unit (CPU), memory, communication interfaces, supporting circuitry and more. In some implementations, operations described as being performed by a baseband processor may also, or alternatively, be performed by baseband circuitry that may one or more baseband processors and other components, such as a memory device, communication interfaces, and so on. An example of a device that includes several components, including baseband circuitry and multiple baseband processors is described below with reference to FIG. 34.

Application 330 may include a mobile software application, operating systems feature or tool, etc., that is executable by UE 210. Application 330 may be executed or enabled by hardware components of UE 210, such as a general processor, CPU, or application circuitry that may include one or more application processors. The processors may include any combination of general-purpose processors and dedicated processors (e.g., graphics processors, application processors, etc.). The processors may be coupled with or may include memory/storage and can be configured to execute instructions stored in a memory or storage device to enable the execution of application 330 to run on UE 210. Application 330 may be stored in a long-term storage device of UE 210 and executed by a combination of a memory device, processors, internal circuitry, and interfaces of UE 210. An example of application 330 may include a communications application that enables users of different UEs 210 to communicate with one another, a multimedia application that enables users to upload and/or download video, music, or multimedia data, and so on.

Learning module 350 and decision module 360 may include a combination of hardware and/or software configured to implement one or more AI, machine learning, or neural network techniques. Learning module may be configured to receive, use, and update models and other information, received from aggregation and analysis system 270, for generating a recommended configuration sent to base station 222. For example, UE 210 may be configured to produce UE context data, which may comprise user activity data and connectivity context information. Generally, UE context data may include information relevant to a status, condition and usage of UE 210. Examples of UE context data may include information about what UE 210 is doing (e.g., what software is being executed, what information is being sent and received, etc.), how a user is interacting with UE 210, a connection between UE 210 and base station 222, and how the connection is being used.

Learning module 350 may apply the UE context data to a machine learning model to generate a contextual inference. A contextual inference (also referred to herein as simply "inference") may include a determination, assumption, deduction, prediction, or the like about a current or future condition, preference, or capability of another device. For example, a contextual inference may include a future preference of UE 210 based on a current context, circumstances, capabilities, or conditions of UE 210. Learning module 350 may include a predictive model trained on historical user activity data and historical connectivity context data of UE 210 and/or other UEs 210.

In some implementations, learning module 350 may also generate a contextual inference based on historical information about UE 210, the user of UE 210, and/or such information about other users and UEs 210. A contextual inference may include an inference about how UE 210 is to be used and what type of network configuration or resource allocation is therefore recommended for UE 210. Learning module 350 may send the contextual inference to decision module 360 with a level of confidence, and decision module 360 may determine whether UE 210 should proceed in accordance with the contextual inference. Based on the determination, decision module 360 may generate a decision signal or message, prompting UE 210 to proceed in accordance with the decision.

As an example, the intelligence componentry of UE 210 (e.g., learning module 350) may determine or make a contextual inference that based on the UE context data, history of the user, data about other UEs 210, etc., that the user of UE 210 is going to take a routine nap. Learning module 350 may send the contextual inference, which may include a confidence level, to decision module 360, and decision module 360 may determine whether UE 210 should ignore the contextual inference or act on the contextual inference. For instance, when the confidence level is above a predetermined threshold, decision module 360 may cause UE 210 to generate a recommended configuration (or reconfiguration) to be sent to base station 222. UE 210 may also send connectivity context data, which may include an indication that UE 210 anticipates little to no traffic for 20 minutes. The recommended configuration for such a scenario may, for example, conserve batter life of UE 210, enable base station 222 to reallocate network resources to another UE 210 for more effective load balancing, and result in UE 210 switching to a less consuming RAT, cell, or band. The connectivity context data and recommended configuration may also enable base station 222 to perform load balancing with greater efficiency.

Some or all of the above information (e.g., user activity data, connectivity context data, recommended configuration, etc.) may also be sent to aggregation and analysis system 270. This is represented in FIG. 3 as crowdsource federated learning. In sending information, UE 210 may apply appropriate processing and filtering to ensure device and user privacy standards are kept. Providing the information, may increase the amount and diversity of aggregated data stored by aggregation and analysis system 270. The increased amount and diversity of the aggregated data may better enable aggregation and analysis system 270 to create better network optimization models and provide more accurate network forecasts to data-driven NW control unit 280.

Data-driven NW control unit 280 may use the network optimization models and network forecasts from aggregation and analysis system 270 to recommend configurations for one or more base stations 222 throughout the wireless communications network. When feedback is received from the network (e.g., from base station 222 regarding a recommended configuration), decision feedback information may be used to improve the decisions of decision module 360. The decision feedback information may also be used as learning inputs for learning module 350, thus enabling learning module 350 to increase an amount of training data used to improve machine learning models for subsequent contextual inferences.

UE connectivity context (also referred to herein as UE connectivity context data, connectivity context data, a connectivity context, etc.) may include information relating to UE 110 being connected to a network (e.g., base station 120) and characteristics of the connection. Examples of UE connectivity context data may include a type of connectivity or connection, connectivity usage information, quality of experience (QoE) information, quality of service (QoS) information, intensity of traffic, type, cellular state, and NW context information, and more.

Aggregated data, as described herein, may be include information collected from multiple UEs 110 and used to represent an overall condition, quality, status, pattern, level, degree, etc., of a feature, aspect, or characterization of a network or one or more devices (e.g., base stations 120, UEs 110, etc.). Aggregated data may be expressed as a distribution data model, histogram, plot of relative datapoints, a statistical measure (e.g., means, variance, etc.), and/or one of more other types of informational representations. Individual telemetry data (also referred to as telemetry information or data) may include an informational representation of connectivity activity patters of one or more UEs 110 over time.

Figure 4:
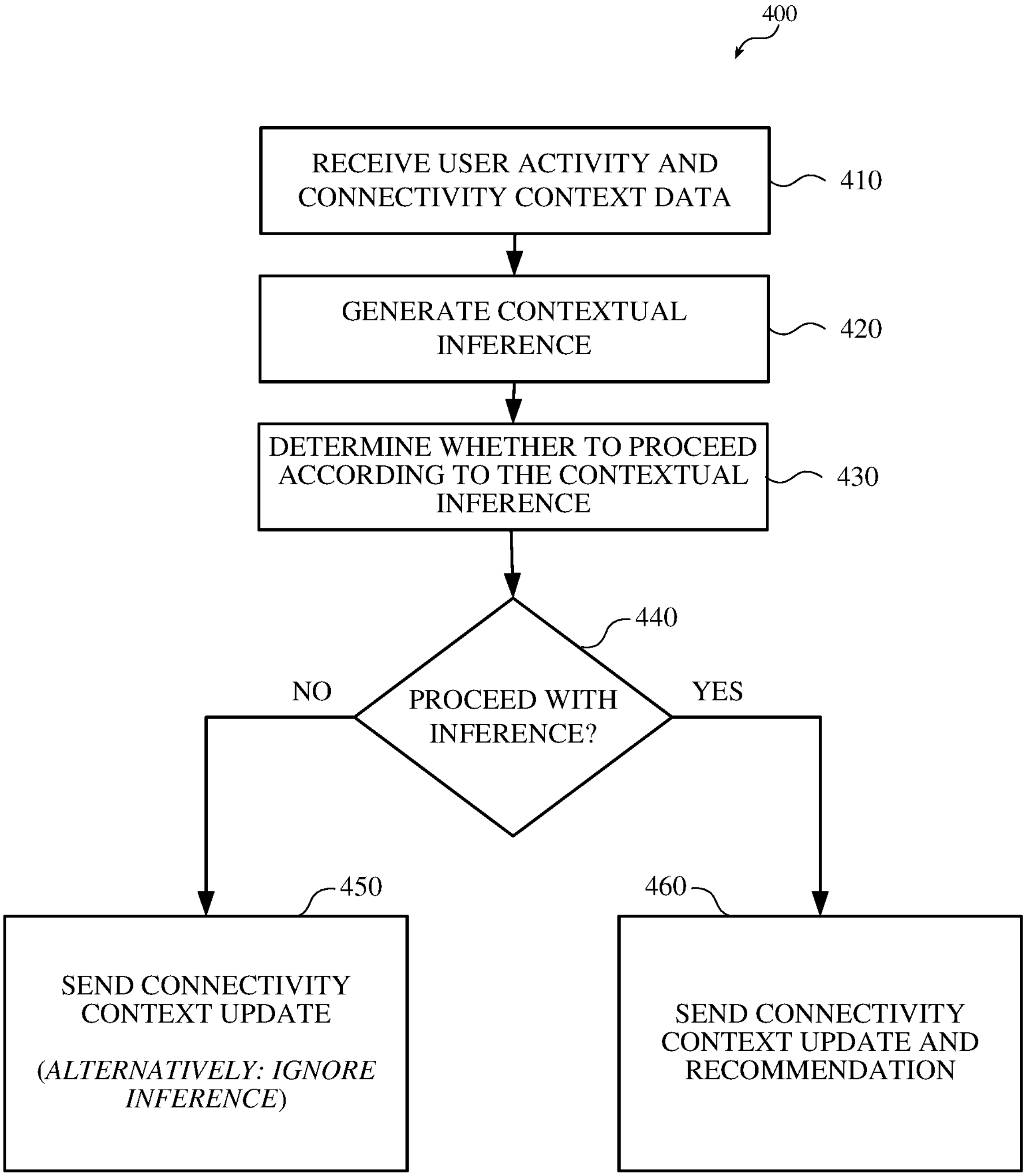
FIG. 4 is a diagram of an example of a process for generating a contextual inference according to one or more implementations described herein.

FIG. 4 is a diagram of an example of a process for generating a contextual inference according to one or more implementations described herein. Process 400 may be implemented by UE 210. In some implementations, some or all of process 400 may be performed by one or more other systems, devices, or components, including one or more of those of FIGS. 2 and/or 3. Additionally, process 400 may include one or more fewer, additional, differently ordered and/or arranged operations than those shown in FIG. 4. In some implementations, some or all of the operations of process 400 may be performed independently, successively, simultaneously, etc., of one or more of the other operations of process 400. As such, the techniques described herein are not limited to a number, sequence, arrangement, timing, etc., of the operations or process depicted in FIG. 4. Indeed, the techniques described herein may include additional and alternative versions of process 400.

As shown, process 400 may include receiving user activity and connectivity context data (block 410). For example, learning module 350 of UE 210 may receive user activity and connectivity context data. Process 400 may include generating a contextual inference (block 420). For example, learning module 350 of UE 210 may apply the user activity and connectivity context data as inputs to one or more machine learning models to generate a contextual inference. The contextual inference may include information predicting or forecasting a state of operation, type of connectivity, etc., of UE 210. The contextual inference may also include an indication of a level of confidence about the prediction.

Process 400 may include determine whether to proceed according to the contextual inference (block 430). For example, decision module 360 of UE 210 may determine, based on the contextual inference and/or the level of confidence, whether to cause UE 210 to proceed in accordance with the contextual inference. In some implementations, this may include decision module 360 of UE 210 merely recommending that a new connectivity configuration be used. In some implementations, this may also, or alternatively, include decision module 360 of UE 210 determining the details of recommended configuration. Decision module 360 of UE 210 may also, or alternatively, determine whether to proceed by sending updated connectivity context data to base station 222. The updated connectivity context data may be used by base station 222 to determine whether to change the connectivity of UE 210. The updated connectivity context data may also, or alternatively, be forwarded to aggregation and analysis system 270 to facilitate crowdsourcing federated learning.

When UE 210 determines not to proceed with the inference (block 440—No) process 400 may include sending a connectivity context update (block 450). For example, when UE 210 decides not to proceed, UE 210 may still send a connectivity context update to base station 222. The connectivity context update may include some or all of the user activity data and/or connectivity context data (e.g., after UE 210 processes the data to ensure privacy). Base station 222 may use the connectivity context update to change the connectivity of UE 210 even though a configuration recommendation was not sent. Base station may also, or alternatively, send the connectivity context update to aggregation and analysis system 270. Alternatively, when UE 210 decides not to proceed (block 440—NO), UE 210 may simply ignore the contextual inference (block 450—alternatively).

When UE 210 determines to proceed with the contextual inference (block 440—Yes) process 400 may include sending a connectivity context update and a configuration recommendation (block 460). For example, when UE 210 decides to proceed, UE 210 may determine a recommended configuration based on the contextual inference. Additionally, UE 210 may send a connectivity context update and the configuration recommendation to base station 222. The connectivity context update may include some or all of the user activity data and/or connectivity context data (e.g., after UE 210 processes the data to ensure privacy). The recommended configuration may include information describing the manner (e.g., radio resources, durations, etc.) in which UE 210 recommends that connectivity be reconfigured.

FIG. 5 is a diagram of an example of a table 500 associating levels of privacy with different types of data according to one or more implementations described herein. As shown, the columns of table 500 may include privacy level, data type, description and examples, and connectivity context data. The rows of table 500 may include descending levels of privacy from level 1 to level 5.

Generally, the techniques, described herein, may include systems and devices sharing of information with one another. Examples of such sharing may include information shared between UE 210 and base station 222; information shared between UE 210 and aggregation and analysis system 270; and information shared between data-driven NW control unit 280 and aggregation and analysis system 270. Depending on the scenario, the shared information may include aggregated data, individual telemetry data, categorical data, individual explicit data, and more. Some information may not be share. Other information may not be shared unless it is anonymized or generalized to a degree consistent with that agreed upon by a user of UE 210 and the network (e.g., base station 222, aggregation and analysis system 270, or data-driven NW control unit 280).

Aggregated data, as described herein, may be include information collected from multiple UEs 110 and used to represent an overall condition, quality, status, pattern, level, degree, etc., of a feature, aspect, or characterization of a network or one or more devices (e.g., base stations 120, UEs 110, etc.). Aggregated data may be expressed as a distribution data model, histogram, plot of relative datapoints, a statistical measure (e.g., means, variance, etc.), and/or one of more other types of informational representations. Individual telemetry data (also referred to as telemetry information or data) may include an informational representation of connectivity activity patters of one or more UEs 110 over time.

Categorical data may include information that represents or relates to contextual information of one or more UEs 110, and that can be shared as a class or category instead of exact UE information. An example of categorical data may include an indication of whether UE 110 is located indoors or outdoors, instead of indicating the actual geographic location of UE 110. Another example might include indicating a type of application (e.g., a streaming communication application) instead of the exact application itself (e.g., FaceTime®). Individual explicit data may include information that UE 110 is specifically requested to provide, such as a current geographic location of UE 110, identifying information of a user of UE 110, etc.

Shared data may include or be associated with time information, such as a type of time (e.g., past, present, or future) and/or a duration for which the data may be considered valid. Time information may range from microseconds and milliseconds to hours, days, dates, weeks, months, or years. Shared data may be shared according to a schedule or periodicity and/or in response to a detected condition, trigger, request, or another type of specified event. Prior to sharing one or more types of data (or any data) UE 110 and the network (e.g., base station 120) may communicate to negotiate or determine what types of data is to be shared, what levels of privacy information may be shared, under what conditions is data to be shared, what the network is able to do with shared information, and so on.

Referring to FIG. 5, level 1 privacy may include individual user data and data that is otherwise considered private. Examples of level 1 privacy data include an exact location, exact application being used, exact behavior (e.g., sleeping), personal information (age, gender, race, etc.). Connectivity context data for level 1 privacy data may include telemetry data without private or identifying information, such as the relative amounts that different types of communication applications were used on the last week. Level 2 privacy data may include individual connectivity telemetry data, such as statistics about network usage patters over a period of time.

Level 3 privacy data may include categorical contextual user data, such as whether UE 210 is located indoors or outdoors, types of network traffic, types of communications, categorical amounts of data traffic, etc. Level 4 privacy data may include aggregated, multi-user data. This type of data may include private data aggregated across multiple UEs but in a way that is merely statistical and analytical instead of revealing individual identification information or other types of private information. For example, data may be collected from many UEs 210 in a geographic area but the data has been modified or anonymized to preserve the identity, privacy, and sense of security of the user of UE 210. Such information may inform the network about metrics that may guide automation, evaluation, and resource planning, while still preserving the privacy of the user.

Figure 6:
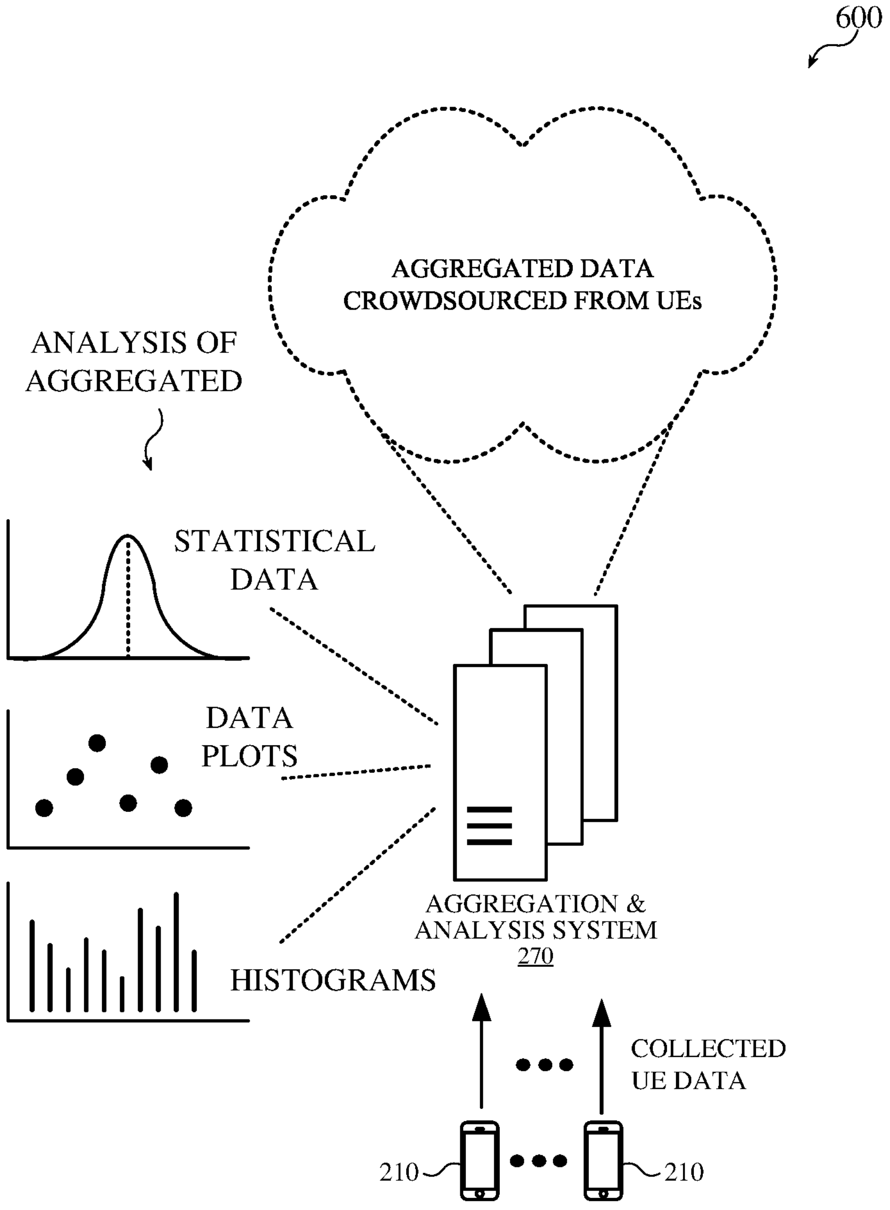
FIG. 6 is a diagram of an example of aggregation and analysis system according to one or more implementations described herein.

FIG. 6 is a diagram of an example 600 of aggregation and analysis system 270 according to one or more implementations described herein. As shown, aggregation and analysis system 270 may receive data from multiple UEs 210. The data may be received according to one or more schedules, schemes, or for particular events or devices. For example, the aggregated data may be received during specified time windows and/or sample locations (cells, geographic locations, UE contexts, etc.). As shown, aggregation and analysis system 270 may use the aggregated data to produce statistical measures (e.g., mean, median, max, etc.), distributions, histograms, embeddings, etc. In some implementations, UEs 210 may implement data privacy policies such that any data received by aggregation and analysis system 270 is not private. For example, UEs 210 may upload information indicating user activity and should not contain any confidential information about a specific user. For example, UE 210 may upload a received signal strength indicator (RSSI) during a time window and/or for a specified location, and the RSSI maybe included in the aggregated data.

In some implementations, UE 210 and/or aggregation and analysis system 270 may implement privacy preserving aggregation techniques, and/or data anonymization procedures. The exact implementation of the aggregation mechanism and the server split/deployment can be agreed between UEs 210 and a network operator, service provider, or vendor to enable the privacy preserving coordination. For example, cryptographic protocols may be used.

Figure 7:
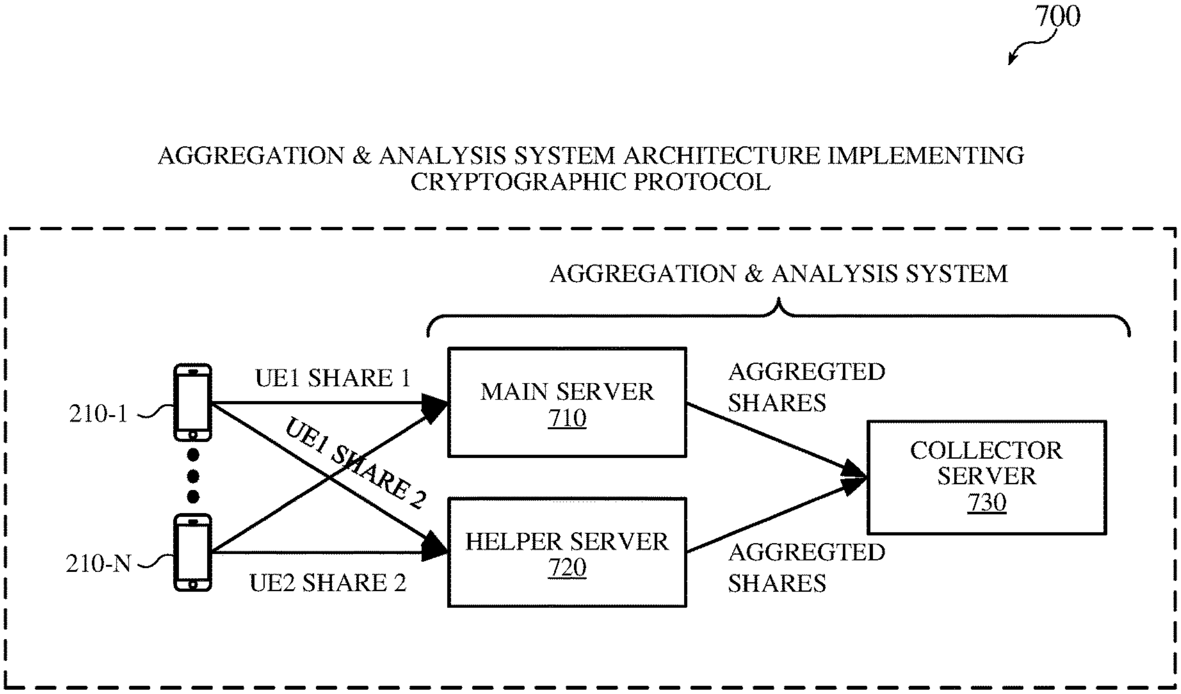
FIG. 7 is a diagram of an example of an aggregation and analysis system architecture implementing a cryptographic protocol according to one or more implementations described herein.

FIG. 7 is a diagram of an example of an aggregation and analysis system architecture 700 implementing a cryptographic and privacy-conserving protocol according to one or more implementations described herein. As shown, architecture 700 may include UEs 210-1 through 210-N (where N is greater than or equal to 1), home server 710, helper server 720, and collector server 730. In some implementations, aggregation and analysis system 270 may comprise home server 710, helper server 720, and collector server 730. However, in other implementations, aggregation and analysis system 270 may comprise another arrangement of servers, another cryptographic protocol, another privacy-conserving system, etc.

UEs 210-1 and 210-N may be configured to send data with home server 710 and helper server 720. As shown, UE 210-1 may be configured to send data (UE 1 share 1 and UE 1 share 2) to home server 710 and helper server 720, respectively.

Home server 710 and helper server 720 may send or share aggregated data to collector server 730, which may store the received data, enable analysis to be performed on the received data, and/or send the received data and results of the analysis to another device, such as data-driven NW control unit 280. In this manner, an aggregation and analysis system architecture 700 may be implemented in a manner that helps ensure data security and privacy.

Figure 8:
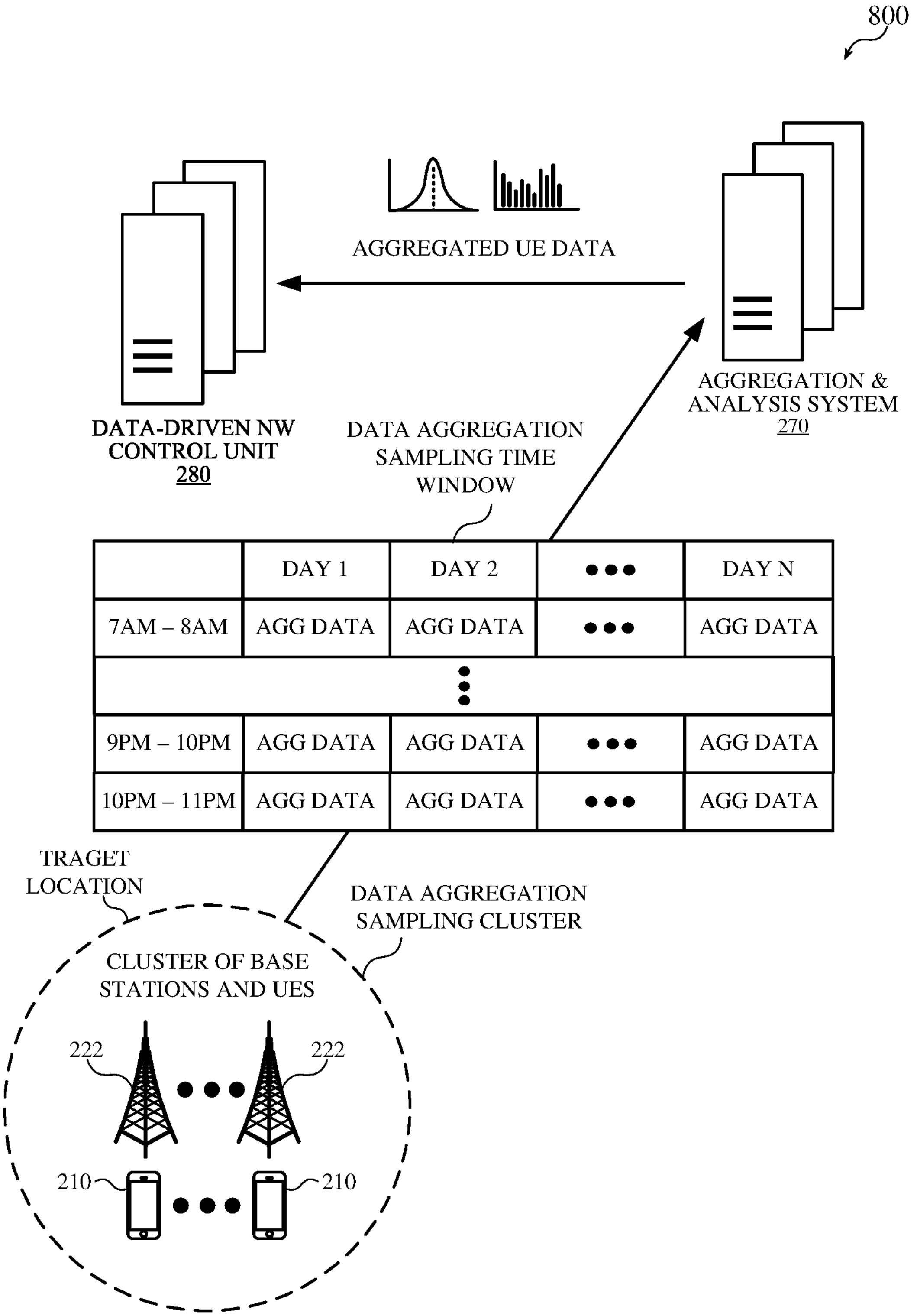
FIG. 8 is a diagram of an example of a data aggregation sampling time window according to one or more implementations described herein.

FIG. 8 is a diagram of an example 800 of a data aggregation sampling time window according to one or more implementations described herein. As shown, the example 800 includes UEs 210, base stations 222, aggregation and analysis system 270, and data-driven NW control unit 280. UEs 210 and base stations 222 may correspond to a data aggregation sampling cluster by being within a specified location for data aggregation. The data aggregation may also be specific to certain times or windows of times. As such, aggregation and analysis system 270 may be configured to collect data (represented as "AGG DATA") from devices within the target location during certain times (e.g., 7 AM-8 AM may be one time window, 9 PM-10 PM may be another time window, and so on.).

The devices (e.g., UEs 210 and/or base stations 222) located within the target location during the specified time windows may comprise a data aggregation sampling cluster. The granularity of data shared, sampling cluster size, number and duration of time windows, etc., may be negotiated and/or agreed upon between a UE vendor and NW vendor (e.g., service provider or operator) such that user privacy is properly respected. Examples of data may be a capture of cellular metrics (e.g., signal strength), application types, QoE, location, cell ID, motion information, etc. Individual private data is not improperly captured or shared. Aggregation and analysis system 270 may process the aggregated data to generate one or more types of outputs, such as statistical measures (e.g., mean, median, max, variance, distribution, etc.), analytical insights (e.g., embedding, graphs, correlations, histograms, etc.), and/or one or more other types of synthesized output types. Aggregation and analysis system 270 may send the output information to data-driven NW control unit 280 as aggregated UE data.

Figure 9:
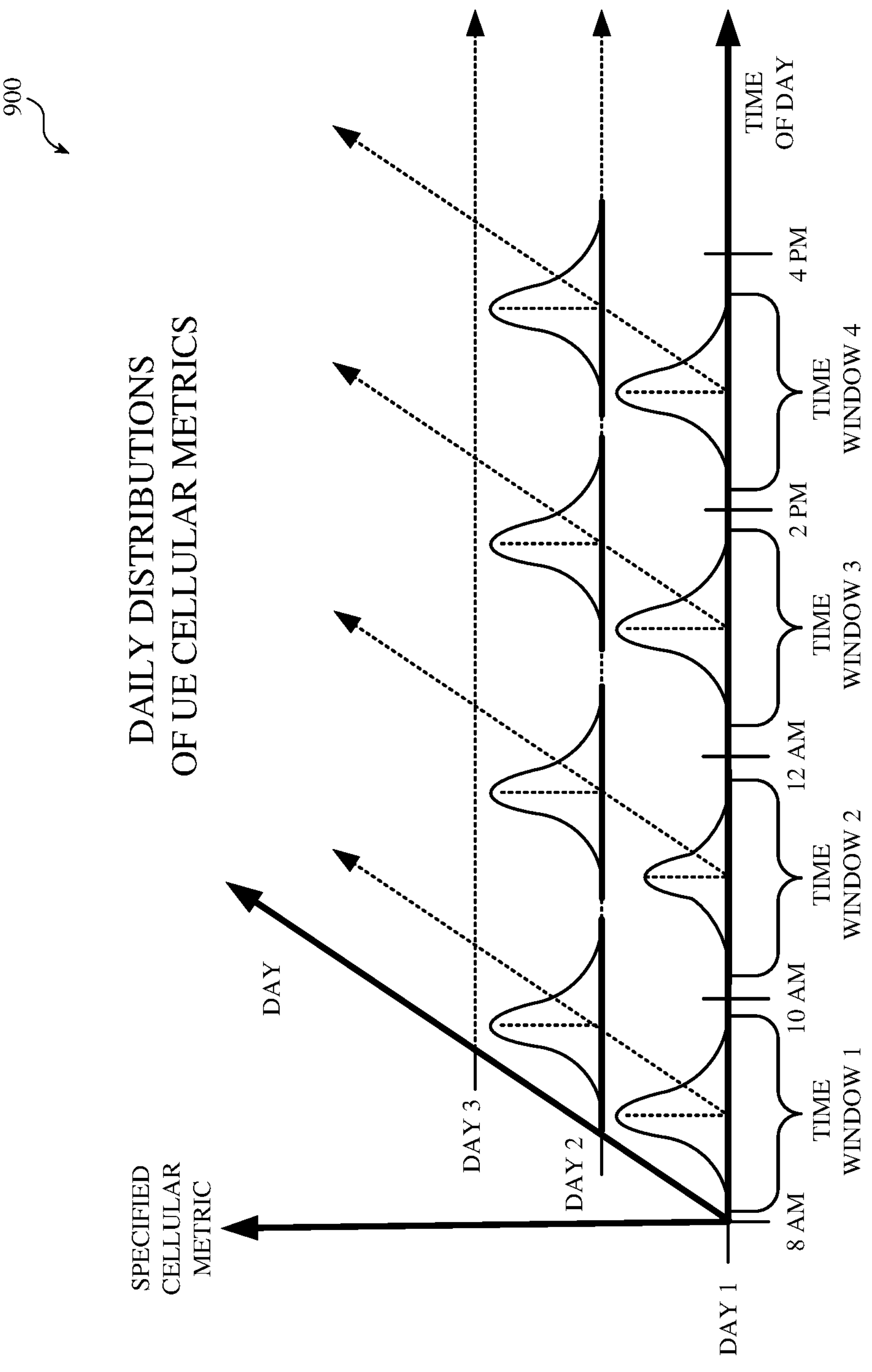
FIG. 9 is a diagram of an example of a table of daily distributions of UE cellular metrics according to one or more implementations described herein.

FIG. 9 is a diagram of an example of a table 900 of daily distributions of UE cellular metrics according to one or more implementations described herein. As shown, table 900 may include an axis representing time of day, an axis representing specified cellular metric, and an axis representing day. Aggregation and analysis system 270 may be configured to aggregate and organize UE data in accordance with table 900. For example, on day 1 aggregation and analysis system 270 may collect UE data of the specified cellular metric (e.g., signal strength) during time windows 1-4. For each time window, T=T+1 may process the aggregated data to generate statistical measures (e.g., means, variance, etc.). On day 2, aggregation and analysis system 270 may do likewise, and so on until instructed to do otherwise or a scheduled duration expires, etc. This information may be shared with data-driven NW control unit 280, which may enable data-driven NW control unit 280 to optimize network operations.

Figure 10:
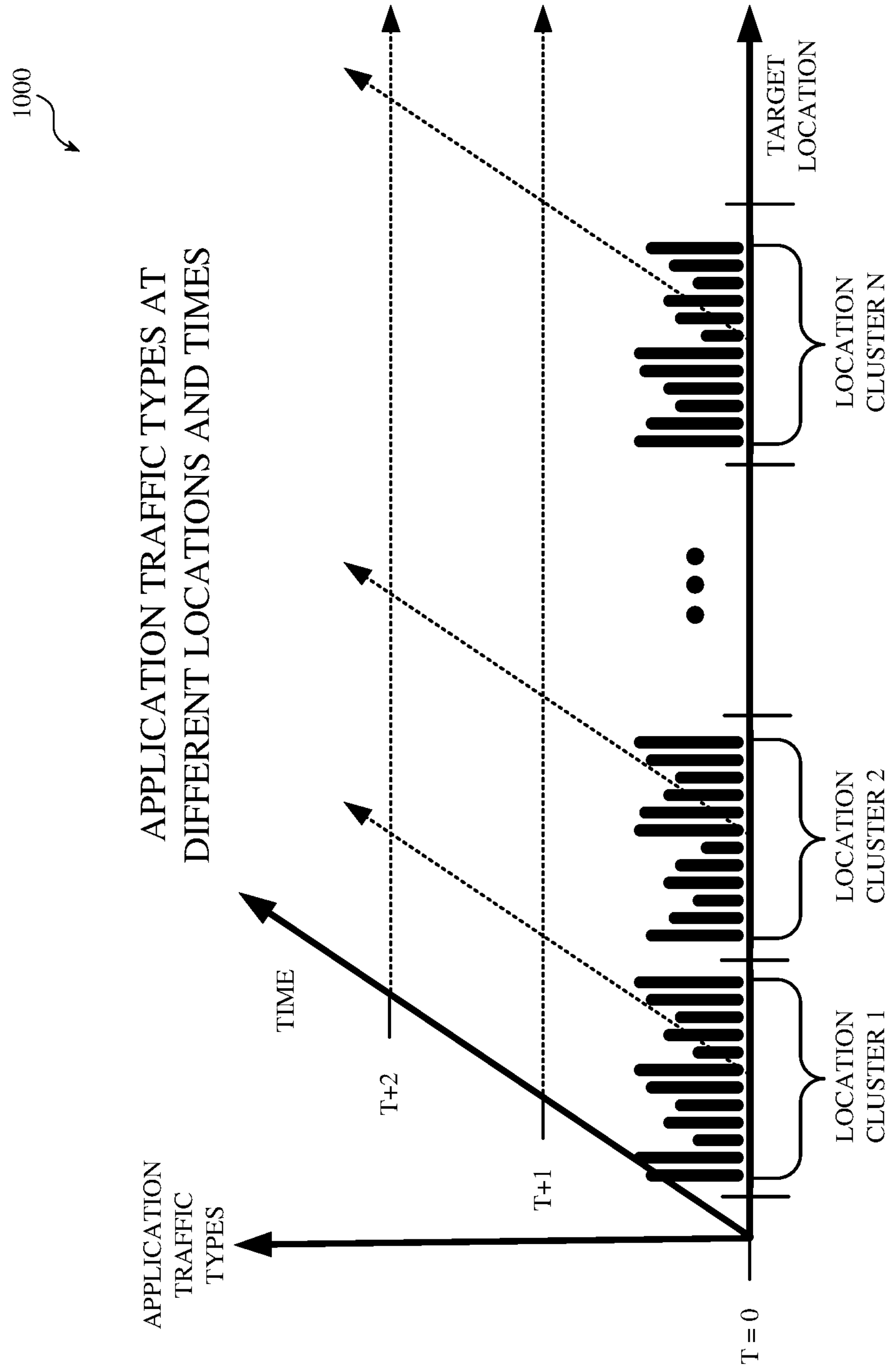
FIG. 10 is a diagram of an example of a table of application traffic types at different times and locations according to one or more implementations described herein.

FIG. 10 is a diagram of an example of a table 1000 of application traffic types at different times and locations according to one or more implementations described herein. As shown, table 1000 may include an axis representing target locations, an axis representing an application traffic types, and an axis representing time. Aggregation and analysis system 270 may be configured to aggregate and organize UE data in accordance with table 1000. As such, at T=0, aggregation and analysis system 270 may collected data from devices located in location clusters 1 through N (where N is greater than or equal to 2). The data collected includes a specified type of application traffic, such as phone call data, video streaming, etc. As shown, each bar in the histograms of table 1000 may correspond to a different type of application data. For T+1, T+2, and so on, aggregation and analysis system 270 may do likewise, and until instructed to do otherwise or a scheduled duration expires, etc. This information may be shared with data-driven NW control unit 280, which may enable data-driven NW control unit 280 to optimize network operations.

Figure 11:
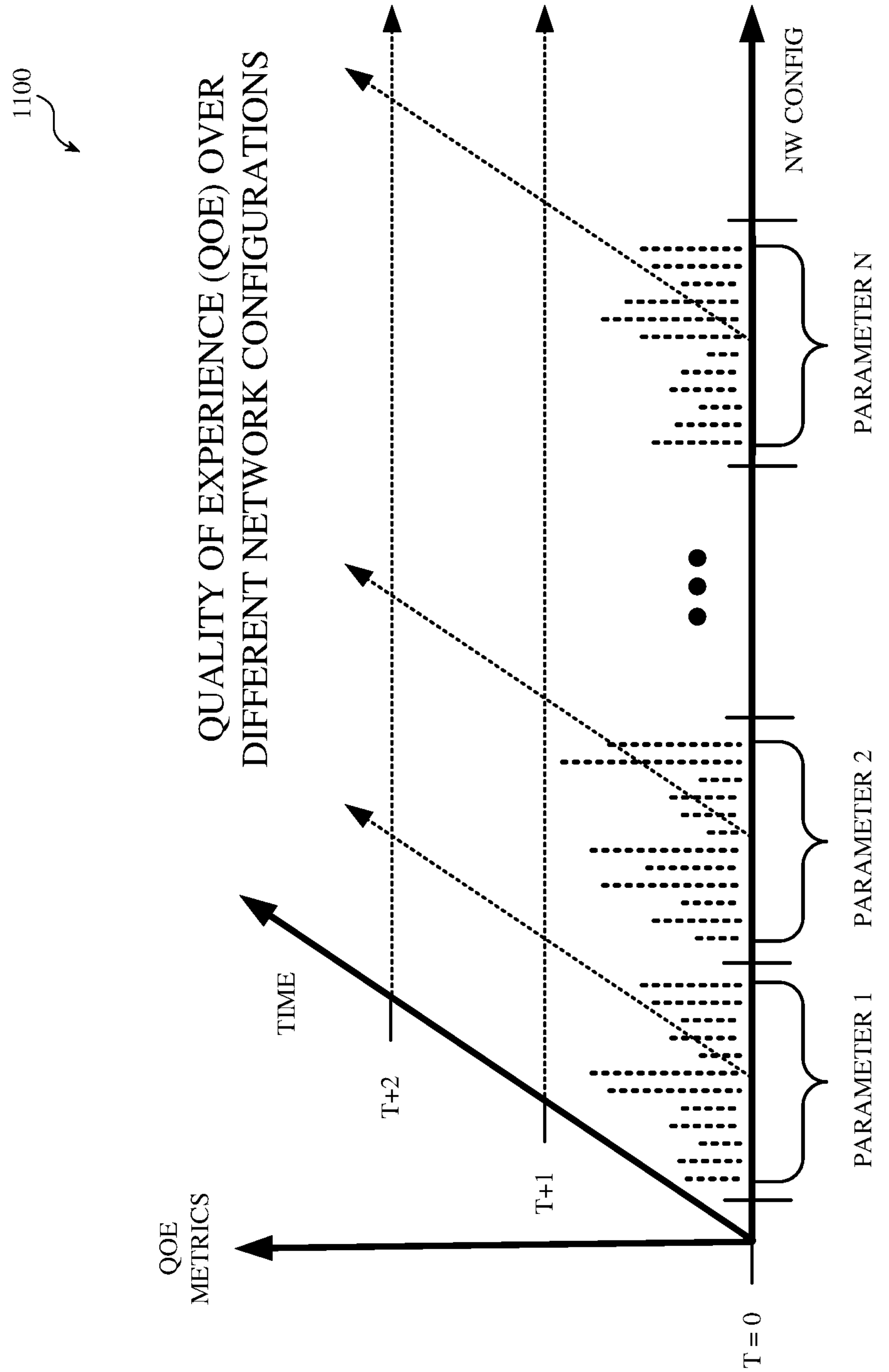
FIG. 11 is a diagram of an example of a table of quality of experience (QoE) over different network configurations according to one or more implementations described herein.

FIG. 11 is a diagram of an example of a table 1100 of QoE over different network configurations according to one or more implementations described herein. As shown, table 1100 may include an axis representing different network configurations, an axis representing QoE metrics, and an axis representing time. Aggregation and analysis system 270 may be configured to aggregate and organize UE data in accordance with table 1100. At T=0, aggregation and analysis system 270 may collect values of QoE parameters 1 through N (where N is greater than or equal to 2) from devices implementing different NW configurations. For T+1, T+2, and so on, aggregation and analysis system 270 may do likewise, and until instructed to do otherwise, or a scheduled duration expires, etc. This information may be shared with data-driven NW control unit 280, which may enable data-driven NW control unit 280 to optimize network operations.

Figure 12:
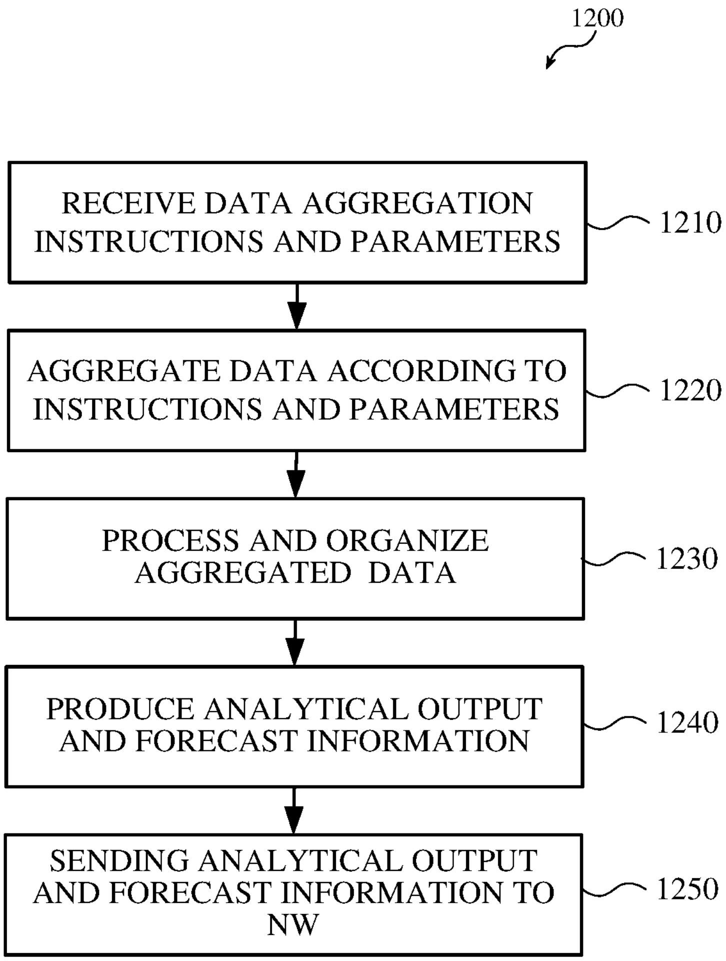
FIG. 12 is a diagram of an example process for applying machine learning to aggregated data according to one or more implementations described herein.

FIG. 12 is a diagram of an example process for applying machine learning to aggregated data according to one or more implementations described herein. Process 1200 may be implemented by aggregation and analysis system 270. In some implementations, some or all of process 1200 may be performed by one or more other systems, devices, or components, including one or more of those of FIG. 2. Additionally, process 1200 may include one or more fewer, additional, differently ordered and/or arranged operations than those shown in FIG. 12. In some implementations, some or all of the operations of process 1200 may be performed independently, successively, simultaneously, etc., of one or more of the other operations of process 1200. As such, the techniques described herein are not limited to a number, sequence, arrangement, timing, etc., of the operations or process depicted in FIG. 12. Indeed, the techniques described herein may include additional and alternative versions of process 1200.

As shown, process 1200 may include receiving data aggregation parameters (block 1210). For example, aggregation and analysis system 270 may be configured to receive instructions, parameters, and/or one or more other types of information for aggregating data from multiple UEs. The aggregation instructions and parameters may indicate what types of information is to be collected, what types of information is not to be collected, scheduling information (e.g., time windows, days, weeks, etc.), types of devices for which data is to be collected, types of network configurations for which data is to be collected, privacy standards to be implemented, anonymization practices to be implemented, etc. The aggregation instructions and parameters may also indicate how aggregation and analysis system 270 is to process and analyze the aggregated data, and/or what types of analytical outputs aggregation and analysis system 270 should generate (e.g., statistical measures, histograms, etc.).

Process 1200 may include aggregating data according to the aggregation instructions and parameters (block 1220). For example, aggregation and analysis system 270 may receive data from multiple UEs 210 in accordance with the aggregation instructions and parameters. This may include receive data from UEs 210 at certain times, dates, amounts, types, locations, and so on.

Process 1200 may include processing and organizing the aggregating data according to the aggregation instructions and parameters (block 1230). For example, upon receiving UE data, according to a predetermined schedule, or in response to an event, trigger, or request, aggregation and analysis system 270 may process and organized aggregated data. This may include ensuring that appropriate privacy standards are obeyed and appropriate anonymization practices are carried out. This may also include identifying data types, data sources, data categories, etc. In some implementations, this may include organizing the aggregated data into a long-term data storage structure, such as a database, which can also be used to later access and analyze the aggregated data in various ways. In some implementations, aggregation and analysis system 270 may also update or generate machine learning models based on the aggregated data.

Process 1200 may include producing analytical output and forecast information (block 1240). For example, aggregation and analysis system 270 may generate, based on the aggregated data and/or the aggregation instructions and parameters, analytical outputs. Examples of the analytical outputs are discussed throughout this specification, including with reference to FIGS. 6 and 8-11. The forecast information may relate to network configurations that may cause or prompt data-driven NW control unit 280 to reconfigure one or more base stations 222 or other devices of a wireless telecommunication network. Aggregation and analysis system 270 may produce the forecast information by applying the aggregated data as inputs into one or more neural networks or other machine learning tools or frameworks, and by comparing a current state of the network (indicated by the aggregated data) to an output of the neural network.

Process 1200 may also include sending the analytical output and/or aggregated data to the network (block 1250). For example, aggregation and analysis system 270 may communicate the analytical output information and/or aggregated data to data-driven NW control unit 280. In some implementations, aggregation and analysis system 270 may be capable of sending information to multiple data-driven NW control unit 280 and aggregation and analysis system 270 may first determine which data-driven NW control unit 280 is intended to receive the analytical output and/or aggregated data. In some implementations, aggregation and analysis system 270 may send information to data-driven NW control unit 280 according to a schedule, periodicity, and/or in response to a trigger, predefined event, request, or upon receiving instructions to do so. In some implementations, aggregation and analysis system 270 may send information to data-driven NW control unit 280 forecast information relating to network configurations.

Figure 13:
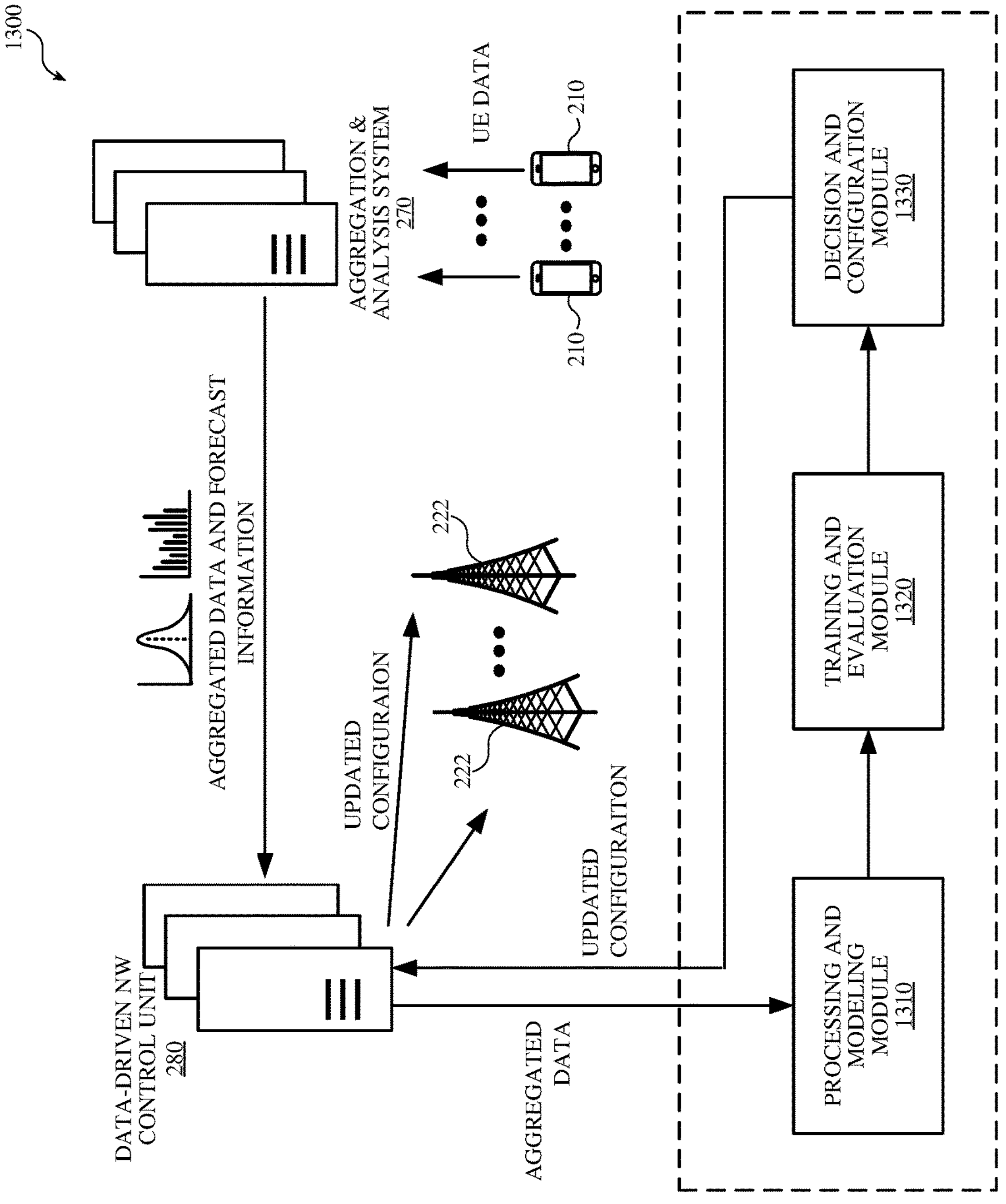
FIG. 13 is a diagram of an example of modules of a data-driven network control unit according to one or more implementations described herein.

FIG. 13 is a diagram of an example 1300 of modules of a data-driven network control unit according to one or more implementations described herein. As shown, example 1300 includes UEs 210, base stations 222, aggregation and analysis system 270, and data-driven NW control unit 280. Data-driven NW control unit 280 may include a processing and modeling module 1310, a training and evaluation module 1320, and a decision and configuration module 1330 (collectively referred to as modules 1310-1330).

Modules 1310-1330 may include a combination of hardware and/or software configured to configurations and/or functionalities described herein. Modules 1310-1330 may software instructions stored in memory and executed by a processor to produce one or more results based on the software being executed. The results of these modules may cause other operations and/or processes to be triggered and executed as part of performing one or more of the techniques described herein.

UEs 210 may provide x UE data (e.g., user context data and UE connectivity context data) to aggregation and analysis system 270. Aggregation and analysis system 270 may organize and process the UE data to ensure property privacy standards and anonymization procedures are observed. As described above, aggregation and analysis system 270 may produce one or more analytical outputs by combining the UE data in certain ways to create aggregated UE data (or aggregated data). Aggregation and analysis system 270 may also apply the UE data to one or more models regarding the state of a UE 210, a connection between UE 210 and base station 222, or another aspect of the network, and generate a forecast regarding changes in the network, network usage changes, etc. Aggregation and analysis system 270 may provide the aggregated data and/or forecasts to data-driven NW control unit 280.

Data-driven NW control unit 280 may use the aggregated data as input in models stored and updated by data-driven NW control unit 280. Applying the aggregated data to the models may enable data-driven NW control unit 280 to determine whether changes to the network, including one or more base stations 222 is warranted. Data-driven NW control unit 280 may also use or take into account the forecast information provided by aggregation and analysis system 270.

As shown, data-driven NW control unit 280 may provide the aggregated data to processing and modeling module 1310. Processing and modeling module 1310 may use the aggregate data to create or update a module regarding one or more aspects of the network, such as a feature or function of base stations 222. Processing and modeling module 1310 may process and analyze the aggregated data and forecast information, along with NW history data, to understand user feedback and extract connectivity usage models.

The new or updated module, along with the aggregated data may be made available to training and evaluation module 1320. Training and evaluation module 1320 may add the aggregated data to an existing training dataset available to training and evaluation module 1320 to create a larger and more updated training dataset. Training and evaluation module 1320 may also, or alternatively, train and enhanced the newly created model and previously existing models based on the expanded training data set. This may for example enable an automation model of data-driven NW control unit 280 to learn (e.g., update and become a better model) form the new aggregated data. This may also, or alternatively, enable a mode to be constructed based on a target task or KPI. Training and evaluation module 1320 may also supply the aggregated data (which may include analytical outputs discussed above with reference to aggregation and analysis system 270 to evaluate the aggregated data for an output.

Training and evaluation module 1320 may supply the output from the neural network model to decision and configuration module 1330. Training and evaluation module 1320 may also provide a confidence level to represent a level of confidence that the output is accurate. Decision and configuration module 1330 may analyze the output, compare the output to a current configuration of the network (e.g., of base station 222) and determine whether a difference between the output and current configuration exceeds a threshold thus warrant a reconfiguration of the network or a portion or device of the network relevant to the output.

Decision and configuration module 1330 may determine an appropriate network configuration (or resource configuration) based on the output. In other words, based on the learned model, data-driven NW control unit 280 may configure its parameters and/or algorithm used by base stations 222. Having the new configuration or configuration updates, data-driven NW control unit 280 may cause the network to reconfigure accordingly. For instance, as shown in FIG. 13, data-driven NW control unit 280 may communicate an updated configuration, along with appropriate messages, instructions, and parameters, to base stations 222, and upon receiving the updated information and instructions, base station 222 may reconfigure and begin operating in accordance therewith to improve the performance of the network, enhance user experience, allocate resources more efficiently and effectively, and more with the reconfiguration.

Generally, data sharing may be used in different ways. Aggregate data may be used to optimize non-time-sensitive features of the NW and serve as a feedback metric to NW algorithms adjust parameters and/or configurations. Here, the NW may include data-driven NW control unit 280 and/or base stations 222. Aggregate data may help the NW generate synthetic user connectivity patterns to learn/pre-train models from virtual user private data.

Individual contextual data may be used for time-sensitive features and configurations (e.g., milli-seconds, seconds, and frame) parameter/config decisions. If the NW (e.g., data-driven NW control unit 280 and/or base stations 222) needs private individual data of UE 210 to infer a best config/parameters, it can share the computation model (e.g., inference model) to UE 210, and UE 210 may run the model to decide which config the NW should use. Private federated learning can be used to train such inference models while preserving user privacy.

Figure 14:
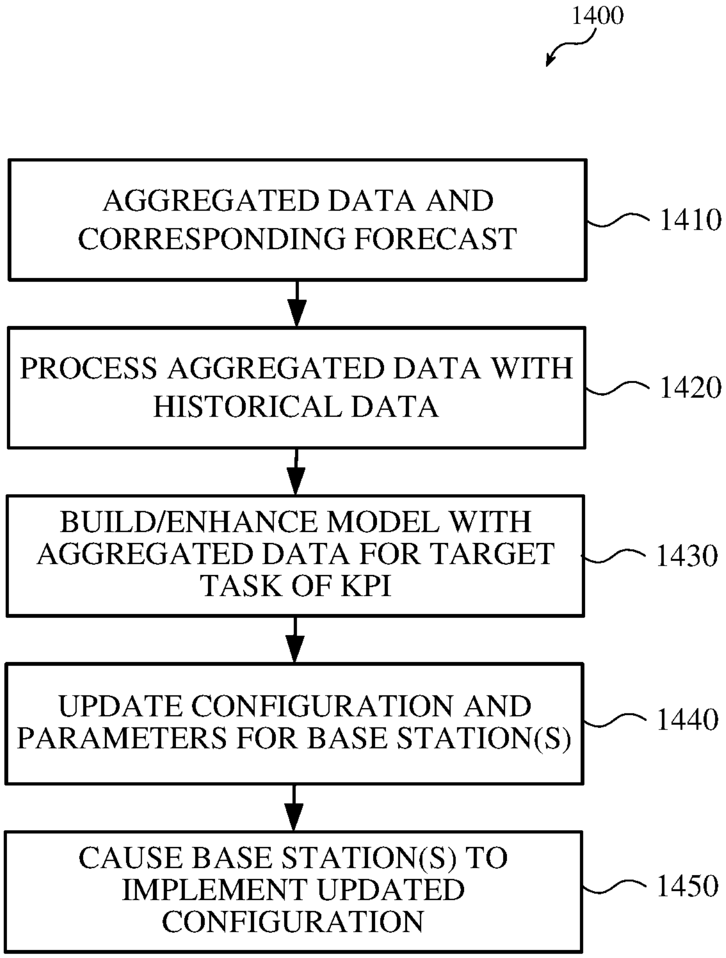
FIG. 14 is a diagram of an example process for aggregating and analyzing data in according to one or more implementations described herein.

FIG. 14 is a diagram of an example process for aggregating and analyzing data in according to one or more implementations described herein. Process 1400 may be implemented by data-driven NW control unit 280. In some implementations, some or all of process 1400 may be performed by one or more other systems, devices, or components, including one or more of those of FIG. 2 and/or modules 1310, 1320, and 1330 of FIG. 13. Additionally, process 1400 may include one or more fewer, additional, differently ordered and/or arranged operations than those shown in FIG. 14. In some implementations, some or all of the operations of process 1400 may be performed independently, successively, simultaneously, etc., of one or more of the other operations of process 1400. As such, the techniques described herein are not limited to a number, sequence, arrangement, timing, etc., of the operations or process depicted in FIG. 14. Indeed, the techniques described herein may include additional and alternative versions of process 1400.

As shown, process 1400 may include receiving aggregated data and corresponding forecast (block 1410). For example, data-driven NW control unit 280 may receive aggregated data from aggregation and analysis system 270. The aggregated data may include the results or forecast produced by aggregation and analysis system 270 upon applying aggregated data to one or more models of aggregation and analysis system 270. The forecast may predict how the needs ad responsibilities of the network may change, which may warrant a reconfiguration of one or more features, devices, or groups of devices of the network (e.g., base station 222).

Process 1400 may include processing the aggregated data with historical data (block 1420). For example, data-driven NW control unit 280 may process the aggregated data with historical data stored by, or otherwise accessible to, data-driven NW control unit 280. Processing the aggregated data may include determining what types of historical data are relevant in terms of a comparison, and once the appropriate historical data is obtained, comparing or analyzing the aggregated data with the historical data. This may also enable data-driven NW control unit 280 to select a model that might be useful to apply to the aggregated data and/or use the aggregated data to train upon.

Process 1400 may include building and/or enhancing a model with the aggregation data for a target TASK or KPI (block 1430). For example, data-driven NW control unit 280 may use the aggregated data to build a new neural network model or enhance an existing neural network model (by using the aggregated data to increase the amount and diversity of training data for that model). The new model or enhanced model may be for a target task or KPI, which data-driven NW control unit 280 may have identified by analyzing the aggregated data, analyzing historical data, and/or analyzing the forecast received from aggregation and analysis system 270.

Process 1400 may include updating configuration and parameters for base stations 222 (block 1440). For example, data-driven NW control unit 280 may apply the aggregated data to a new neural network model or to an enhanced neural network model and receive and output indicating that a feature, aspect, device, configuration, etc., of the network is to be updated or reconfigured. The output may also indicate what should be updated and/or reconfigured. Data-driven NW control unit 280 may therefore prepare updated configuration and/or parameters for implementations, Process 1400 may include causing base stations 222 to implement updated configuration (block 1450). For example, data-driven NW control unit 280 may send the updated configuration and/or parameters, along with appropriate instructions, to the appropriate base stations 222. Upon receiving the information, base stations 222 may modify their operations by applying the updated configuration to their current configuration. In this manner, data-driven NW control unit 280 may use aggregated data (which does not include private UE information and has been appropriately anonymized) to build and improve neural network models for analyzing network operations, and then applying the aggregated data as inputs to the neural networks to determine whether and how to change the functions or configuration of a device or aspect of the network.

Figure 15:
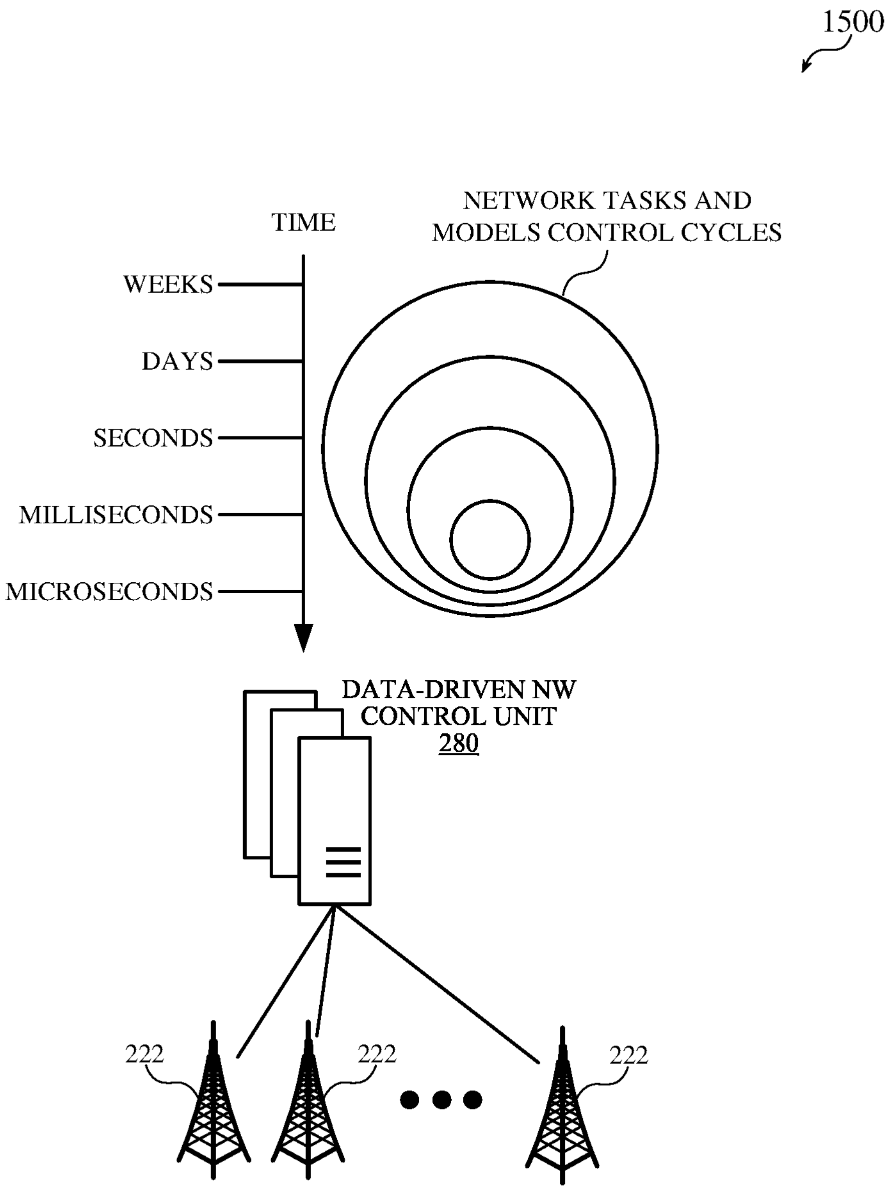
FIG. 15 is a diagram of an example of control cycles of a data-driven network control unit according to one or more implementations described herein.

FIG. 15 is a diagram of an example 1500 of control cycles of a data-driven network control unit 280 according to one or more implementations described herein. Data-driven network control unit 280 may be in charge of controlling, orchestrating, and optimizing a wireless communication network, including the configuration and operation of multiple base stations 222. One or more of the techniques, described herein, may include data-driven network control unit 280 performing these responsibilities in accordance with one or more schedules or control cycles. Control cycles may vary in periodicity. Some may be measured in terms of days or week while other may be measured in seconds, milliseconds, or microseconds. Control tasks and models used by data-driven network control unit 280 to operate and manage a network are best performed according to an appropriate cycle. Some (like power management) may be performed less often (such as every couple of days or once a week) whereas other are very time sensitive (like handover procedures and load balancing) and may be best performed every few seconds or sub-seconds. Some tasks like scheduling and beamforming tasks are so time sensitive as to be performed every few milliseconds or microseconds. Organizing the use of models and performance of tasks may be organized according to control cycles as discussed herein.

Figure 16:
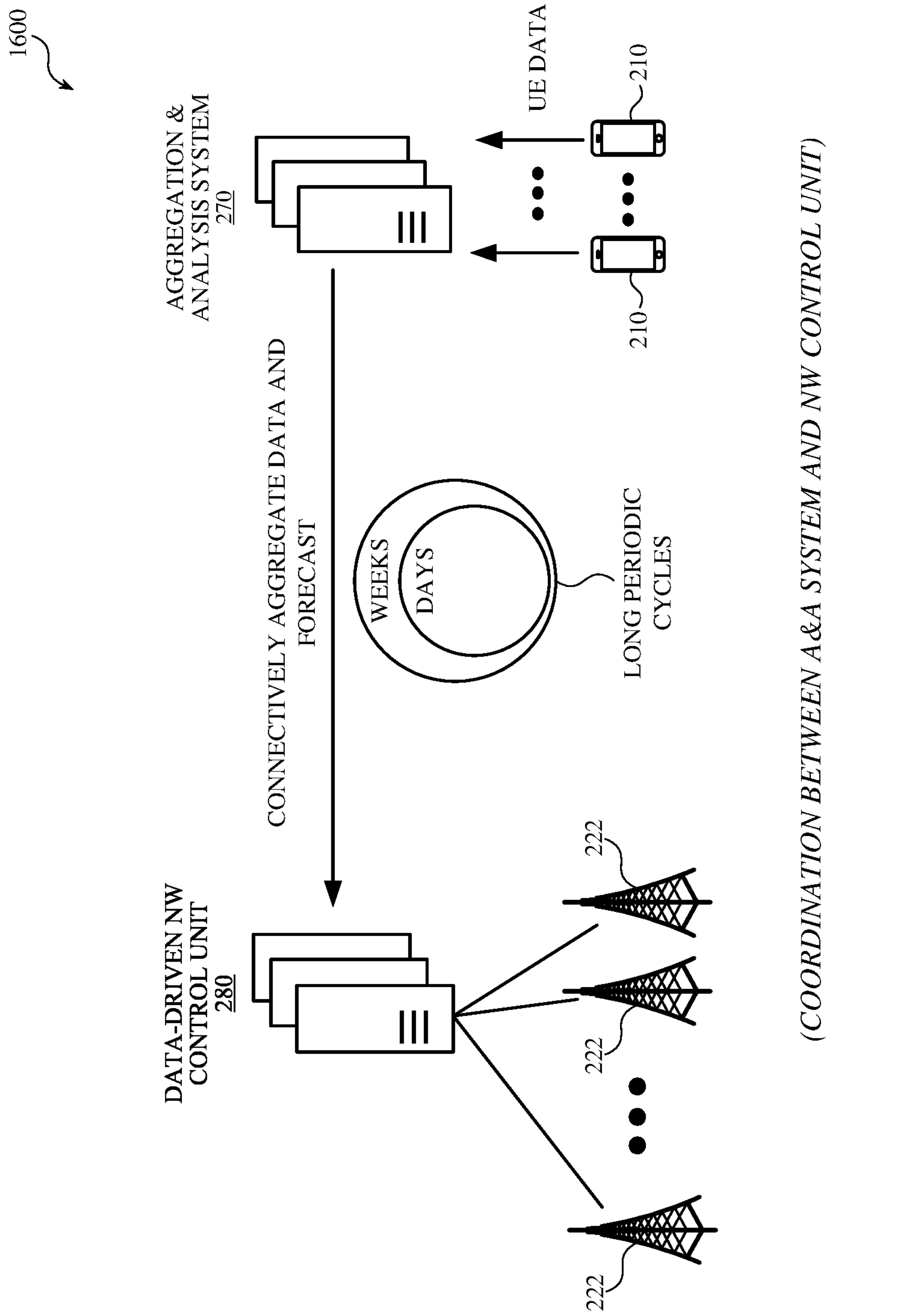
FIG. 16 is a diagram of an example of using long periodic cycles to coordinate an aggregation and analysis system and a data-driven network control unit according to one or more implementations described herein.
Figure 17:
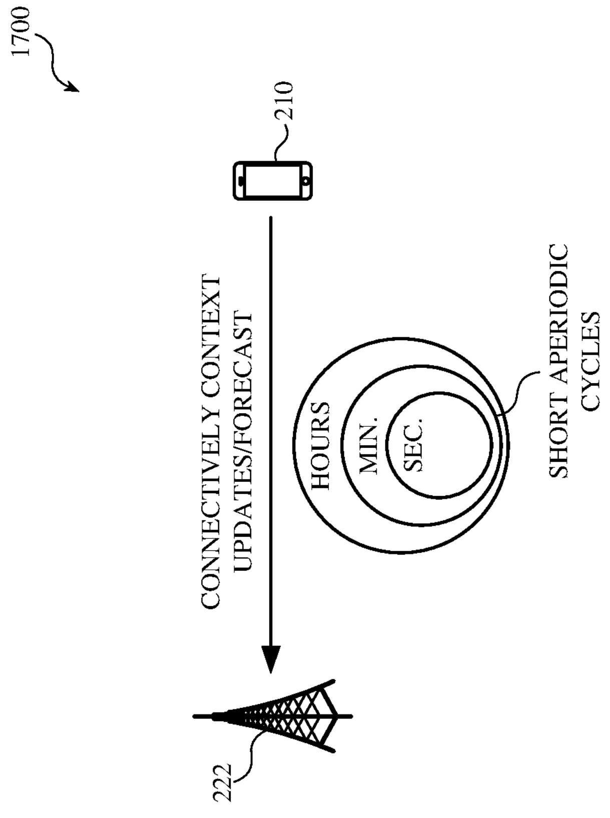
FIG. 17 is a diagram of an example of using short aperiodic cycles to coordinate a UE and base station according to one or more implementations described herein.

FIGS. 16-17 are diagrams of example 1600 and 1700 of different periodic cycles being used to coordinate aggregation and analysis system 270 and data-driven network control unit 280 according to one or more implementations described herein. Referring to example 16, long periodic cycles (e.g., on the orders of days or weeks) may be used to coordinate connectivity aggregate data and forecast information between aggregation and analysis system 270 and data-driven network control unit 280. Notably, the frequency of update cycles and data storage and transfer mechanisms between aggregation and analysis system 270 and data-driven network control unit 280 may be negotiated and agreed upon between device vendor or owner and network operator.

Referring to example 1700, short aperiodic cycles (e.g., on the orders of hours, days or seconds) may be used to coordinate connectivity context updates and forecasts between UE 210 and base station 222. Notably, connectivity context may be exchanged between base station 222 and UE 210 aperiodically (e.g., whenever a connectivity event happens). These type of events may be agreed between a UE vendor and a NW vendor or operator. In such scenarios, a connectivity context information element (IE) may be sent as part of the RRC signaling between UE 210 and base station 222.

FIG. 18 is a diagram of an example of a table 1800 of coordination data according to one or more implementations described herein. As shown, the columns of table 1800 may include data type, validity time range, source and destination, and description. The rows of table 1800 may include entries for aggregated data, aggregated forecast, UE connectivity context report, UE connectivity context forecast report, and NW connectivity context report.

Aggregated data may include user connectivity metrics and statistical information of a past time window. The validity time may be days or weeks, and the source and destination are aggregation and analysis system 270 (source) and data-driven network control unit 280 (destination). An aggregated forecast may include UE connectivity forecasts based on aggregated data at aggregation and analysis system 270. The validity time may be days or weeks, and the source and destination are aggregation and analysis system 270 (source) and data-driven network control unit 280 (destination).

A UE connectivity context report may include UE 210 sharing contextual information or update with base station 222 via connectivity report (optionally with a configuration recommendation). The validity time may be seconds or milliseconds, and the source may be UE 210 and the destination may be base station 222. A UE connectivity context forecast report may include a UE sharing a connectivity prediction with base station 222. The validity time may be minutes or seconds, and UE 210 may be source while base station 222 may be the destination. A network connectivity context report may include base station 222 informing UE 210 of an update to a network context. The validity time may be minutes or seconds, and the source may be base station 222, and the destination may be UE 210.

Figure 19:
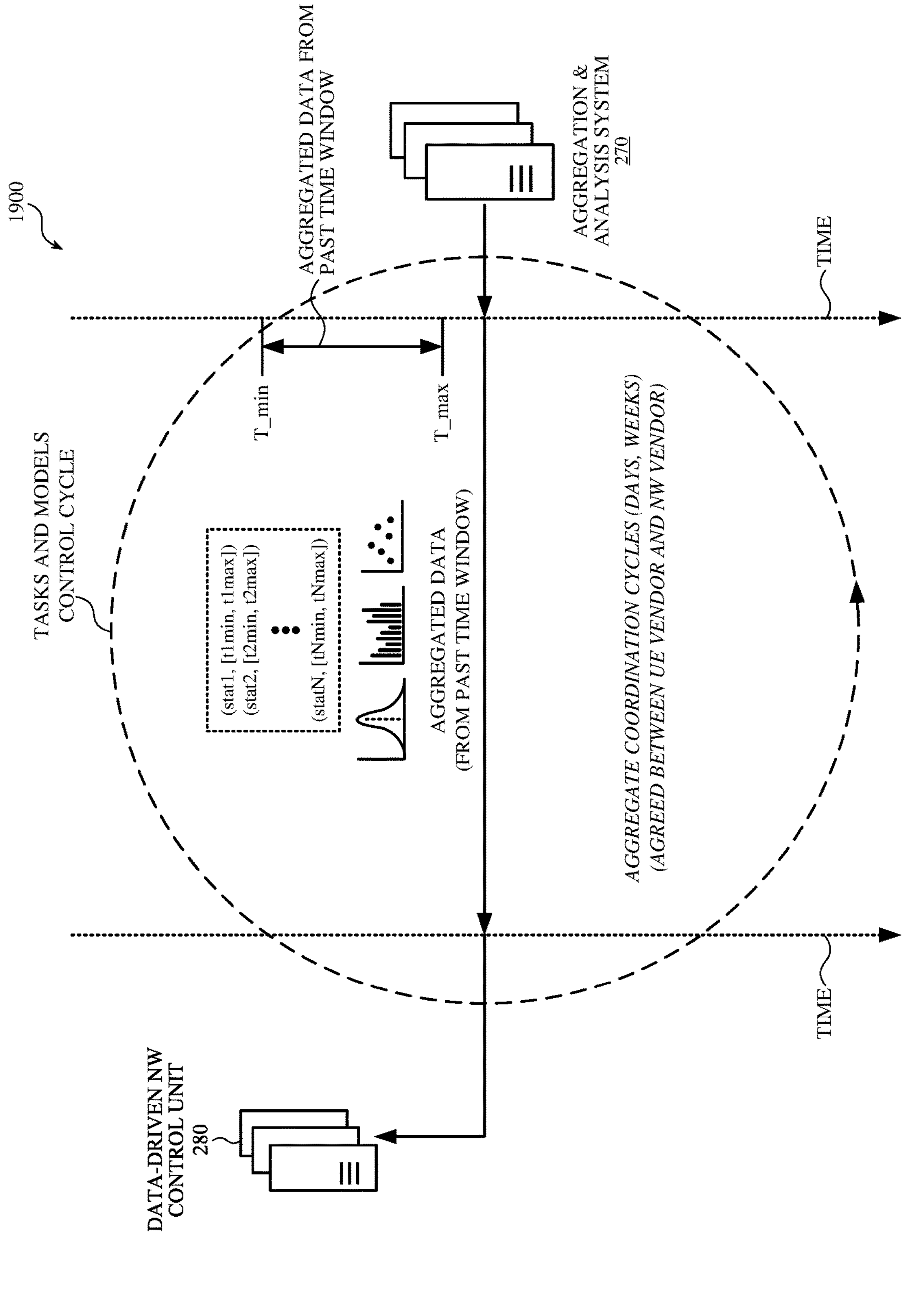
FIGS. 19-20 are diagrams of examples of long coordination cycles between an aggregation and analysis system and a data-driven network control unit according to one or more implementations described herein.
Figure 20:
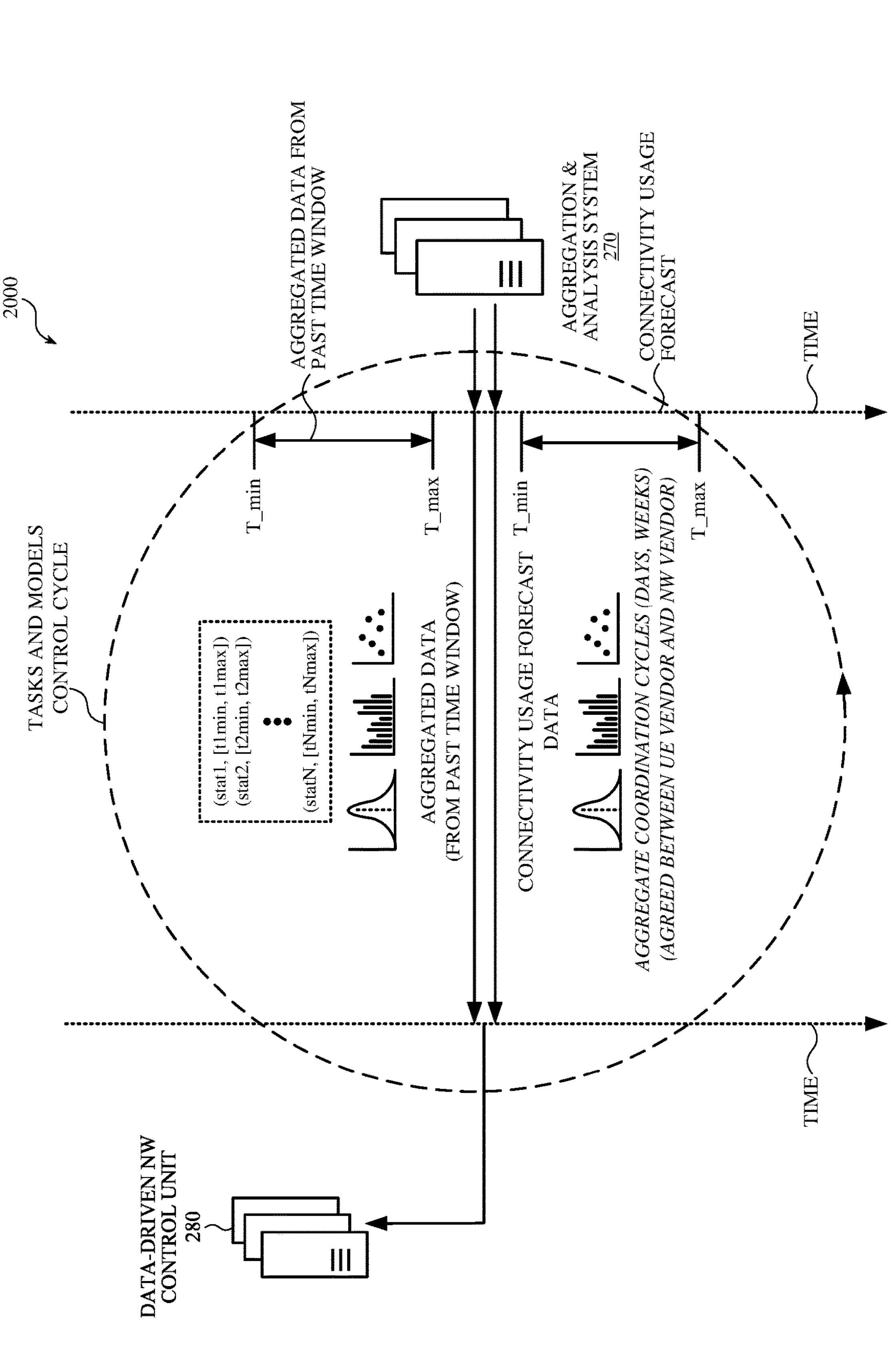

FIGS. 19-20 are diagrams of examples 1900 and 2000 of long coordination cycles between an aggregation and analysis system 270 and a data-driven network control unit 280 according to one or more implementations described herein. Example 1900 includes a scenario involving long coordination cycle involving aggregation and analysis system 270 collecting aggregated data and sharing the data with data-driven network control unit 280. Vertical arrows oriented in a downward direction represent time in general, while a circular feature in the center of example 1900 represents a periodicity of tasks and models control cycle for communications and information. The tasks and models control cycle of example 1900 may be on the order of days or weeks.

Aggregation and analysis system 270 may collect UE data. Examples of the UE data may include types of traffic, QoE evaluations, location, signal strength, activity, WiFi connectivity, etc. UE data may be valid for a period of time. When a statistic is received for a type of UE data, the statistic or metrics may be required with an identifier (stat1, stat2, . . . statN) and a corresponding minimum time (T1min, T2min, . . . TNmin) and a maximum time (T1min, T2min, . . . TNmin). Doing so may enable aggregation and analysis system 270 to continuously receive UE data but also maintain a record of which UE data is valid and which has expired.

As shown, aggregated data from a user history (e.g., past time window) are shared by the UE-aggregation server to data-driven network control unit 280. These metrics may be shared with data-driven network control unit 280 at a frequency agreed upon by UE 210 and an operator of the network or data-driven network control unit 280. These statistics and metrics may be capable of helping UE 210 evaluate past decisions and optimize its internal learning, models, and decisions. It can also help the data-driven network control unit 280 develop typical user connectivity patterns. As the tasks and models control cycle of example 1900 may be on the order of days or weeks the data collection, processing, sharing, and usage may likewise occur on a similar schedule.

Referring to FIG. 20, example 2000 includes a scenario involving long coordination cycle with aggregated data and forecast data. Example 2000 includes several of the features discussed above with reference to example 1900, such as aggregation and analysis system 270, data-driven network control unit 280, vertical arrows oriented in a downward direction represent time in general, and a circular feature in the center representing a periodicity of tasks and models control cycle for communications and information. Also similar to example 1900 is the aggregate data from a past time window, recording aggregate UE data with a validity expiration time, and aggregate data being periodically sent from aggregation and analysis system 270 to data-driven network control unit 280 (e.g., according to a periodicity agreed upon by UE 210 and the network).

Example 2000 also includes forecast data sent from aggregation and analysis system 270 to data-driven network control unit 280. That is, in addition to aggregate data, aggregation and analysis system 270 may share connectivity usage forecast, which may include a prediction made by aggregation and analysis system 270, based on aggregated data (and, potentially, other user data that is not shared) to build connectivity forecasts that may help data-driven network control unit 280 plan resource allocations and network configurations. In such a scenario, aggregation and analysis system 270 may only share the forecast with data-driven network control unit 280 in order to preserve data privacy. As shown, the connection forecast may also have a usage or validity lifespan (indicated by T_min and T_max for connectivity usage forecast). As the tasks and models control cycle of example 2000 may be on the order of days or weeks the data collection, processing, sharing, and usage may likewise occur on a similar schedule.

Figure 21:
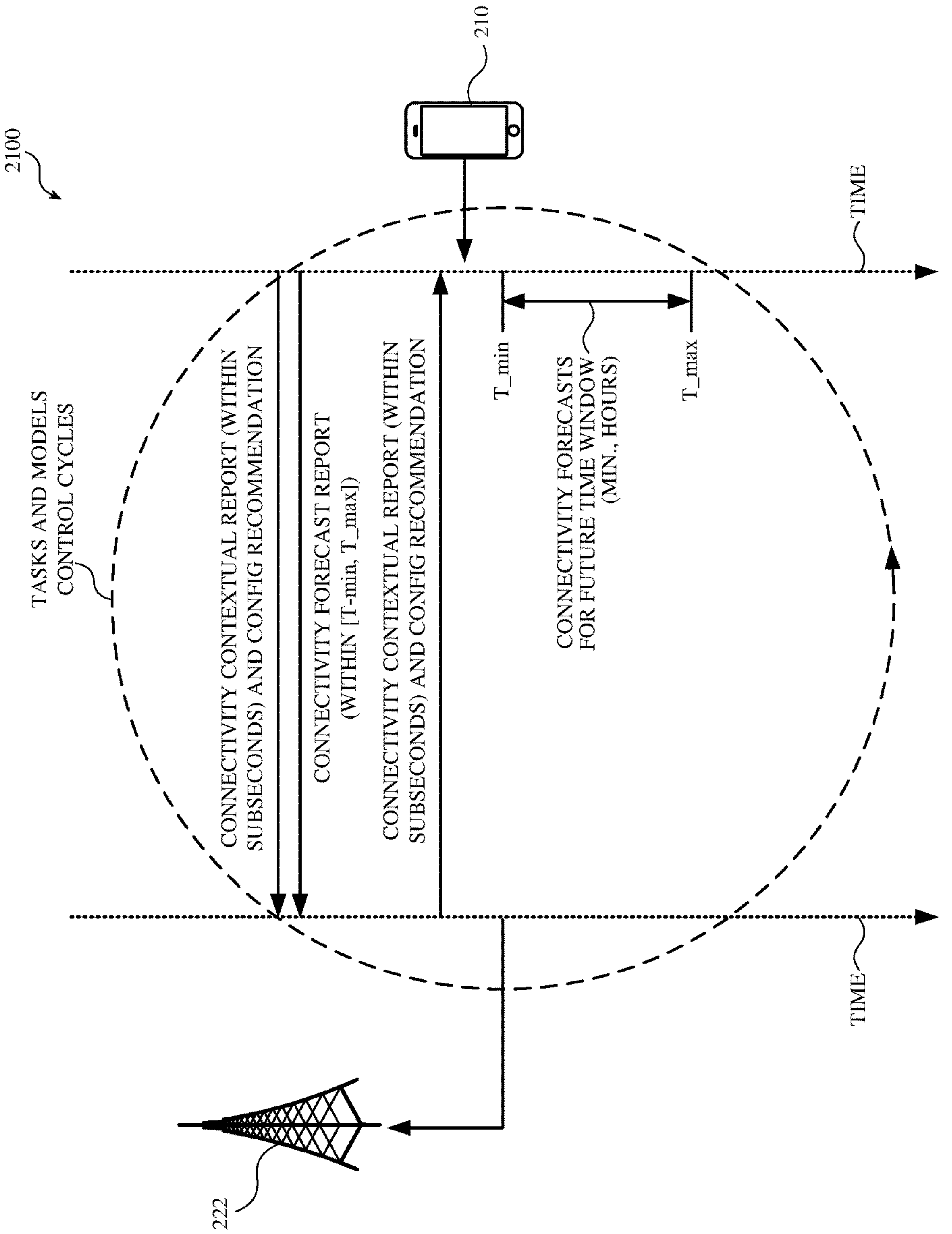
FIG. 21 is a diagram of an example of a short coordination cycle between a UE and a base station according to one or more implementations described herein.
Figure 23:
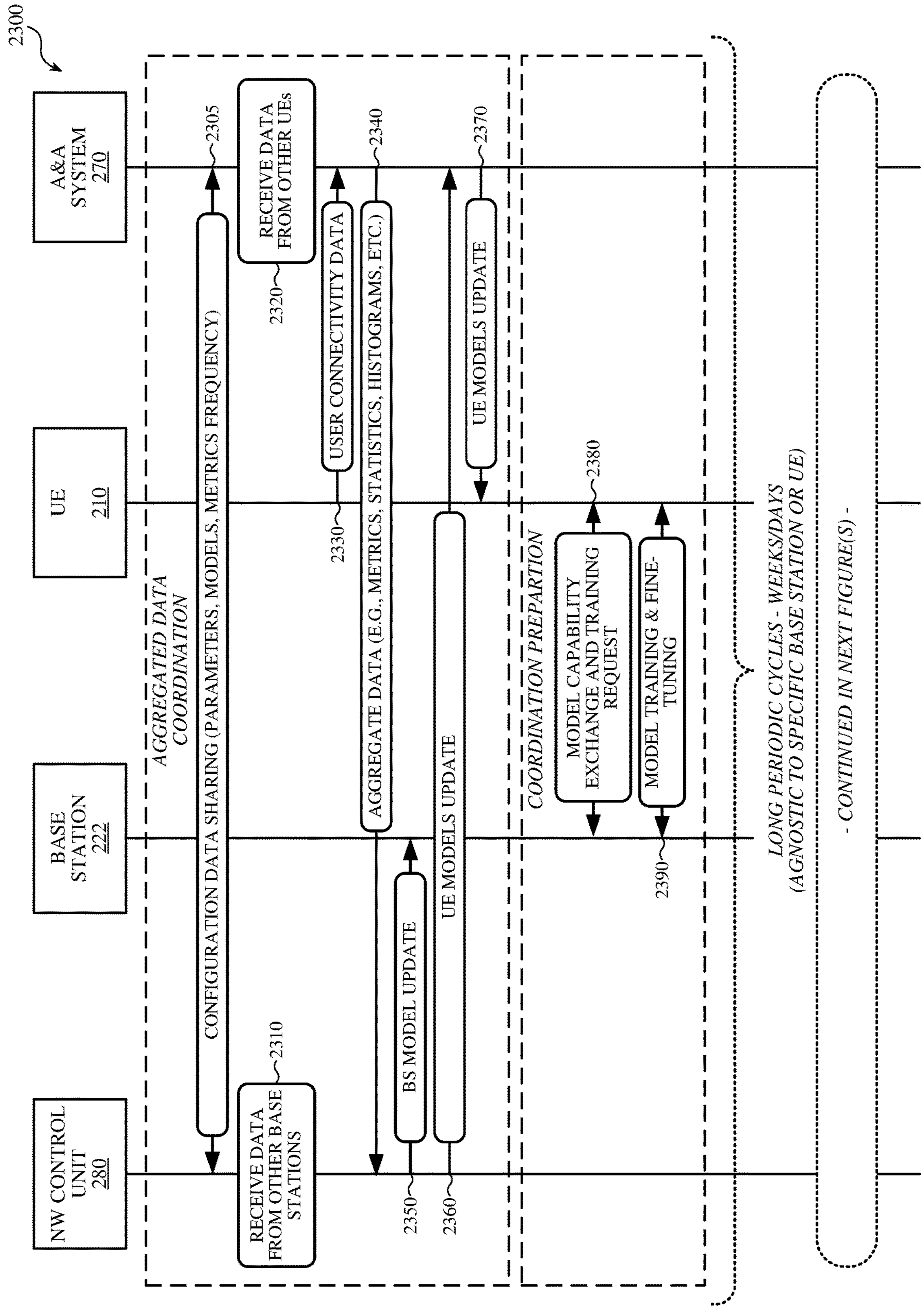
FIGS. 23-26 are diagrams of example processes for UE-assisted, privacy-aware, data-driven NW control according to one or more implementations described herein.

FIG. 21 is a diagram of an example 2100 of a short coordination cycle between UE 210 and base station 222 according to one or more implementations described herein. Vertical arrows oriented in a downward direction represent time in general, while a circular feature in the center of example 2100 represents a periodicity of tasks and models control cycle for communications and information. The tasks and models control cycle of example 2100 may be on the order of seconds, minutes, or hours and may function to coordinate the operations and communications between UE 210 and base station 222. In some scenarios, certain coordination cycles may be asynchronous cycles.

As shown, UE 210 may send base station 222 a connectivity contextual report, which may include a configuration recommendation. A connectivity contextual report shared by UE 210 may be internally detected/understood by UE 210 using on-device intelligence (e.g., learning module 350 and decision module 360) and user data.

A connectivity contextual report may help base station 222 and/or data-driven network control unit 280 develop better-informed configuration, resource management, and scheduling capabilities. For example, if UE 210 informs base station 222 that UE 210 will not need data in the next 30 minutes, base station 222 may adjust resource planning and allocation, power allocation, CDRX cycles, etc., accordingly. By contrast, if UE 210 beings playing or streaming movie or a video, UE 210 may determine who long the movie may last and inform base station 222 of the anticipated need and duration for a commensurate QoS, bandwidth, latency, etc.

UE 210 may also send base station 222 a connectivity forecast report, with an indication of a future time window defined by a minimum time (T_min) and a maximum time (T_max). As shown, the connectivity forecast for a further time window may be on the order of minutes or hours. A connectivity forecast report may be obtained by UE 210 by predicting user behavior from historical usage data and user interaction data aggregated by UE 210 internally. For example, when UE 210 has an appointment in its calendar, UE 210 may accurately predict whether the user of UE 210 will attend the appointment. Further, UE 210 may map such a behavioral event to a connectivity event.

Additionally, base station 222 may send UE 210 a connectivity contextual report. Base station may also send UE 210 a configuration recommendation. Base station 222 may also share connectivity contextual data that may be used by UE 210 to drive internal connectivity decisions. For example, base station 222 may inform UE 210 that for the next 1 hour, base station 222 traffic load will be low. In such a scenario, UE 210 may perform data-heavy downloads that can be done proactively.

FIG. 22 is a diagram of an example of a table 2200 of user context to connectivity context data according to one or more implementations described herein. As shown, the columns of table 2200 may include user context understanding and prediction, connectivity context, and connectivity configuration recommendation. The rows of table 2200 may include entries for user sleeping, user woke up, UE entering mall, UE started displaying a playback video, UE about stream movie, and UE going to play real-time game.

The user context understanding and prediction for "user sleeping" is associated with the connectivity context of "UE data traffic being low for 20 mins" (the estimated sleep time), and the connectivity configuration recommendation of "increase UE connected mode discontinuous reception (CDRX), reduce power, allocated fewer resources." The user context understanding and prediction for "user woke up" is associated with the connectivity context of "UE will start using data", and the connectivity configuration recommendation of "Reduce CDRX and adjust resources, move UE to a less loaded cell."

The user context understanding and prediction for "UE entering mall" is associated with the connectivity context of "UE is going from outdoor to indoor", and the connectivity configuration recommendation of "Don't use frequency range 2 (FR2) or higher bands." The remaining user context understanding and predictions regarding "UE started displaying a playback video, UE about stream movie, and UE going to play real-time game" are shown in table 22. And the corresponding cells for the connectivity context column and the connectivity configuration recommendation column are likewise found in table 22.

FIGS. 23-26 are diagrams of example processes 2300, 2400, 2500, and 2600 (referred to collectively as processes 2300-2600) for UE-assisted, privacy-aware, data-driven NW control according to one or more implementations described herein. As shown, processes 2300-2600 may include UE 210, base station 222, A&A system 270 (also referred to here is as aggregation and analysis system 270) and NW control unit 280 (also referred to as data-driven network control unit 280). As such, processes 2300-2600 may be implemented by UE 210, base station 222, A&A system 270, and NW control unit 280. In some implementations, some or all of processes 2300-2600 may be performed by one or more other systems, devices, or components, including one or more of those of FIGS. 2 and 3. Additionally, processes 2300-2600 may include one or more fewer, additional, differently ordered and/or arranged operations than those shown. In some implementations, some or all of the operations of processes 2300-2600 may be performed independently, successively, simultaneously, etc., of one or more of the other operations of processes 2300-2600. As such, the techniques described herein are not limited to a number, sequence, arrangement, timing, etc., of the operations or process depicted in FIGS. 23-26. Indeed, the techniques described herein may include additional and alternative versions of processes 2300-2600.

Generally, example process 2300 may include operations for aggregated data coordination and coordination preparation. In practice, example process 2300 may precede any or all of example processes 2400, 2500, and 2600, each of which is generally directed to contextual coordination execution. Process 2400 is directed to a mode 1 data-driven UE-NW coordination scheme, involving a NW trigger, UE-based inference, and may be supported by any privacy level. Process 2500 is directed to a mode 2 data-driven UE-NW coordination scheme, involving a NW trigger, a NW-based inference, and may be supported by up to privacy level 2. Process 2600 is directed to a mode 3 data-driven UE-NW coordination scheme, involving a UE trigger and support for up to privacy level 2.

Referring to example 2300, operations 2305-2370 may correspond to aggregated data coordination, and operations 2380 and 2390 may correspond to coordination preparation. Aggregated data coordination and coordination preparation may be set at long periodic cycles (e.g., days or weeks) and may be agnostic to specific base stations 222 and/or UEs 210. As shown, UE 210, base station 222, A&A system 270, and NW control unit 280 may all participate in sharing configuration data (e.g., parameters, models, metrics frequencies, and more) (at 2305). NW control unit 280 may receive data from other base stations 222 (not shown) at 2310).

A&A system 270 may receive data from other UEs 210 (not shown) (at 2320). UE 210 may send user connectivity data to A&A system 270 (at 2330), and A&A system 270 may send aggregated data (e.g., metrics, statistics, histograms, etc.) to NW control unit 280 (at 2340). NW control unit 280 may send a base station model update to base station 222 (at 2350) and a UE models update to A&A system 270 (at 2360). A&A system 270 may send the same or a different UE models update to UE 210 (at 2370). This may complete aggregated data coordination. For coordination preparation, UE 210 and base station 222 may communicate with one another for model capability exchange and training requests (at 2380) and for model training and fine-tuning (at 2390).

Figure 24:
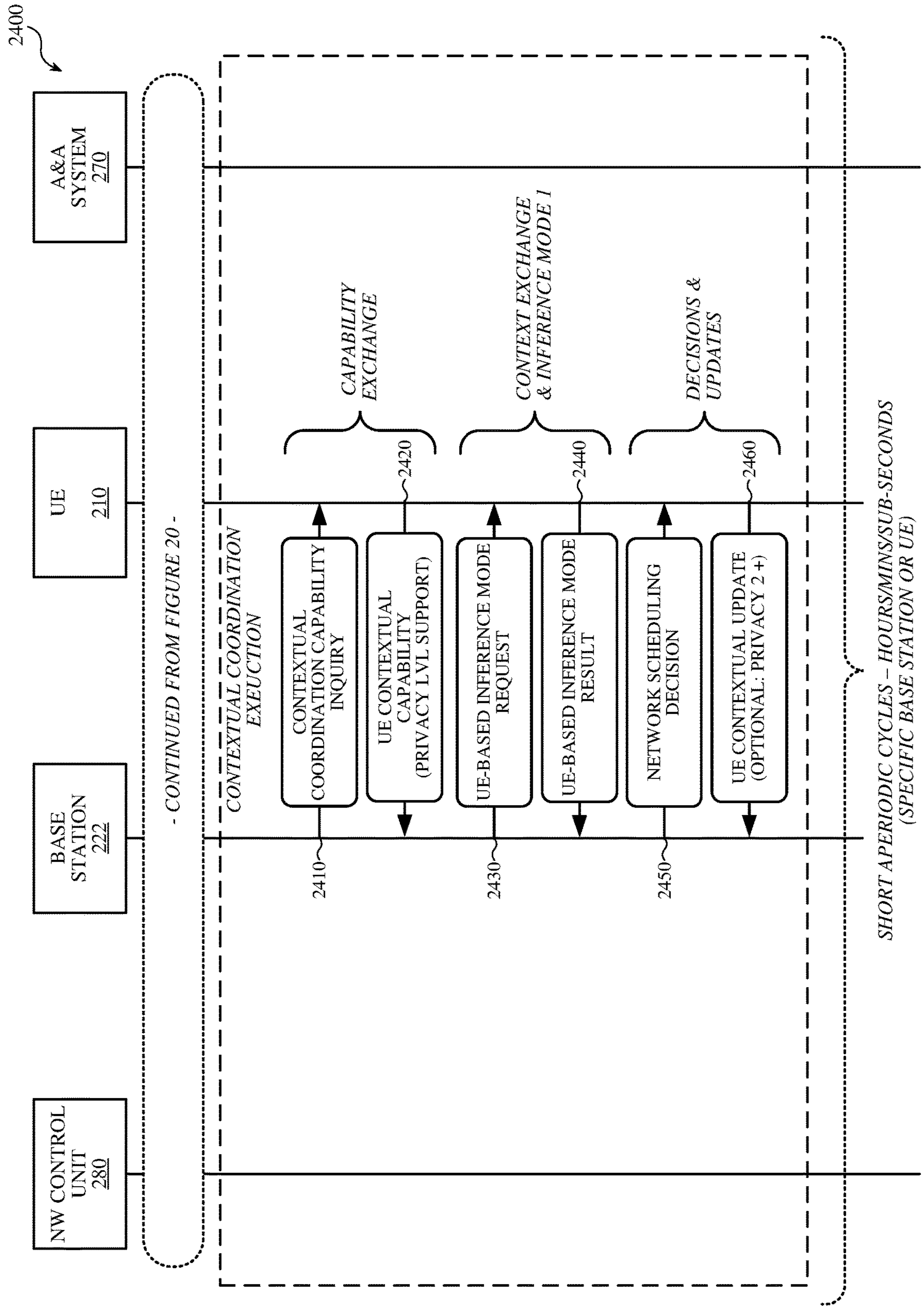

Referring to FIG. 24, operations 2410-2460 may contextual coordination execution, which may follow the operations of example 2300. Contextual coordination execution may be set to short, aperiodic cycles (e.g., hours, minutes, seconds, or sub-seconds) and may be specific to a particular base station 222 or UE 210. The contextual coordination execution of example 2400 may generally include a capability exchange, a context exchange & inference mode 1, and decisions and updates.

As shown, base station 222 may send a contextual coordination capability inquiry to UE 210 (at 2410), and UE 210 may respond by sending base station 222 UE contextual capability information (according to the privacy level supported) (at 2420). Base station 222 may send UE 210 a UE-based inference mode request (at 2430), and UE 210 may respond by sending base station 222 a UE-based inference mode result (at 2440). Base station 222 may send UE 210 a network scheduling decision (at 2450) which may be based on the UE-based inference mode result. And UE 210 may send base station 222 a UE contextual update (at 2460). In some implementations, the UE contextual update may indicate or include a privacy level of 2 or above as being supported.

Figure 25:
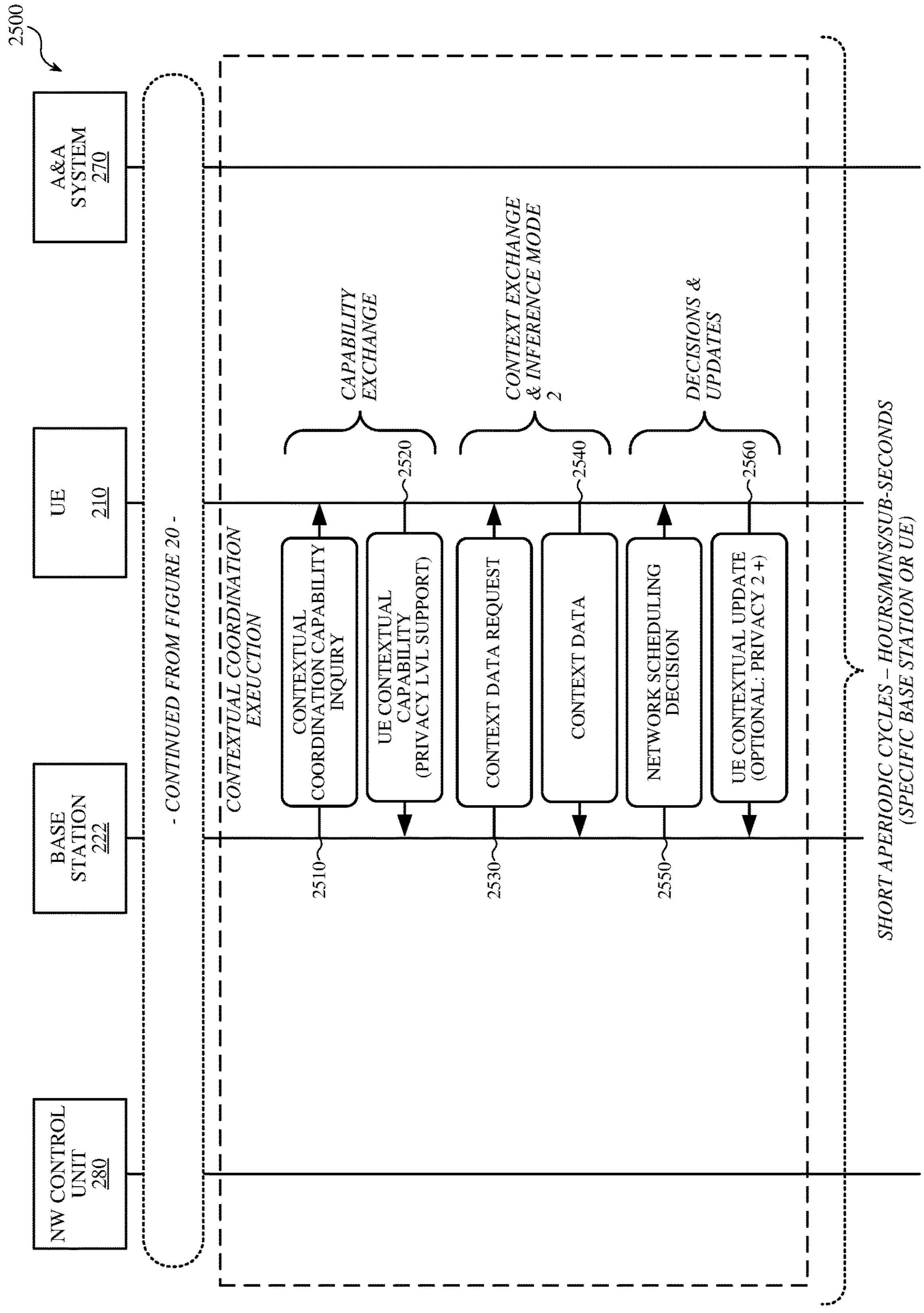

Referring to FIG. 25, operations 2510-2550 may contextual coordination execution, which may follow the operations of example 2300. Contextual coordination execution may be set to sort aperiodic cycles (e.g., hours, minutes, seconds, or sub-seconds) and may be specific to a particular base station 222 or UE 210. The contextual coordination execution of example 2500 may generally include a capability exchange, a context exchange & inference mode 2, and decisions and updates. In contrast to the contextual coordination execution of example 2400 involving a NW-based inference, the contextual coordination execution of example 2500 involves a UE-based inference.

As shown, base station 222 may send a contextual coordination capability inquiry to UE 210 (at 2510), and UE 210 may respond by sending base station 222 UE contextual capability information (according to the privacy level supported) (at 2520). Base station 222 may send UE 210 a context data request (at 2530), and UE 210 may respond by sending base station 222 context data (at 2540). The context exchange may involve inference mode 2. Base station 222 may send UE 210 a network scheduling decision (at 2550) which may be based on the context data from UE 210. And UE 210 may send base station 222 a UE contextual update (at 2560). In some implementations, the UE contextual update may indicate or include a privacy level of 2 or above as being supported.

Figure 26:
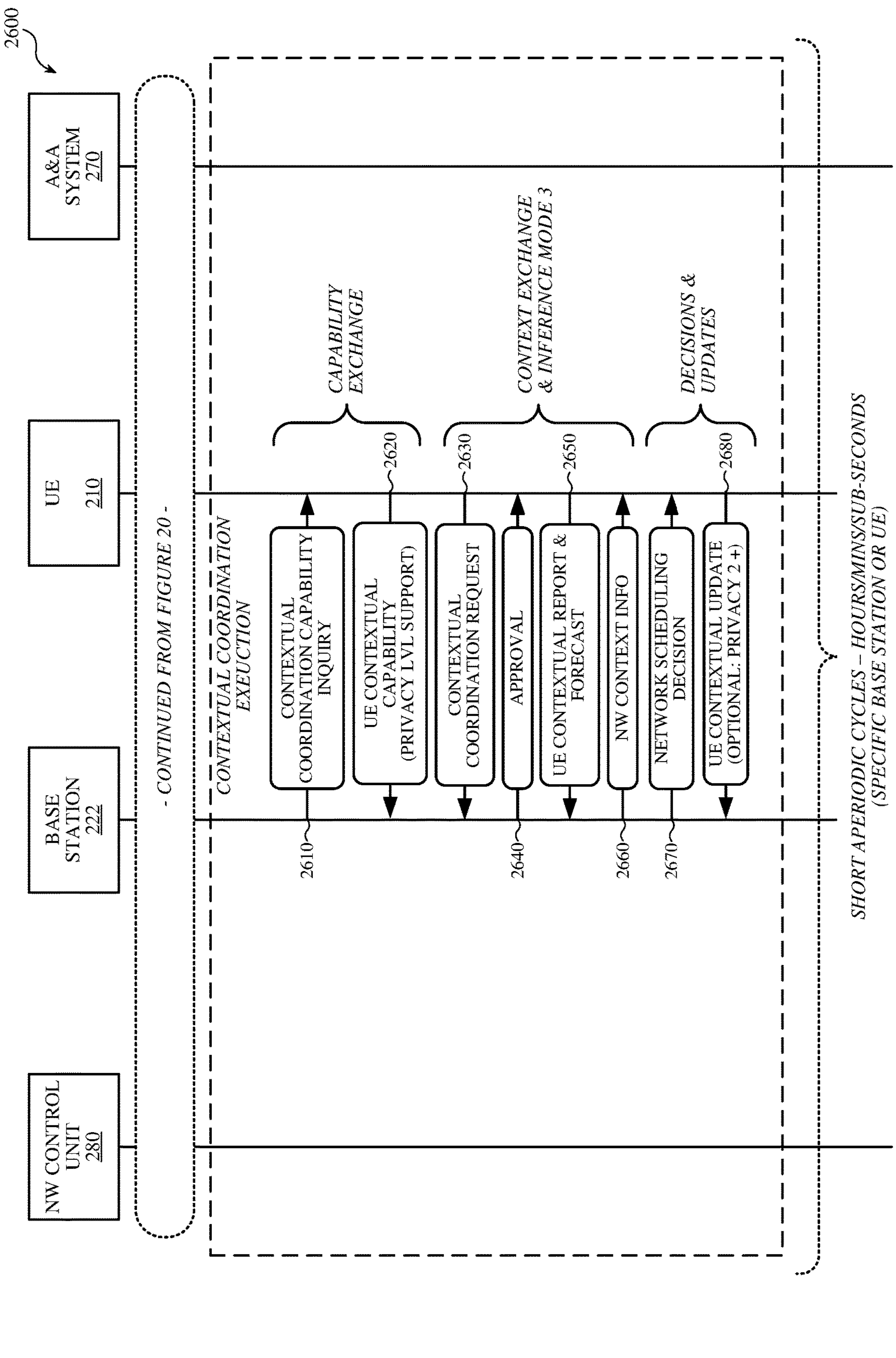

Referring to FIG. 26, operations 2610-2680 may contextual coordination execution, which may follow the operations of example 2300. Contextual coordination execution may be set to sort aperiodic cycles (e.g., hours, minutes, seconds, or sub-seconds) and may be specific to a particular base station 222 or UE 210. The contextual coordination execution of example 2600 may generally include a capability exchange, a context exchange & inference mode 3, and decisions and updates. In contrast to the contextual coordination execution of examples 2400 and 2500 being NW-triggered and inference-based, the contextual coordination execution of example 2600 may be UE-triggered and have no inference.

As shown, base station 222 may send a contextual coordination capability inquiry to UE 210 (at 2610), and UE 210 may respond by sending base station 222 UE contextual capability information (according to the privacy level supported) (at 2620). UE 210 may send base station 222 a contextual coordination request (at 2630), and base station 222 may send UE 210 an approval message in response thereto (at 2640). UE 210 may follow the approval by sending base station 222 a UE context report & forecast (at 2650), and base station 222 may send UE 210 NW context information (at 2660). Base station 222 may also send UE 210 a network scheduling decision (at 2670), and UE 210 may send base station 222 a UE contextual update (at 2560). In some implementations, the UE contextual update may indicate or include a privacy level of 2 or above as being supported.

Figure 27:
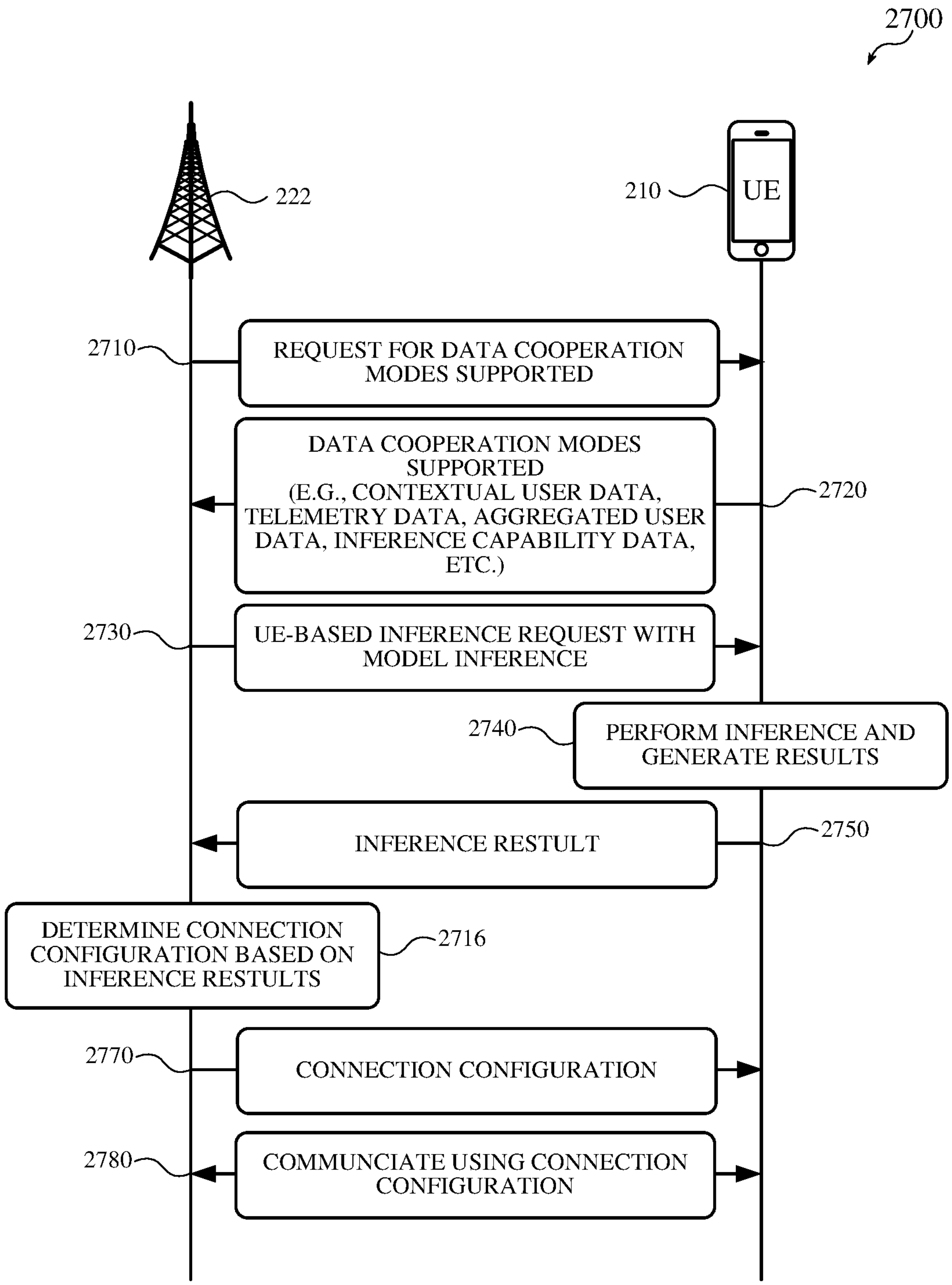
FIGS. 27-29 are diagrams of example processes for UE-assisted, privacy-aware, data-driven NW control according to one or more implementations described herein.
Figure 28:
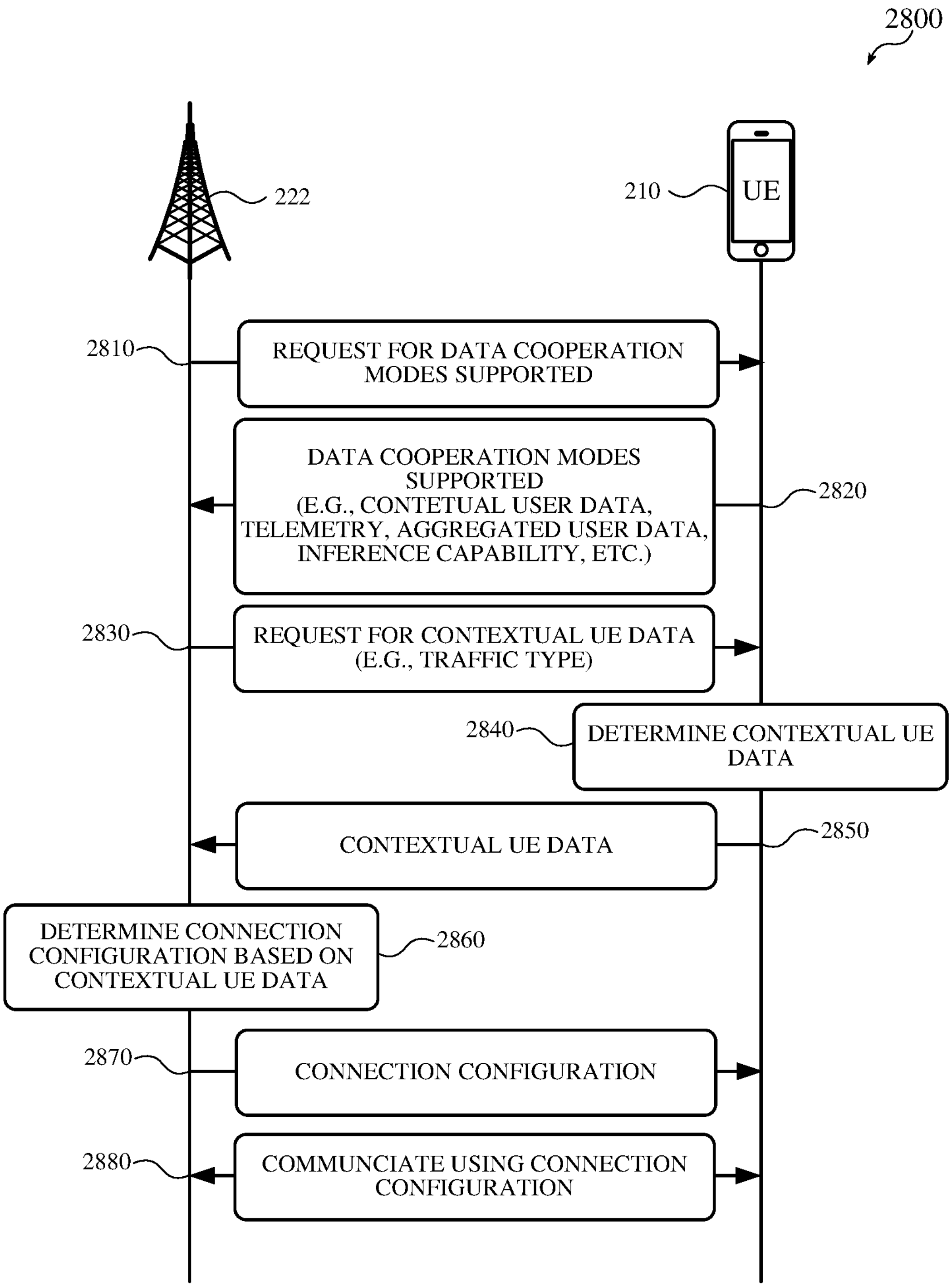
Figure 29:
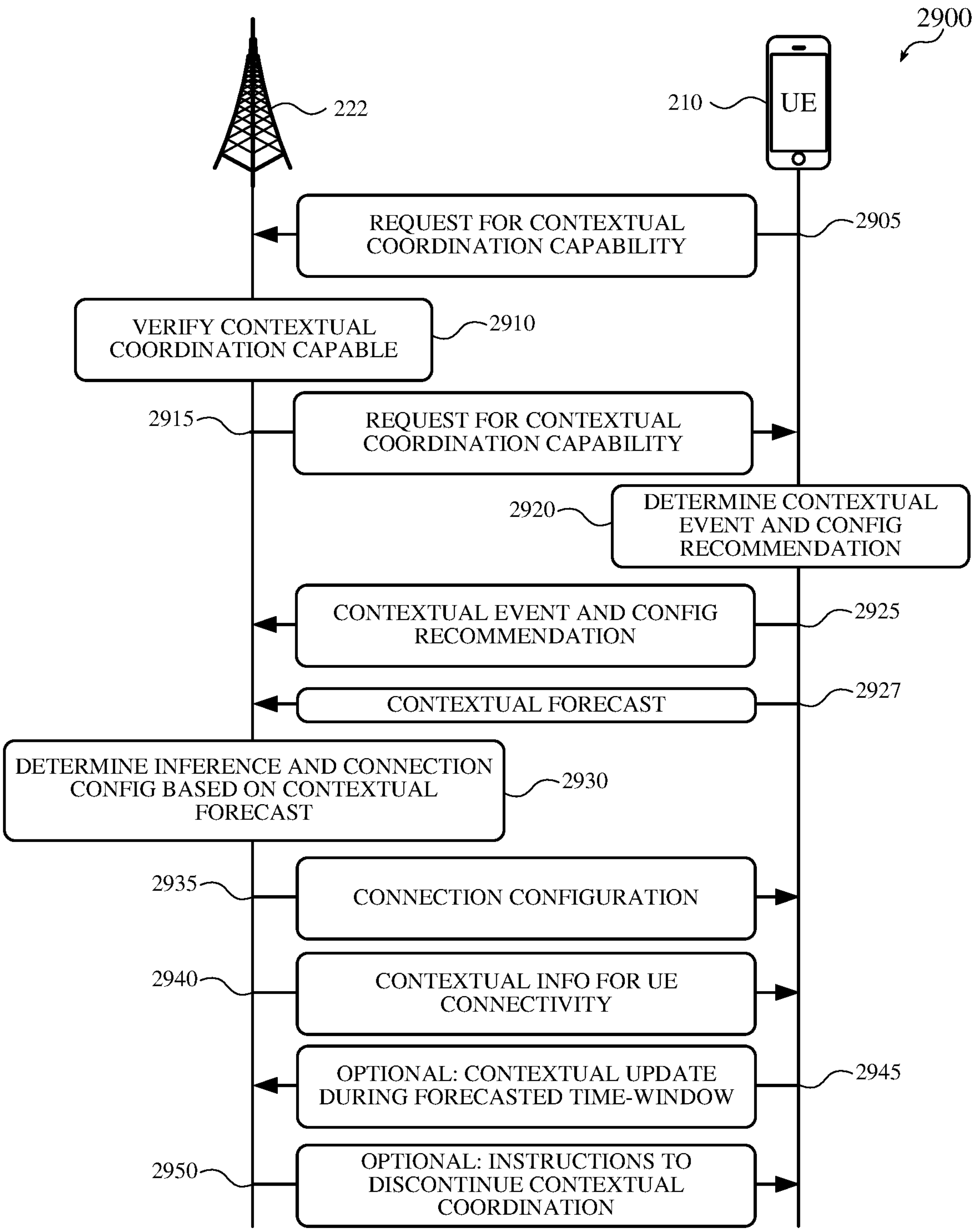

FIGS. 27-29 are diagrams of example processes 2700, 2800, and 2900 (referred to collectively as processes 2700-2900) UE-assisted, privacy-aware, data-driven NW control according to one or more implementations described herein. As shown, processes 2700-2900 may be implemented by UE 210 and base station 222. In some implementations, some or all of processes 2700-2900 may be performed by one or more other systems, devices, or components, including one or more of those of FIGS. 2 and 3. Additionally, processes 2700-2900 may include one or more fewer, additional, differently ordered and/or arranged operations than those shown. In some implementations, some or all of the operations of processes 2700-2900 may be performed independently, successively, simultaneously, etc., of one or more of the other operations of processes 2700-2900. As such, the techniques described herein are not limited to a number, sequence, arrangement, timing, etc., of the operations or process depicted in FIGS. 27-29. Indeed, the techniques described herein may include additional and alternative versions of processes 2700-2900.

Process 2700 is directed to mode 1 contextual coordination, involving a NW triggered, UE-based model inference. Process 2800 is directed to a mode 2 contextual coordination, involving a NW-triggered, NW-based model inference. Process 2900 is directed to a mode 3 contextual coordination, involving UE-trigger contextual coordination.

Referring to FIG. 27, process 2700 may include base station sending UE 210 a request for data cooperation modes supported by UE 210 (at 2710). UE 210 may respond by sending base station 222 an indication of data cooperation modes supported (at 2720). This may include contextual user data, telemetry data, aggregated user data, inference capability data, etc. Base station 222 may send UE 210 a UE-based inference request with a model inference (at 2730). UE 210 may perform an inference procedure and generate a resulting inference (at 2740) and may send the inference results to base station 222 (at 2750). Base station 222 may determine a connection configuration based on the inference results (at 2716) and sends the connection configuration to UE 210 (at 2770). Base station 222 and UE 210 may communicate with one another using the connection configuration (at 2780).

Referring to FIG. 28, process 2800 may include base station sending UE 210 a request for data cooperation modes supported by UE 210 (at 2810). UE 210 may respond by sending base station 222 an indication of data cooperation modes supported (at 2820). This may include contextual user data, telemetry data, aggregated user data, inference capability data, etc. Base station 222 may send UE 210 a request for contextual UE data (at 2830). The request may specify the context, such as traffic type data.

UE 210 may determine contextual UE data based on, or in accordance with, the request from base station 222 (2840). UE 210 may send the contextual UE data to base station 222 (at 2850). Base station 222 may determine a connection configuration based on the contextual UE data from UE 210 and may send the connection configuration to UE 210 (at 2870). UE 210 and base station 222 may use the connection configuration information to reconfigure or update a connection between UE 210 and base station 222, and UE 210 and base station 222 may proceed to use the updated connection to communicate with one another (at 2880).

Referring to FIG. 29, process 2900 may include UE 210 sending base station 222 a request for contextual coordination capability (at 2905). Base station 222 may determine or verify its capability for contextual coordination (at 2910) and may send a request to UE 210 for the contextual coordination capability of UE 210 (at 2915). UE 210 may determine a contextual event and a configuration recommendation (at 2920) and may send base station 222 the contextual event and a configuration recommendation (at 2925). UE 210 may also send a contextual forecast to base station 222 (at 2927).

Base station 222 may determine an inference and connection configuration based on the contextual forecast (at 2930) and may send the connection configuration to UE 210 (at 2935). Base station 222 may send UE 210 contextual information for UE connectivity (e.g., to guide UE connectivity) (at 2940). In some implementations, UE 210 may send base station 222 a contextual update during a forecasted time window (at 2945). Additionally, or alternatively, base station 222 may generate and provide UE 210 with instructions to discontinue contextual coordination (at 2950).

Figure 30:
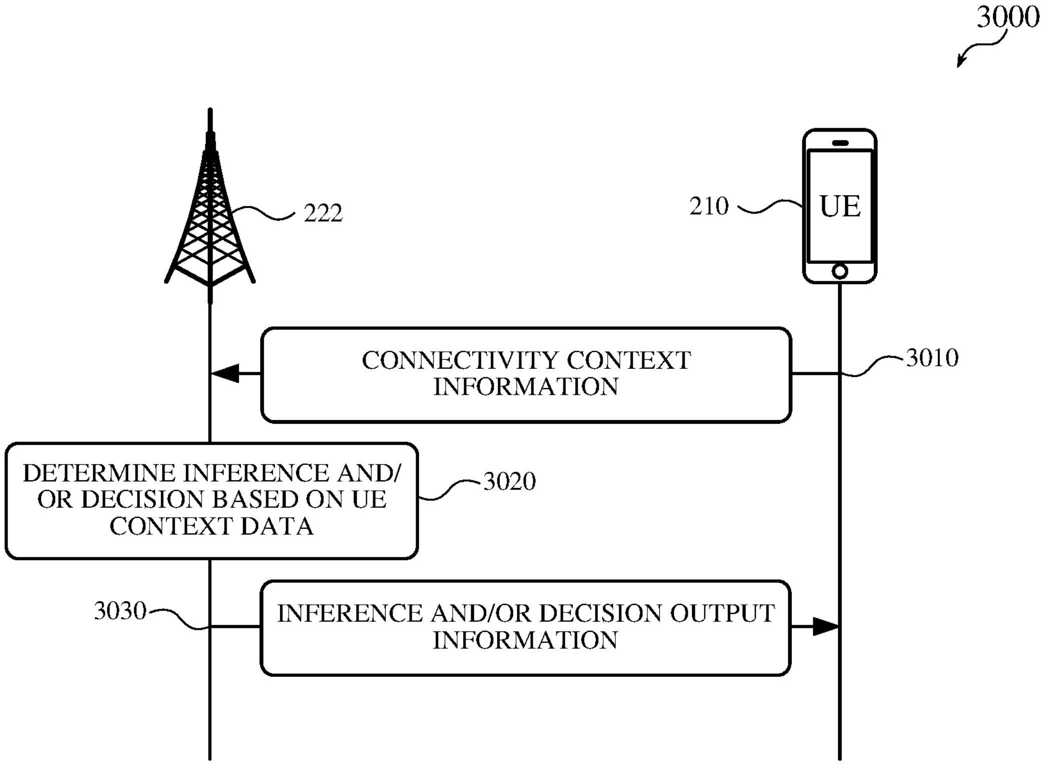
FIG. 30 is a diagram of an example process for a mode 1 NW-based inference procedure based on UE contextual data according to one or more implementations described herein.

FIG. 30 is a diagram of an example process 3000 for a mode 1 NW-based inference procedure based on UE contextual data. Process 3000 may be implemented by UE 210 and base station 222. In some implementations, some or all of process 3000 may be performed by one or more other systems, devices, or components, including one or more of those of FIGS. 2 and/or 3. Additionally, process 3000 may include one or more fewer, additional, differently ordered and/or arranged operations than those shown in FIG. 30. In some implementations, some or all of the operations of process 3000 may be performed independently, successively, simultaneously, etc., of one or more of the other operations of process 3000. As such, the techniques described herein are not limited to a number, sequence, arrangement, timing, etc., of the operations or process depicted in FIG. 30. Indeed, the techniques described herein may include additional and alternative versions of process 3000.

As shown, process 3000 may include UE 210 sending base station 222 connectivity context information (at 3010). Base station 222 may respond by determining an inference and/or decision based on UE context data (at 3020). Base station 222 may send UE 210 the inference and/or decision, or an indication thereof (at 3030).

Figure 31:
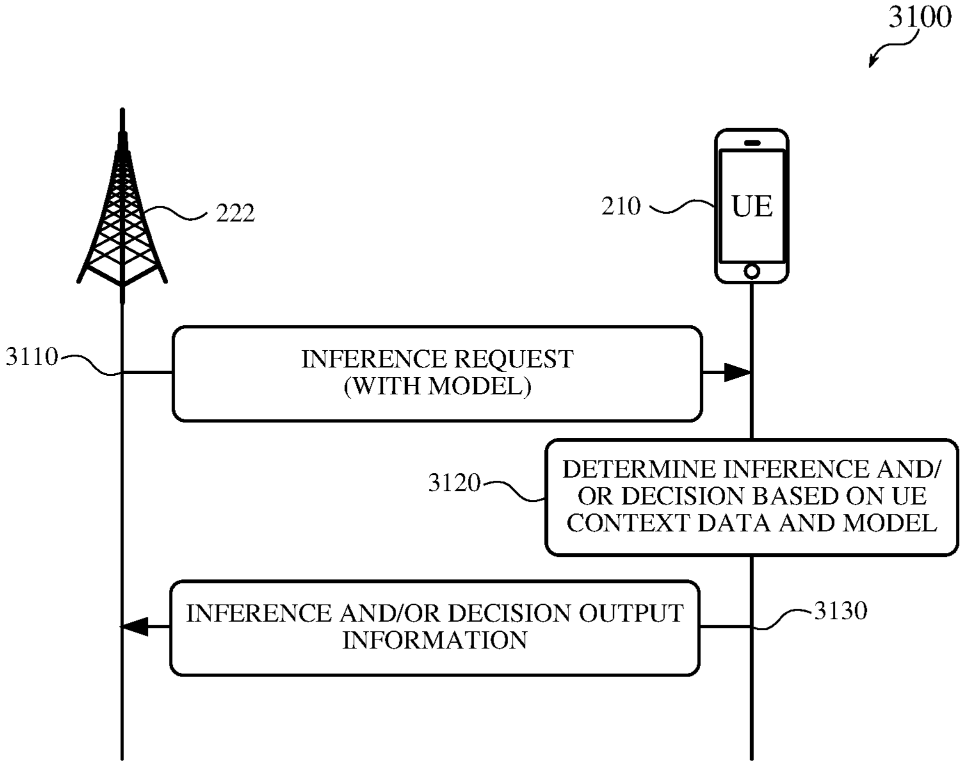
FIG. 31 is a diagram of an example process for a mode 2 UE-based inference procedure using a NW-shared model from UE individual data according to one or more implementations described herein.

FIG. 31 is a diagram of an example a process for a mode 2 UE-based inference procedure using a NW-shared model from UE individual data. Process 3100 may be implemented by UE 210 and base station 222. In some implementations, some or all of process 3100 may be performed by one or more other systems, devices, or components, including one or more of those of FIGS. 2 and/or 3. Additionally, process 3100 may include one or more fewer, additional, differently ordered and/or arranged operations than those shown in FIG. 31. In some implementations, some or all of the operations of process 3100 may be performed independently, successively, simultaneously, etc., of one or more of the other operations of process 3100. As such, the techniques described herein are not limited to a number, sequence, arrangement, timing, etc., of the operations or process depicted in FIG. 31. Indeed, the techniques described herein may include additional and alternative versions of process 3100.

As shown, process 3100 may include base station 222 sending an inference request to UE 210 (at 3110). The inference request may include or be sent with a model. The model may enable UE 210 to determine an inference based on user data. In some implementations, UE 210 may already have the model stored locally. In some implementations, base station 222 may only send part of a model or a truncated version of a larger model. In such scenarios the part of the model or truncated version of the model may be sufficient for UE 210 to generate a meaningful inference and/or making a decision after applying UE context data to the partial model. UE 210 may determine an inference and/or decision based on UE context data and the model (block 3120). UE 210 may send the inference, decision, and/or decision output information with base station 222 (at 3130).

Figure 32:
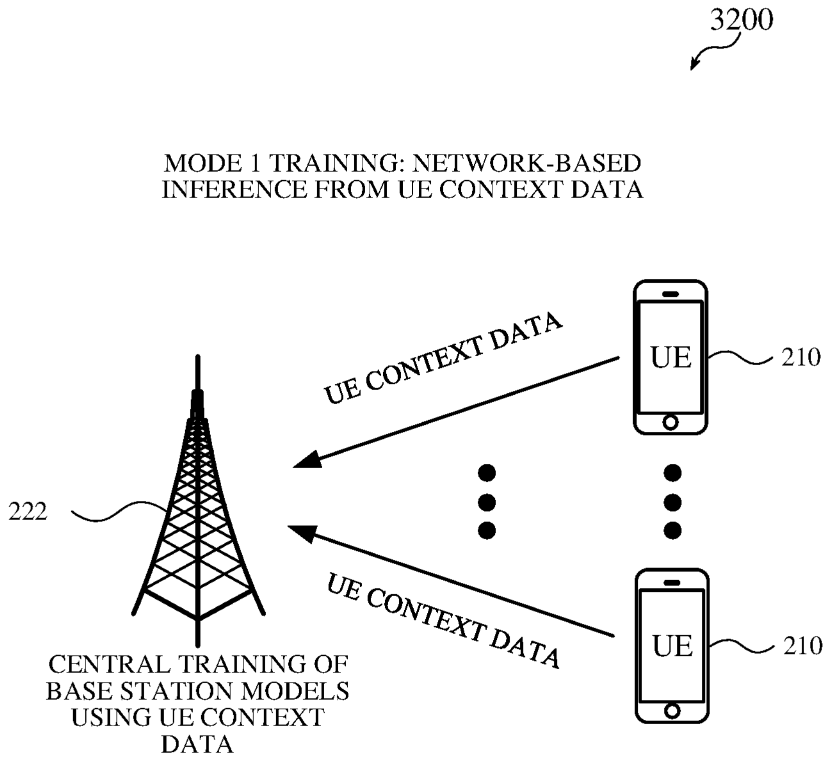
FIG. 32 is a diagram of an example schematic for centralized training of a NW model using UE context data according to one or more implementations described herein.

FIG. 32 is a diagram of an example schematic 3200 for centralized training of a NW model using UE context data according to one or more implementations described herein. Base station 222 may include one or more models to which data may be applied for determining an inference and/or making a decision about a UE 210, connection with UE 210, resources allocated to UE 210, etc. UEs 210 may provide base station 222 with UE context data, and base station 222 may train the one or more models based on the UE context data. Doing so may provide a centralized solution for training base station models, for NW-based inference capabilities, based on UE context data. In some implementations, this may occur during a coordination and preparation phase of the techniques described herein.

Figure 33:
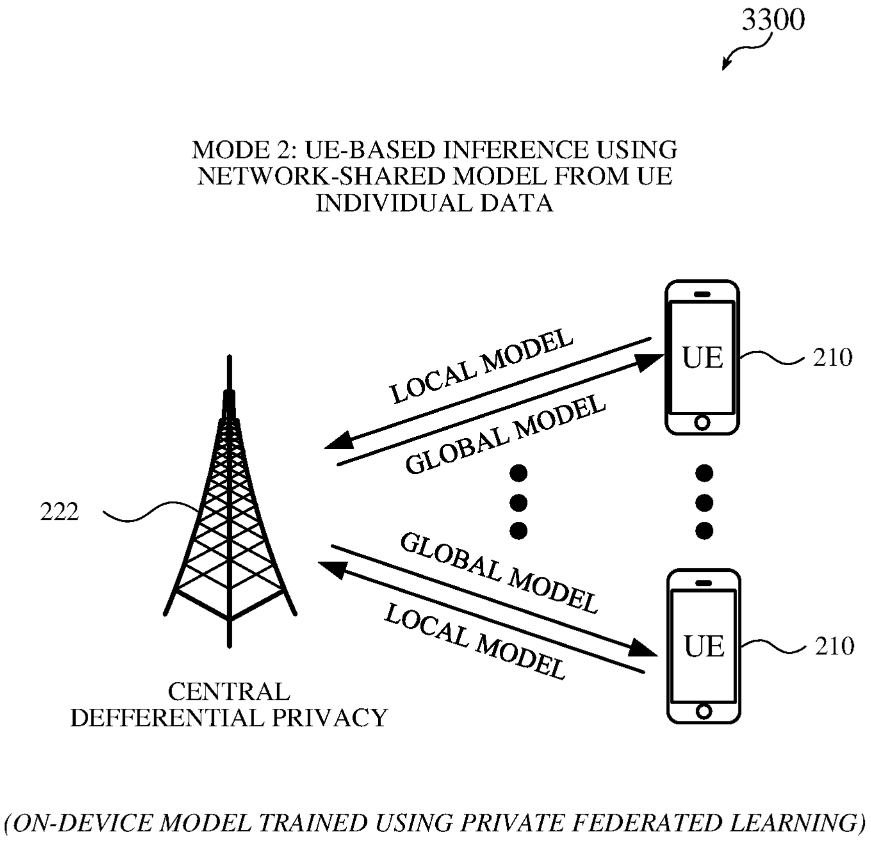
FIG. 33 is a diagram of an example schematic for decentralized training of UE models using individual UE data according to one or more implementations

FIG. 33 is a diagram of an example schematic 3300 for decentralized training of UE models using individual UE data according to one or more implementations described herein. Base station 222 may include a global model that may be sent to multiple UEs 210. UEs 210 may train the model using individual UE data, which may include private information the UE 210 may not be able to send to base station 222. Upon training the model, each UE 210 may send the updated model (now a local model) to base station 222, and base station 222 may combine the local models of multiple UEs 210 into a single model used for network optimization. In this manner, the model used by base station 222 may benefit from private information stored at multiple UEs 210 without the UEs 210 having to send the private information to base station 222.

Figure 34:
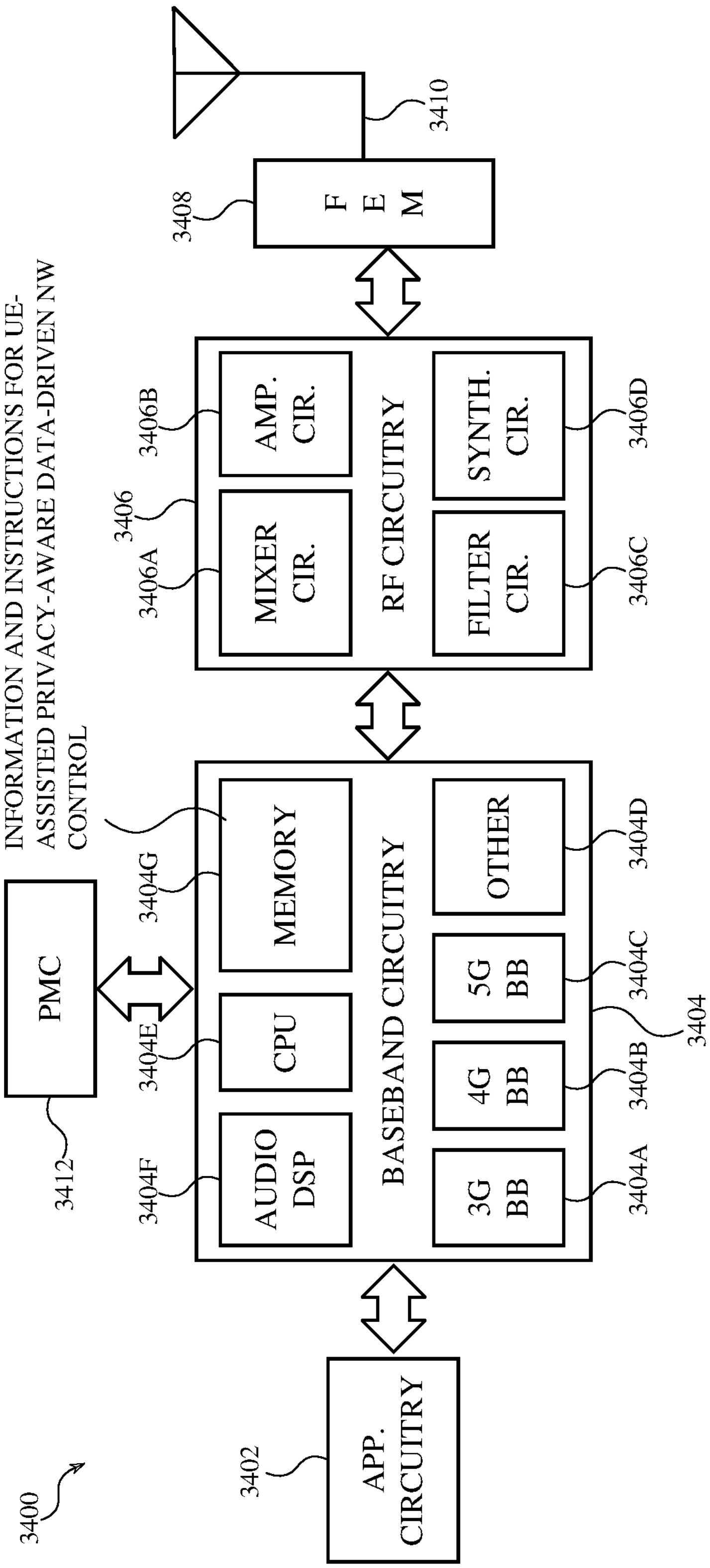
FIG. 34 is a diagram of an example of components of a device according to one or more implementations described herein.

FIG. 34 is a diagram of an example of components of a device according to one or more implementations described herein. In some implementations, the device 3400 can include application circuitry 3402, baseband circuitry 3404, RF circuitry 3406, front-end module (FEM) circuitry 3408, one or more antennas 3410, and power management circuitry (PMC) 3412 coupled together at least as shown. The components of the illustrated device 3400 can be included in a UE or a RAN node. In some implementations, the device 3400 can include fewer elements (e.g., a RAN node may not utilize application circuitry 3402, and instead include a processor/controller to process IP data received from a CN or an Evolved Packet Core (EPC)). In some implementations, the device 3400 can include additional elements such as, for example, memory/storage, display, camera, sensor (including one or more temperature sensors, such as a single temperature sensor, a plurality of temperature sensors at different locations in device 3400, etc.), or input/output (I/O) interface. In other implementations, the components described below can be included in more than one device (e.g., said circuitries can be separately included in more than one device for Cloud-RAN (C-RAN) implementations).

The application circuitry 3402 can include one or more application processors. For example, the application circuitry 3402 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 3400. In some implementations, processors of application circuitry 3402 can process IP data packets received from an EPC.

The baseband circuitry 3404 can include circuitry such as, but not limited to, one or more single-core or multi-core processors. The baseband circuitry 3404 can include one or more baseband processors or control logic to process baseband signals received from a receive signal path of the RF circuitry 3406 and to generate baseband signals for a transmit signal path of the RF circuitry 3406. Baseband circuitry

3404 can interface with the application circuitry 3402 for generation and processing of the baseband signals and for controlling operations of the RF circuitry 3406. For example, in some implementations, the baseband circuitry 3404 can include a 3G baseband processor 3404A, a 4G baseband processor 3404B, a 5G baseband processor 3404C, or other baseband processor(s) 3404D for other existing generations, generations in development or to be developed in the future (e.g., 5G, 6G, etc.).

The baseband circuitry 3404 (e.g., one or more of baseband processors 3404A-D) can handle various radio control functions that enable communication with one or more radio networks via the RF circuitry 3406. In other implementations, some or all of the functionality of baseband processors 3404A-D can be included in modules stored in the memory 3404G and executed via a Central Processing Unit (CPU) 3404E. The radio control functions can include, but are not limited to, signal modulation/demodulation, encoding/decoding, radio frequency shifting, etc. In some implementations, modulation/demodulation circuitry of the baseband circuitry 3404 can include Fast-Fourier Transform (FFT), precoding, or constellation mapping/de-mapping functionality. In some implementations, encoding/decoding circuitry of the baseband circuitry 3404 can include convolution, tail-biting convolution, turbo, Viterbi, or Low-Density Parity Check (LDPC) encoder/decoder functionality. Implementations of modulation/demodulation and encoder/decoder functionality are not limited to these examples and can include other suitable functionality in other implementations.

In some implementations, memory 3404G may receive and/or store information and instructions 3555 for UE-assisted privacy-aware data-driven NW control as described herein. UEs 210, base stations 222, aggregation and analysis system 270, and data-driven NW control unit 280 may coordinate and cooperate with one another to enhance the efficiency and effectiveness of a wireless communication network by implementing machine learning tools at each device and exchanging information in a manner that enables the training, development, and use of models. Information of various levels of privacy may be exchanged, protected, anonymized, etc., to enable UE-assisted privacy-aware data-driven NW control while still protecting the privacy of individual users.

In some implementations, the baseband circuitry 3404 can include one or more audio digital signal processor(s) (DSP) 3404F. The audio DSPs 3404F can include elements for compression/decompression and echo cancellation and can include other suitable processing elements in other implementations. Components of the baseband circuitry can be suitably combined in a single chip, a single chipset, or disposed on a same circuit board in some implementations. In some implementations, some or all of the constituent components of the baseband circuitry 3404 and the application circuitry 3402 can be implemented together such as, for example, on a system on a chip (SOC).

In some implementations, the baseband circuitry 3404 can provide for communication compatible with one or more radio technologies. For example, in some implementations, the baseband circuitry 3404 can support communication with a NG-RAN, an evolved universal terrestrial radio access network (EUTRAN) or other wireless metropolitan area networks (WMAN), a wireless local area network (WLAN), a wireless personal area network (WPAN), etc. Implementations in which the baseband circuitry 3404 is configured to support radio communications of more than one wireless protocol can be referred to as multi-mode baseband circuitry.

RF circuitry 3406 can enable communication with wireless networks using modulated electromagnetic radiation through a non-solid medium. In various implementations, the RF circuitry 3406 can include switches, filters, amplifiers, etc. to facilitate the communication with the wireless network. RF circuitry 3406 can include a receive signal path which can include circuitry to down-convert RF signals received from the FEM circuitry 3408 and provide baseband signals to the baseband circuitry 3404. RF circuitry 3406 can also include a transmit signal path which can include circuitry to up-convert baseband signals provided by the baseband circuitry 3404 and provide RF output signals to the FEM circuitry 3408 for transmission.

In some implementations, the receive signal path of the RF circuitry 3406 can include mixer circuitry 3406A, amplifier circuitry 3406B and filter circuitry 3406C. In some implementations, the transmit signal path of the RF circuitry 3406 can include filter circuitry 3406C and mixer circuitry 3406A. RF circuitry 3406 can also include synthesizer circuitry 3406D for synthesizing a frequency for use by the mixer circuitry 3406A of the receive signal path and the transmit signal path. In some implementations, the mixer circuitry 3406A of the receive signal path can be configured to down-convert RF signals received from the FEM circuitry 3408 based on the synthesized frequency provided by synthesizer circuitry 3406D. The amplifier circuitry 3406B can be configured to amplify the down-converted signals and the filter circuitry 3406C can be a low-pass filter (LPF) or band-pass filter (BPF) configured to remove unwanted signals from the down-converted signals to generate output baseband signals. Output baseband signals can be provided to the baseband circuitry 3404 for further processing. In some implementations, the output baseband signals can be zero-frequency baseband signals, although this is not a requirement. In some implementations, mixer circuitry 3406A of the receive signal path can comprise passive mixers, although the scope of the implementations is not limited in this respect.

In some implementations, the mixer circuitry 3406A of the transmit signal path can be configured to up-convert input baseband signals based on the synthesized frequency provided by the synthesizer circuitry 3406D to generate RF output signals for the FEM circuitry 3408. The baseband signals can be provided by the baseband circuitry 3404 and can be filtered by filter circuitry 3406C.

In some implementations, the mixer circuitry 3406A of the receive signal path and the mixer circuitry 3406A of the transmit signal path can include two or more mixers and can be arranged for quadrature down conversion and up conversion, respectively. In some implementations, the mixer circuitry 3406A of the receive signal path and the mixer circuitry 3406A of the transmit signal path can include two or more mixers and can be arranged for image rejection (e.g., Hartley image rejection). In some implementations, the mixer circuitry 3406A of the receive signal path and the mixer circuitry' 1406A can be arranged for direct down conversion and direct up conversion, respectively. In some implementations, the mixer circuitry 3406A of the receive signal path and the mixer circuitry 3406A of the transmit signal path can be configured for super-heterodyne operation.

In some implementations, the output baseband signals, and the input baseband signals can be analog baseband signals, although the scope of the implementations is not limited in this respect. In some alternate implementations, the output baseband signals, and the input baseband signals can be digital baseband signals. In these alternate implementations, the RF circuitry 3406 can include analog-to-digital converter (ADC) and digital-to-analog converter (DAC) circuitry and the baseband circuitry 3404 can include a digital baseband interface to communicate with the RF circuitry 3406.

In some dual-mode implementations, a separate radio IC circuitry can be provided for processing signals for each spectrum, although the scope of the implementations is not limited in this respect.

In some implementations, the synthesizer circuitry 3406D can be a fractional-N synthesizer or a fractional N/N+1 synthesizer, although the scope of the implementations is not limited in this respect as other types of frequency synthesizers can be suitable. For example, synthesizer circuitry 3406D can be a delta-sigma synthesizer, a frequency multiplier, or a synthesizer comprising a phase-locked loop with a frequency divider.

The synthesizer circuitry 3406D can be configured to synthesize an output frequency for use by the mixer circuitry 3406A of the RF circuitry 3406 based on a frequency input and a divider control input. In some implementations, the synthesizer circuitry 3406D can be a fractional N/N+1 synthesizer.

In some implementations, frequency input can be provided by a voltage-controlled oscillator (VCO), although that is not a requirement. Divider control input can be provided by either the baseband circuitry 3404 or the applications circuitry 3402 depending on the desired output frequency. In some implementations, a divider control input (e.g., N) can be determined from a look-up table based on a channel indicated by the applications circuitry 3402.

Synthesizer circuitry 3406D of the RF circuitry 3406 can include a divider, a delay-locked loop (DLL), a multiplexer and a phase accumulator. In some implementations, the divider can be a dual modulus divider (DMD) and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 3406D can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 3406 can include an IQ/polar converter.

FEM circuitry 3408 can include a receive signal path which can include circuitry configured to operate on RF signals received from one or more antennas 3410, amplify the received signals and provide the amplified versions of the received signals to the RF circuitry 3406 for further processing. FEM circuitry 3408 can also include a transmit signal path which can include circuitry configured to amplify signals for transmission provided by the RF circuitry 3406 for transmission by one or more of the one or more antennas 3410. In various implementations, the amplification through the transmit or receive signal paths can be done solely in the RF circuitry 3406, solely in the FEM circuitry 3408, or in both the RF circuitry 3406 and the FEM circuitry 3408.

In some implementations, the FEM circuitry 3408 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 3406). The transmit signal path of the FEM circuitry 3408 can include a power amplifier (PA) to amplify input RF signals (e.g., provided by RF circuitry 3406), and one or more filters to generate RF signals for subsequent transmission (e.g., by one or more of the one or more antennas 3410).

In some implementations, the PMC 3412 can manage power provided to the baseband circuitry 3404. In particular, the PMC 3412 can control power-source selection, voltage scaling, battery charging, or DC-to-DC conversion. The PMC 3412 can often be included when the device 3400 is capable of being powered by a battery, for example, when the device is included in a UE. The PMC 3412 can increase the power conversion efficiency while providing desirable implementation size and heat dissipation characteristics.

While FIG. 34 shows the PMC 3412 coupled only with the baseband circuitry 3404. However, in other implementations, the PMC 3412 may be additionally or alternatively coupled with, and perform similar power management operations for, other components such as, but not limited to, application circuitry 3402, RF circuitry 3406, or FEM circuitry 3408.

In some implementations, the PMC 3412 can control, or otherwise be part of, various power saving mechanisms of the device 3400. For example, if the device 3400 is in an RRC_Connected state, where it is still connected to the RAN node as it expects to receive traffic shortly, then it can enter a state known as Discontinuous Reception Mode (DRX) after a period of inactivity. During this state, the device 3400 can power down for brief intervals of time and thus save power.

If there is no data traffic activity for an extended period of time, then the device 3400 can transition off to an RRC_Idle state, where it disconnects from the network and does not perform operations such as channel quality feedback, handover, etc. The device 3400 goes into a very low power state and it performs paging where again it periodically wakes up to listen to the network and then powers down again. The device 3400 may not receive data in this state; in order to receive data, it can transition back to RRC_Connected state.

An additional power saving mode can allow a device to be unavailable to the network for periods longer than a paging interval (ranging from seconds to a few hours). During this time, the device is unreachable to the network and can power down completely. Any data sent during this time incurs a large delay and it is assumed the delay is acceptable.

Processors of the application circuitry 3402 and processors of the baseband circuitry 3404 can be used to execute elements of one or more instances of a protocol stack. For example, processors of the baseband circuitry 3404, alone or in combination, can be used execute Layer 3, Layer 2, or Layer 1 functionality, while processors of the baseband circuitry 3404 can utilize data (e.g., packet data) received from these layers and further execute Layer 4 functionality (e.g., transmission communication protocol (TCP) and user datagram protocol (UDP) layers). As referred to herein, Layer 3 can comprise a RRC layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 35:
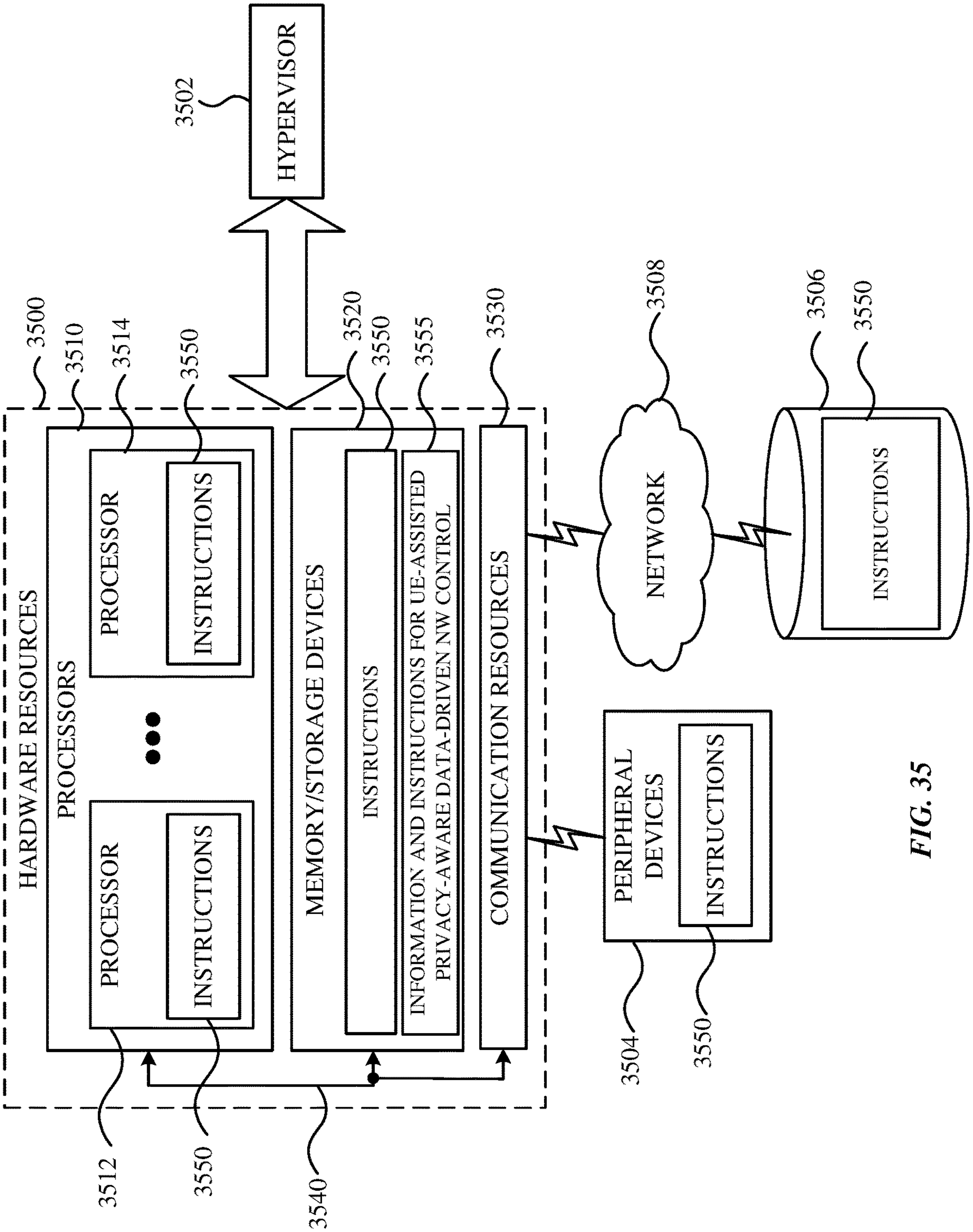
FIG. 35 is a block diagram illustrating components, according to one or more implementations described herein, able to read instructions from a machine-readable or computer-readable medium (e.g., a non-transitory machine-read-able storage medium) and perform any one or more of the methodologies discussed herein.

FIG. 35 is a block diagram illustrating components, according to some example implementations, able to read instructions from a machine-readable or computer-readable medium (e.g., a non-transitory machine-readable storage medium) and perform any one or more of the methodologies discussed herein. Specifically, FIG. 35 shows a diagrammatic representation of hardware resources 3500 including one or more processors (or processor cores) 3510, one or more memory/storage devices 3520, and one or more communication resources 3530, each of which may be communicatively coupled via a bus 3540. For implementations where node virtualization (e.g., NFV) is utilized, a hypervisor 3502 may be executed to provide an execution environment for one or more network slices/sub-slices to utilize the hardware resources 3500

The processors 3510 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 3512 and a processor 3514.

The memory/storage devices 3520 may include main memory, disk storage, or any suitable combination thereof. The memory/storage devices 3520 may include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

In some implementations, memory/storage devices 3520 receive and/or store information and instructions 3555 for UE-assisted privacy-aware data-driven NW control as described herein. UEs 210, base stations 222, aggregation and analysis system 270, and data-driven NW control unit 280 may coordinate and cooperate with one another to enhance the efficiency and effectiveness of a wireless communication network by implementing machine learning tools at each device and exchanging information in a manner that enables the training, development, and use of models. Information of various levels of privacy may be exchanged, protected, anonymized, etc., to enable UE-assisted privacy-aware data-driven NW control while still protecting the privacy of individual users.

The communication resources 3530 may include interconnection or network interface components or other suitable devices to communicate with one or more peripheral devices 3504 or one or more databases 3506 via a network 3508. For example, the communication resources 3530 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 3550 may comprise software, a program, an application, an applet, an app, or other executable code for causing at least any of the processors 3510 to perform any one or more of the methodologies discussed herein. The instructions 3550 may reside, completely or partially, within at least one of the processors 3510 (e.g., within the processor's cache memory), the memory/storage devices 3520, or any suitable combination thereof. Furthermore, any portion of the instructions 3550 may be transferred to the hardware resources 3500 from any combination of the peripheral devices 3504 or the databases 3506. Accordingly, the memory of processors 3510, the memory/storage devices 3520, the peripheral devices 3504, and the databases 3506 are examples of computer-readable and machine-readable media.

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

In example 1, which may also include one or more of the examples described herein, a user equipment (UE), comprising: a memory; and a processor configured to, when executing instructions stored in the memory, cause the processor to: generate user activity data and connectivity context data; determine, based on the user activity and the connectivity context data, contextual inference regarding a connection between the UE and a base station; generate, based on the contextual inference, a connectivity context update; and communicate the connectivity context update to the base station.

In example 2, which may also include one or more of the examples described herein, wherein the contextual inference is based on a predictive model. In example 3, which may also include one or more of the examples described herein, wherein the predictive model trained based on historical user activity data and historical connectivity context data. In example 4, which may also include one or more of the examples described herein, wherein the processor is further to: determine, based on the contextual inference, a configuration recommendation.

In example 5, which may also include one or more of the examples described herein, wherein the processor is further to: communicate the configuration recommendation to the base station. In example 6, which may also include one or more of the examples described herein, wherein the user activity data comprise private user data and the connectivity context update does not include private user data. In example 7, which may also include one or more of the examples described herein, a server device, comprising: a memory; and a processor configured to, when executing instructions stored in the memory, cause the processor to: receive information from a plurality of user equipment (UEs); process the information to produce a plurality of metrics of a wireless communication network; and provide the metrics of the wireless communication network to a data-driven network (NW) control unit.

In example 8, which may also include one or more of the examples described herein, wherein the information from the plurality of UEs correspond to a time window. In example 9, which may also include one or more of the examples described herein, wherein the information from the plurality of UEs correspond to a geographic location. In example 10, which may also include one or more of the examples described herein, wherein the metrics are provided to the data-driven NW control unit according to aggregate coordination cycles. In example 11, which may also include one or more of the examples described herein, wherein the plurality of metrics are provided to the data-driven NW control unit with forecast data.

In example 12, which may also include one or more of the examples described herein, a method performed by a user equipment (UE), the method comprising: generating user activity data and connectivity context data; determining, based on the user activity and the connectivity context data, contextual inference regarding a connection between the UE and a base station; generating, based on the contextual inference, a connectivity context update; and communicating the connectivity context update to the base station.

In example 13, which may also include one or more of the examples described herein, a device substantially as shown and described. In example 14, which may also include one or more of the examples described herein, a method substantially as shown and described. In example 15, which may also include one or more of the examples described herein, a system substantially as shown and described.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description or the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled to minimize risks of unintentional or unauthorized access or use, and the nature of authorized use should be clearly indicated to users.

What is claimed is:

1. A user equipment (UE), comprising:

a memory storing instructions; and a processor configured to, when executing the instructions stored in the memory, cause the UE to:

generate user activity data and connectivity context data, wherein the user activity data includes private user information;

determine, based on the user activity data and the connectivity context data, a contextual inference regarding connectivity of the UE with a base station;

generate, based on the contextual inference, a connectivity context update that is abstracted from the contextual inference to represent a connectivity need of the UE while excluding the private user information according to a privacy policy; and communicate the connectivity context update to the base station.

2. The UE of claim 1, wherein the contextual inference is based on a predictive model configured to infer the connectivity need of the UE for an upcoming time window from the user activity data and the connectivity context data.

3. The UE of claim 2, wherein the predictive model is trained based on historical user activity data and historical connectivity context data.

4. The UE of claim 1, wherein the processor is further configured to determine, based on the contextual inference, a configuration recommendation for a connection between the UE and the base station to be communicated to the base station.

5. The UE of claim 4, wherein the connectivity context update is categorical or qualitative data.

6. The UE of claim 1, wherein the connectivity context update comprises an indication of a type of application instead of an exact application, a traffic category or categorical amount of data traffic, or whether the UE is indoor or outdoor for an upcoming time window.

7. The UE of claim 1, wherein the user activity data is generated based on a user interaction with sensors, applications, and/or operations of the UE.

8. The UE of claim 1, wherein the connectivity context data includes information relating to characteristics of a connection between the UE and the base station including traffic intensity, cellular state, or network context.

9. A server device, comprising:

a memory storing instructions; and a processor configured to, when executing the instructions stored in the memory, cause the processor to:

receive information from a plurality of user equipments (UEs) corresponding to a past time window;

aggregate the information from the plurality of UEs using a privacy-preserving aggregation technique to generate a plurality of metrics of a wireless communication network, the plurality of metrics excluding confidential information about a specific user; and provide the plurality of metrics to a data-driven network (NW) control unit.

10. The server device of claim 9, wherein the privacy-preserving aggregation technique include anonymization, privacy-preserving aggregation, or cryptographic splitting.

11. The server device of claim 9, wherein the information from the plurality of UEs includes abstracted geographic locations of the plurality of UEs after applying privacy policy.

12. The server device of claim 9, wherein the metrics are provided to the data-driven NW control unit according to aggregate coordination cycles.

13. The server device of claim 9, wherein the processor is further configured to generate, from the aggregated information, forecast data comprising a connectivity usage forecast for an upcoming time window generated and to provide the forecast data to the data-driven network control unit.

14. The server device of claim 9, wherein the information indicates user activity and does not contain any confidential information about a specific user.

15. A method performed by a user equipment (UE), the method comprising:

generating user activity data and connectivity context data, wherein the user activity data includes private user information;

determining, based on the user activity data and the connectivity context data, a contextual inference regarding connectivity of the UE with a base station;

generating, based on the contextual inference, a connectivity context update that is abstracted from the contextual inference and at least one of the user activity data or the connectivity context data to represent a connectivity need of the UE while excluding the private user information according to a privacy policy; and communicating the connectivity context update to the base station.

16. The method of claim 15, wherein the contextual inference is based on a predictive model configured to infer the connectivity need of the UE for an upcoming time window from the user activity data and the connectivity context data.

17. The method of claim 16, wherein the predictive model is trained based on historical user activity data and historical connectivity context data.

18. The method of claim 15, further comprising determining, based on the contextual inference, a configuration recommendation for a connection between the UE and the base station to be communicated to the base station.

19. The method of claim 18, wherein the connectivity context update comprises an indication of a type of application instead of an exact application, a traffic category or categorical amount of data traffic, or whether the UE is indoor or outdoor.

20. The method of claim 15, wherein the connectivity context update comprises categorical or qualitative UE or connectivity data for an upcoming time window.

* * * * *